United States Patent
Uchida

(10) Patent No.: US 11,156,809 B2
(45) Date of Patent: Oct. 26, 2021

(54) OPTICAL SYSTEM FOR STEREOSCOPIC VISION AND ENDOSCOPE USING THE SAME

(71) Applicant: OLYMPUS CORPORATION, Hachioji (JP)

(72) Inventor: Yoshihiro Uchida, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 104 days.

(21) Appl. No.: 16/583,057

(22) Filed: Sep. 25, 2019

(65) Prior Publication Data

US 2020/0018935 A1    Jan. 16, 2020

Related U.S. Application Data

(63) Continuation of application No. PCT/JP2017/018392, filed on May 16, 2017.

(51) Int. Cl.
*G02B 13/04* (2006.01)
*G02B 23/24* (2006.01)
*G02B 30/24* (2020.01)

(52) U.S. Cl.
CPC ........... *G02B 13/04* (2013.01); *G02B 23/243* (2013.01); *G02B 30/24* (2020.01)

(58) Field of Classification Search
CPC ...... G02B 13/04; G02B 23/243; G02B 30/24; G02B 9/64; G02B 23/2415
See application file for complete search history.

(56) References Cited

U.S. PATENT DOCUMENTS 5,557,454 A    9/1996   Takahashi
5,743,846 A    4/1998   Takahashi et al.
5,971,915 A   10/1999   Yamamoto et al.
5,976,071 A   11/1999   Sekiya
6,306,082 B1  10/2001   Takahashi et al.
6,338,711 B1   1/2002   Sekiya et al.
6,364,888 B1   4/2002   Niemeyer et al.
(Continued)

FOREIGN PATENT DOCUMENTS

JP    H735989 A     2/1995
JP    H07261094 A  10/1995
(Continued)

OTHER PUBLICATIONS

Office Action (Non-Final Rejection) dated Sep. 2, 2020 issued in related U.S. Appl. No. 16/706,324.
(Continued)

*Primary Examiner* — Wen Huang
(74) *Attorney, Agent, or Firm* — Holtz, Holtz & Volek PC

(57) ABSTRACT

An optical system for stereoscopic vision includes a first optical system and a second optical system. Each of the first optical system and the second optical system includes a front unit, a stop, and a rear unit having a positive refractive power. Each of the two front units includes a first negative lens, and the first negative lens is a lens positioned nearest to an object. Each of the two stops moves in a direction parallel to a plane including an optical axis of the first optical system and an optical axis of the second optical system. Both the stops move to be drawn away from a central axis or move to come closer to the central axis, and the following conditional expressions (1) and (2) are satisfied:

$$-20.0 < FLFGn1/IH < -0.5 \tag{1}$$

$$1.5 < Ls/IH < 7.5 \tag{2}.$$

26 Claims, 58 Drawing Sheets

(56) References Cited

U.S. PATENT DOCUMENTS

| | | |
|---|---|---|
| 6,383,131 B1 | 5/2002 | Yamamoto et al. |
| 6,396,627 B1 | 5/2002 | Tachihara et al. |
| 6,414,791 B1 | 7/2002 | Sugawara |
| 6,517,479 B1 | 2/2003 | Sekiya |
| 6,720,988 B1 | 4/2004 | Gere et al. |
| 6,976,956 B2 | 12/2005 | Takahashi et al. |
| 7,564,619 B2 | 7/2009 | Uzawa et al. |
| 3,221,304 A1 | 7/2012 | Shioda et al. |
| 8,345,084 B2 | 1/2013 | Namii et al. |
| 8,648,896 B2 | 2/2014 | Takahashi |
| 8,743,185 B2 | 6/2014 | Yamaguchi et al. |
| 8,934,169 B2 | 1/2015 | Mirlay |
| 10,274,717 B2 | 4/2019 | Togino |
| 2001/0055062 A1 | 12/2001 | Shioda et al. |
| 2002/0055795 A1 | 5/2002 | Niemeyer et al. |
| 2002/0082476 A1 | 6/2002 | Takahashi et al. |
| 2003/0029463 A1 | 2/2003 | Niemeyer |
| 2005/0020876 A1 | 1/2005 | Shioda et al. |
| 2005/0027397 A1 | 2/2005 | Niemeyer |
| 2006/0092273 A1 | 5/2006 | Gere et al. |
| 2006/0146009 A1 | 7/2006 | Syrbe et al. |
| 2006/0274433 A1 | 12/2006 | Kamo |
| 2007/0285508 A1 | 12/2007 | Gere et al. |
| 2008/0174861 A1 | 7/2008 | Uzawa et al. |
| 2010/0208046 A1 | 8/2010 | Takahashi |
| 2012/0008194 A1 | 1/2012 | Mizuta et al. |
| 2012/0075448 A1 | 3/2012 | Namii et al. |
| 2012/0113233 A1 | 5/2012 | Yamaguchi et al. |
| 2013/0044369 A1 | 2/2013 | Mirlay |
| 2013/0070123 A1 | 3/2013 | Imoka |
| 2013/0113891 A1 | 5/2013 | Mayhew et al. |
| 2013/0242412 A1 | 9/2013 | Uchida et al. |
| 2014/0300711 A1 | 10/2014 | Kroon et al. |
| 2015/0036146 A1 | 2/2015 | Staloff |
| 2015/0168710 A1 | 6/2015 | Zobel |
| 2016/0131869 A1 | 5/2016 | Liao et al. |
| 2016/0266370 A1 | 9/2016 | Uchida et al. |
| 2016/0320606 A1 | 11/2016 | Togino |
| 2017/0168264 A1 | 6/2017 | Chen et al. |
| 2017/0235123 A1 | 8/2017 | Kamo |
| 2018/0120554 A1 | 5/2018 | Fukushima |
| 2018/0231748 A1 | 8/2018 | Chang et al. |
| 2020/0008660 A1 | 1/2020 | Uchida et al. |
| 2020/0107707 A1 | 4/2020 | Uchida |

FOREIGN PATENT DOCUMENTS

| | | |
|---|---|---|
| JP | H07261099 A | 10/1995 |
| JP | H08304714 A | 11/1996 |
| JP | H116967 A | 1/1999 |
| JP | 2001075011 A | 3/2001 |
| JP | 2002011022 A | 1/2002 |
| JP | 3283084 B2 | 3/2002 |
| JP | 2008170803 A | 7/2008 |
| JP | 4750175 | 8/2011 |
| JP | 2012113281 A | 6/2012 |
| JP | 2013524285 A | 6/2013 |
| JP | 2014110910 A | 6/2014 |
| JP | 2014160240 A | 9/2014 |
| JP | 2014174390 A | 9/2014 |
| WO | 2011049195 A1 | 4/2011 |
| WO | 2017033234 A1 | 3/2017 |

OTHER PUBLICATIONS

International Search Report (ISR) dated Aug. 15, 2017 (and English translation thereof), issued in International Application No. PCT/JP2017/018392.

Written Opinion of the International Searching Authority dated Aug. 15, 2017, issued in International Application No. PCT/JP2017/018392.

International Preliminary Report on Patentability (IPRP) dated Nov. 28, 2019 (and English translation thereof), issued in International Application No. PCT/JP2017/018392.

Related U.S. Appl. No. 16/574,651; First Named Inventor: Yoshihiro Uchida; Title: "Stereoscopic-Vision Endoscope Optical System and Endoscope Using the Same"; filed Sep. 18, 2019.

Related U.S. Appl. No. 16/706,324; First Named Inventor: Yoshihiro Uchida; Title: "Optical System for Stereoscopic Vision and Image Pickup Apparatus Using the Same"; filed Dec. 6, 2019.

Related U.S. Appl. No. 16/745,733; First Named Inventor: Yoshihiro Uchida; Title: "Optical System for Stereoscopic Vision and Image Pickup Apparatus Using the Same"; filed Jan. 17, 2020.

Notice of Allowance dated Jul. 28, 2021 issued in related U.S. Appl. No. 16/745,733.

AS
FIY 1.42

DT
FIY 1.42

Ta, IH 0

Sa, IH 0

Ta, IH 0.5

Sa, IH 0.5

Ta, IH 0.7

Sa, IH 0.7

Ta, IH 1.0

Sa, IH 1.0

---- 0.486
——— 0.588
······ 0.656

AS
FIY 1.42

-0.20    0.00    0.20
(mm)

DT
FIY 1.42

-50    0    50
(%)

Ta, IH 0
ey

Py

Sa, IH 0
ex

Px

Ta, IH 0.5
ey

Py

Sa, IH 0.5
ex

Px

Ta, IH 0.7
ey

Py

Sa, IH 0.7
ex

Px

Ta, IH 1.0
ey

Py

Sa, IH 1.0
ex

Px

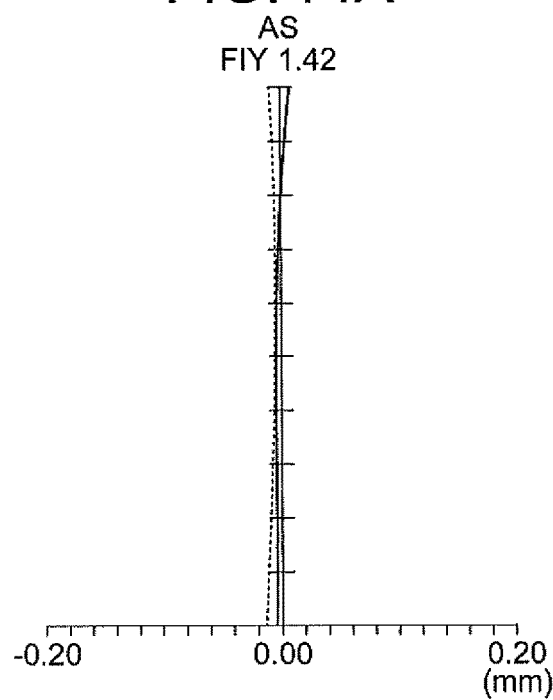
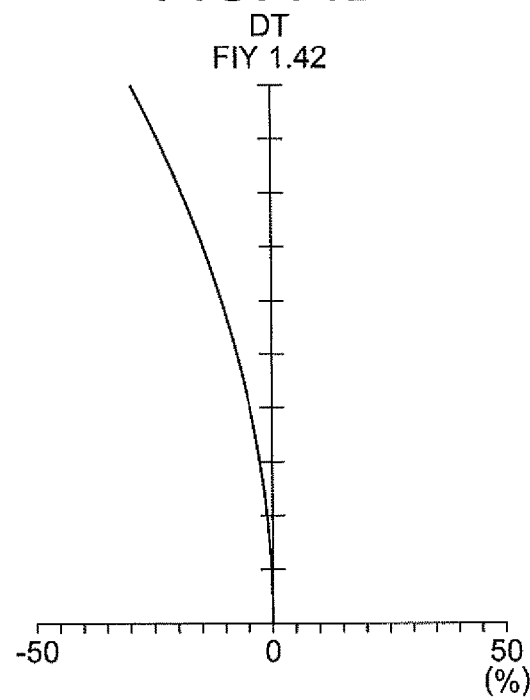
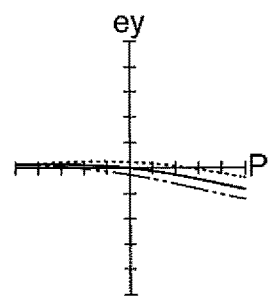 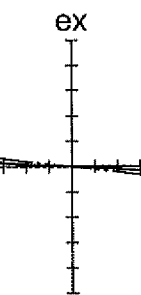 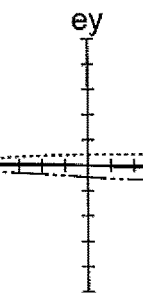 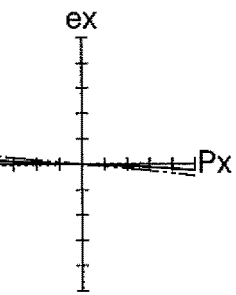
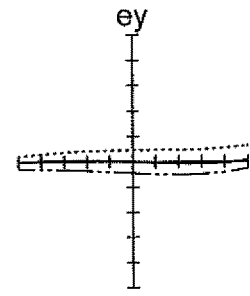 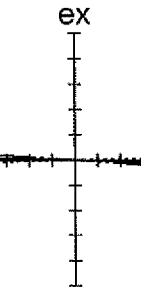  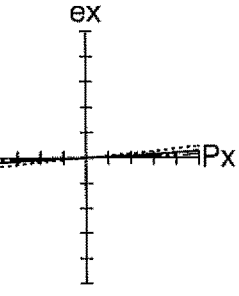

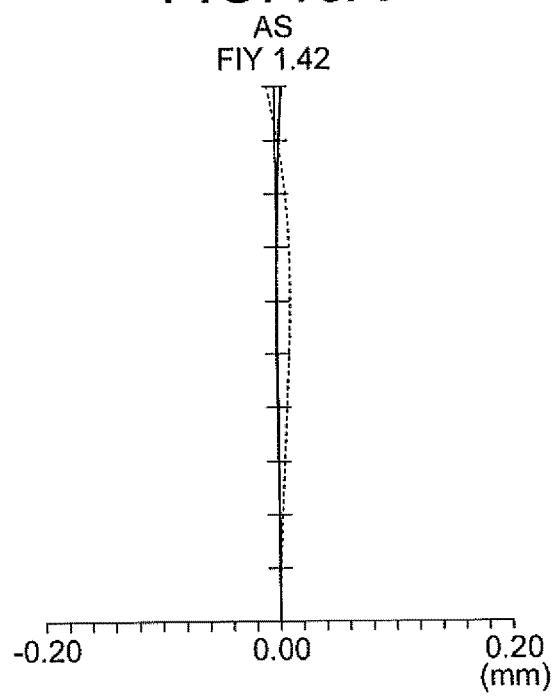
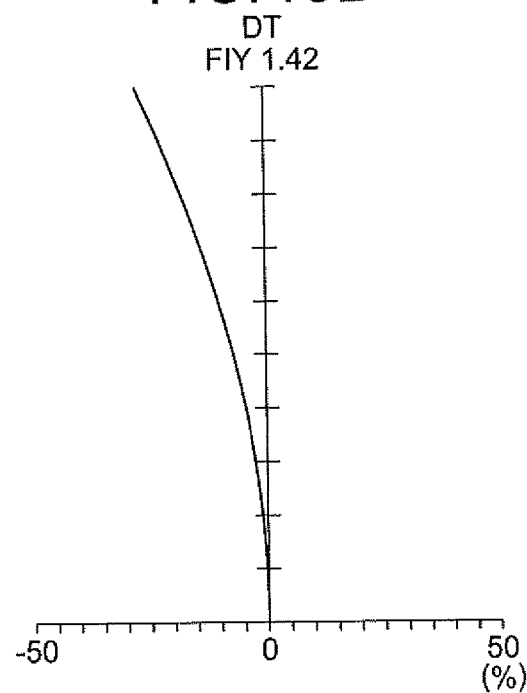
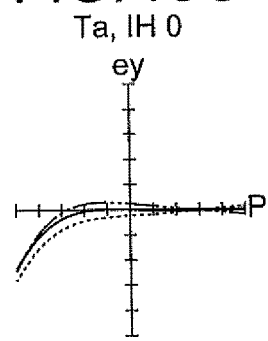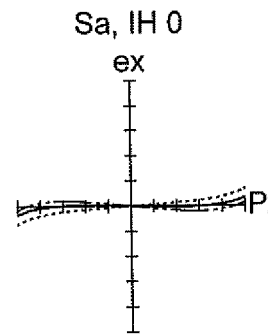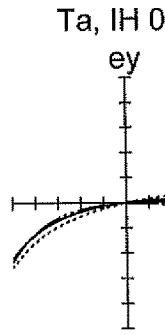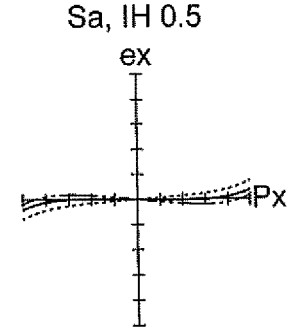
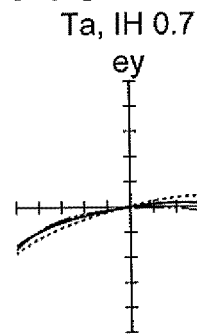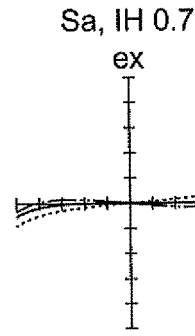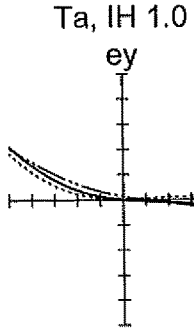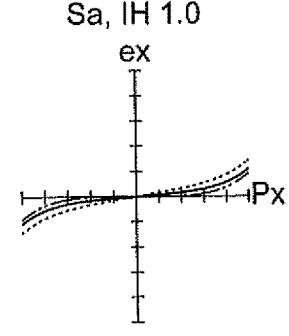

AS
FIY 1.42

DT
FIY 1.42

Ta, IH 0

Sa, IH 0

Ta, IH 0.5

Sa, IH 0.5

Ta, IH 0.7

Sa, IH 0.7

Ta, IH 1.0

Sa, IH 1.0

AS
FIY 1.42

DT
FIY 1.42

Ta, IH 0

Sa, IH 0

Ta, IH 0.5

Sa, IH 0.5

Ta, IH 0.7

Sa, IH 0.7

Ta, IH 1.0

Sa, IH 1.0

AS
FIY 1.25

DT
FIY 1.25

Ta, IH 0

Sa, IH 0

Ta, IH 0.5

Sa, IH 0.5

Ta, IH 0.7

Sa, IH 0.7

Ta, IH 1.0

Sa, IH 1.0

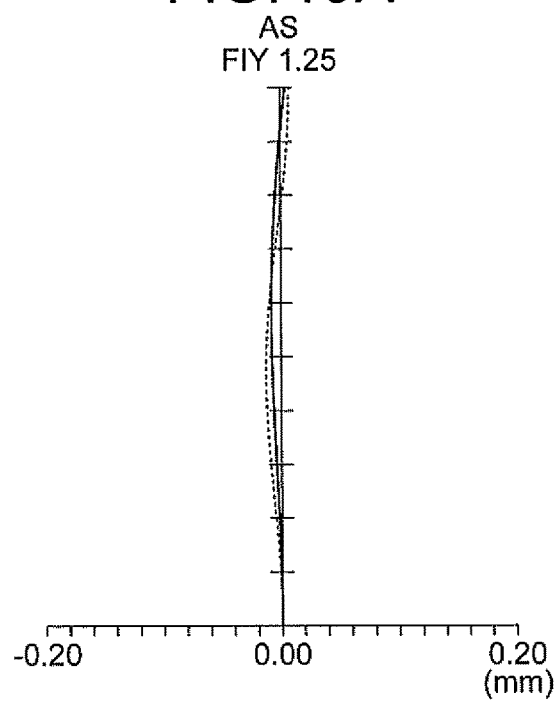
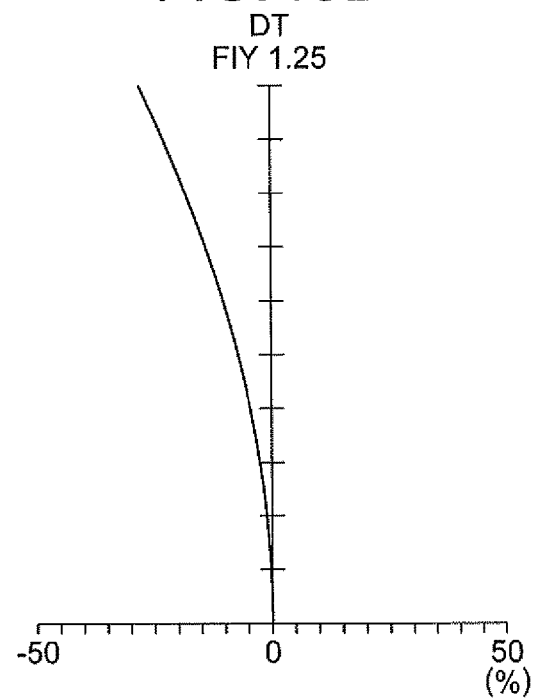
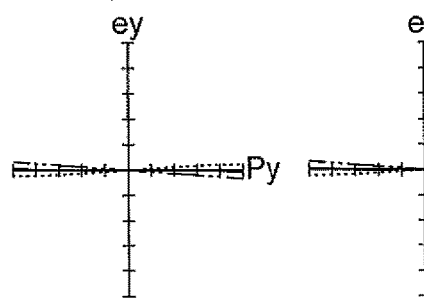
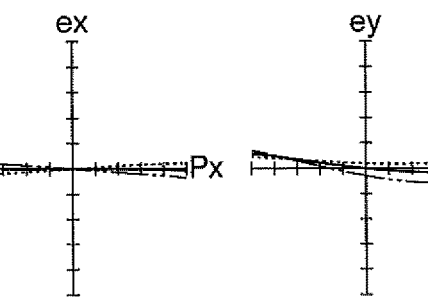
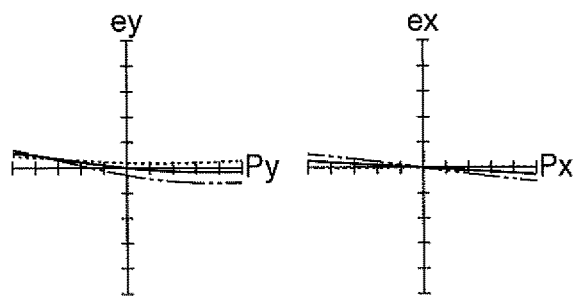
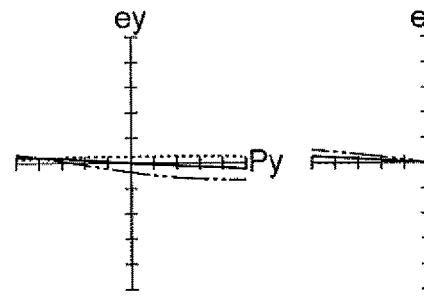
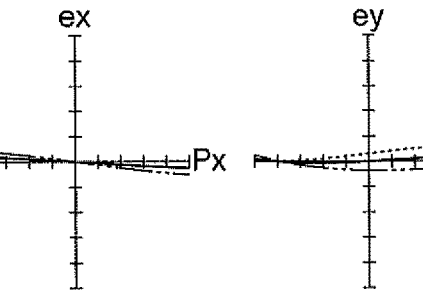
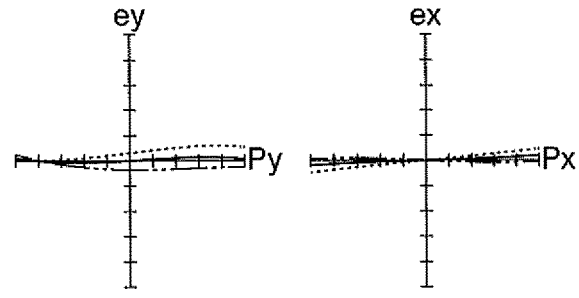

AS
FIY 1.25

DT
FIY 1.25

Ta, IH 0

Sa, IH 0

Ta, IH 0.5

Sa, IH 0.5

Ta, IH 0.7

Sa, IH 0.7

Ta, IH 1.0

Sa, IH 1.0

AS
FIY 1.25

DT
FIY 1.25

Ta, IH 0

Sa, IH 0

Ta, IH 0.5

Sa, IH 0.5

Ta, IH 0.7

Sa, IH 0.7

Ta, IH 1.0

Sa, IH 1.0

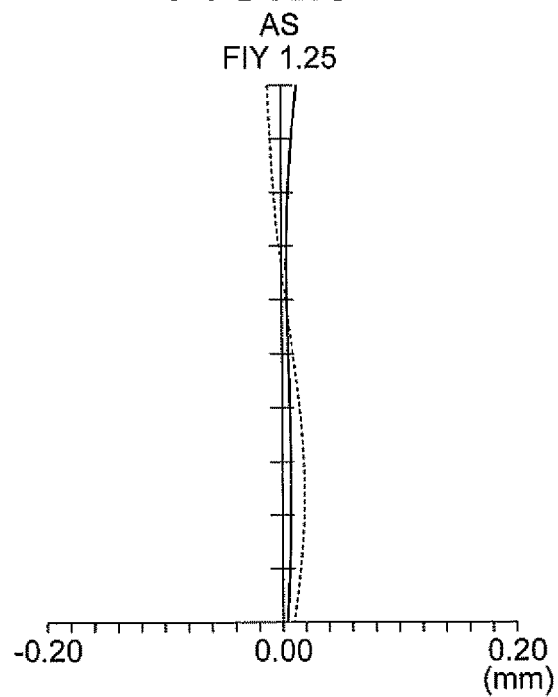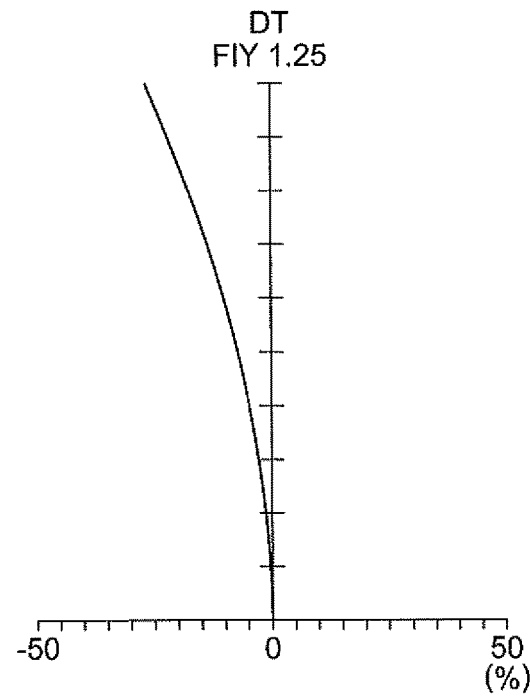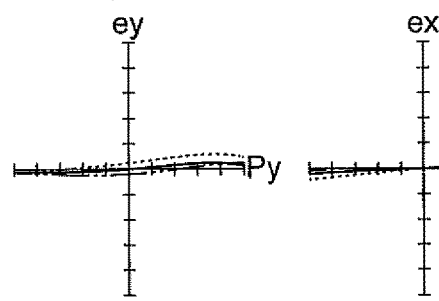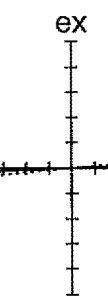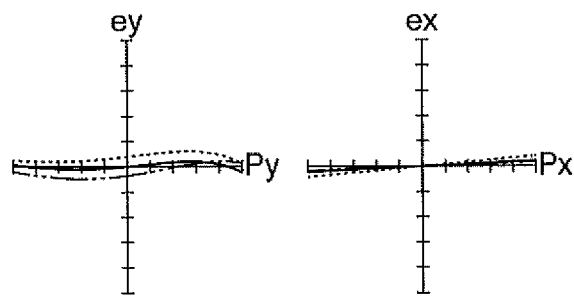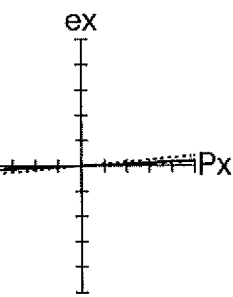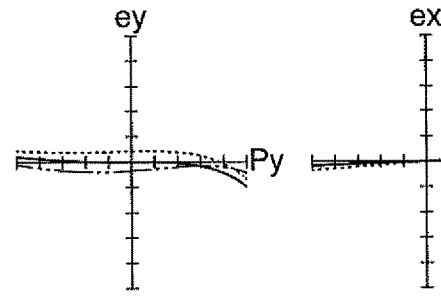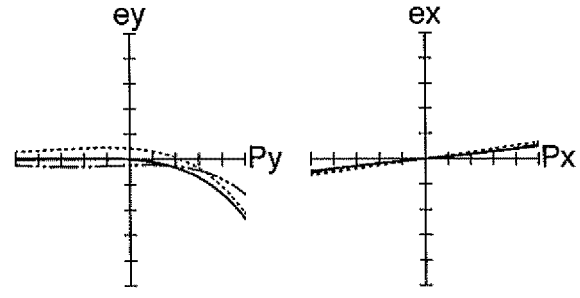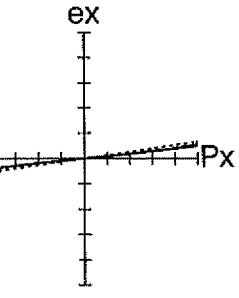

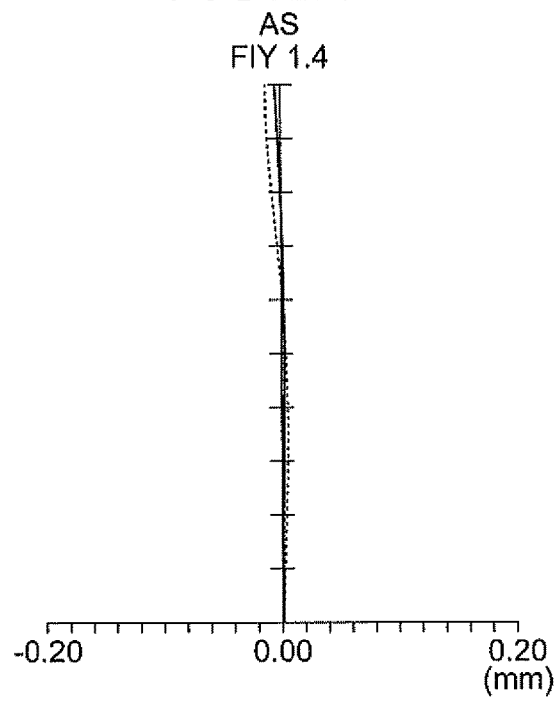
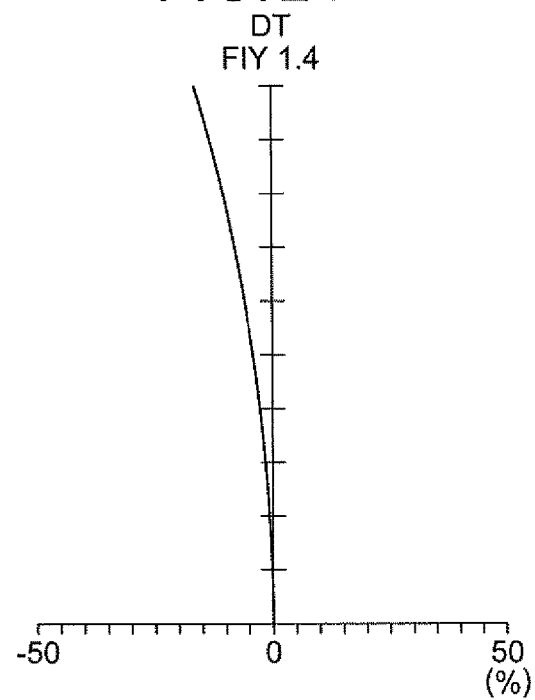
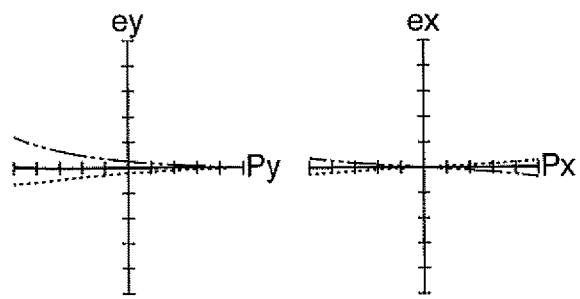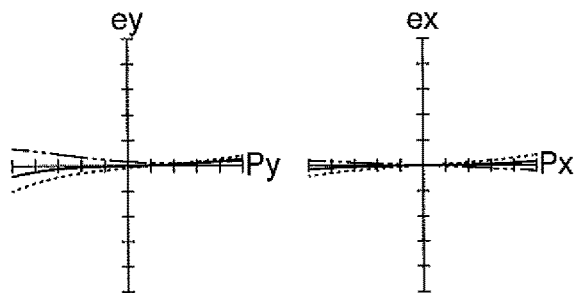
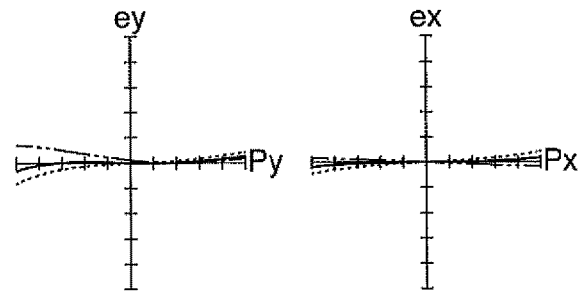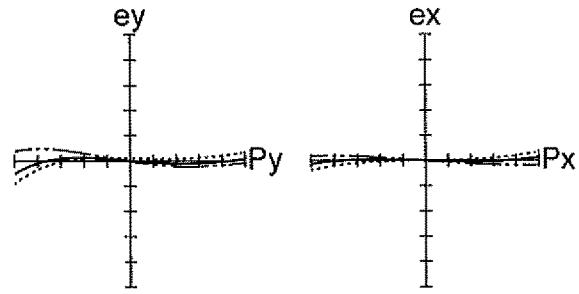

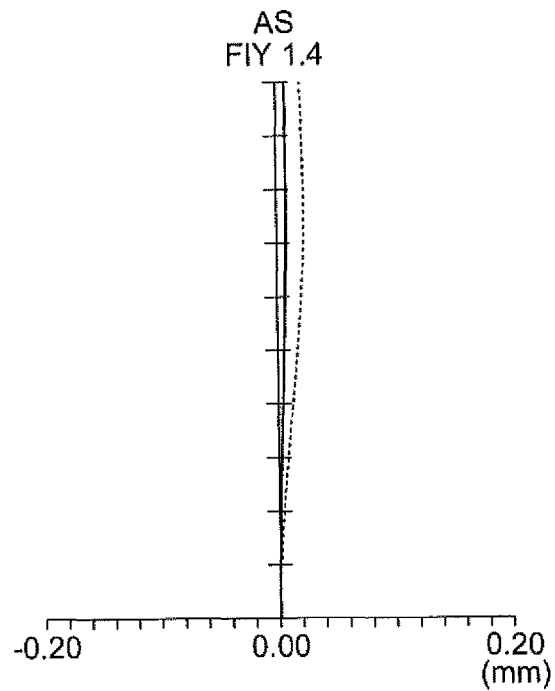 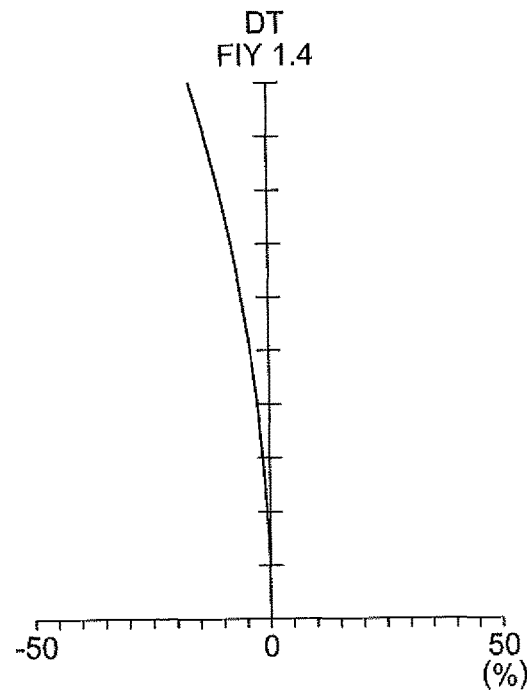
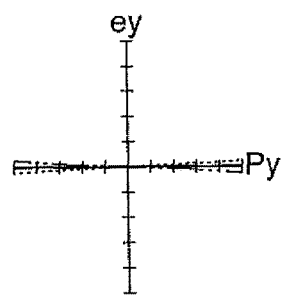 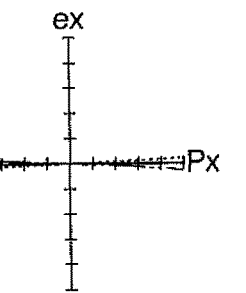 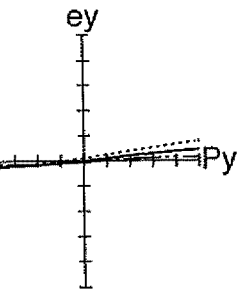 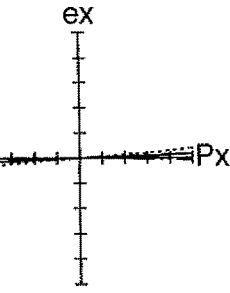
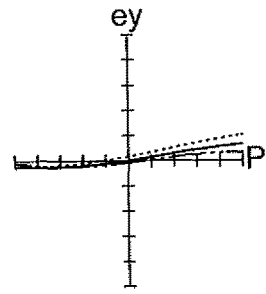 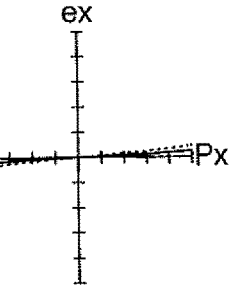 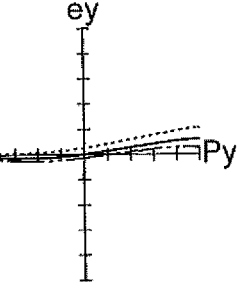 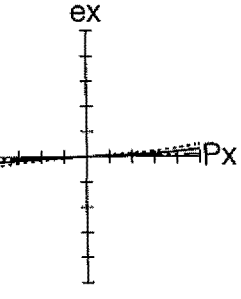

AS
FIY 1.4

DT
FIY 1.4

Ta, IH 0
ey

Sa, IH 0
ex

Ta, IH 0.5
ey

Sa, IH 0.5
ex

Ta, IH 0.7
ey

Sa, IH 0.7
ex

Ta, IH 1.0
ey

Sa, IH 1.0
ex

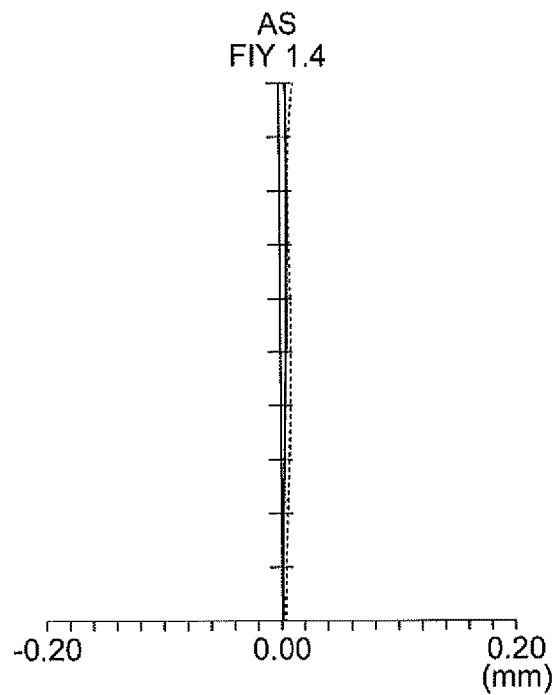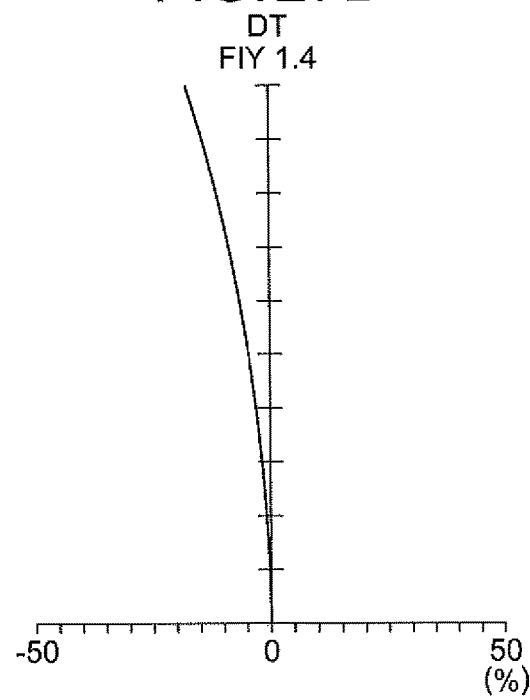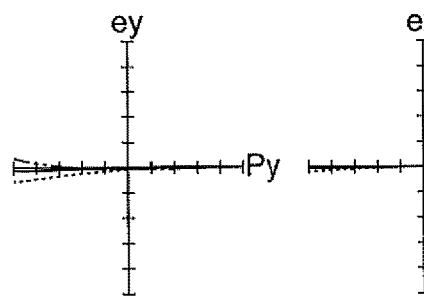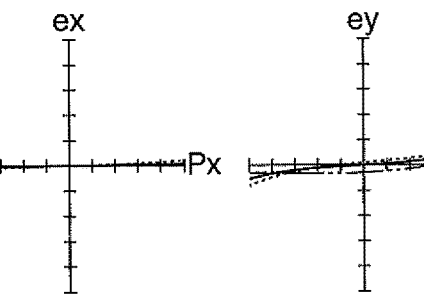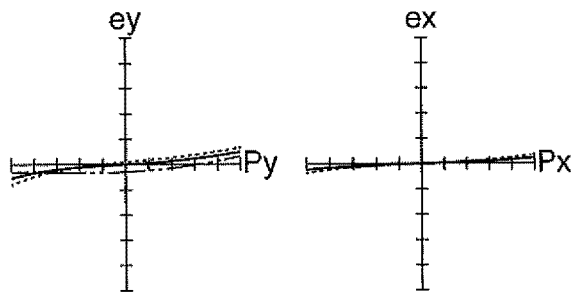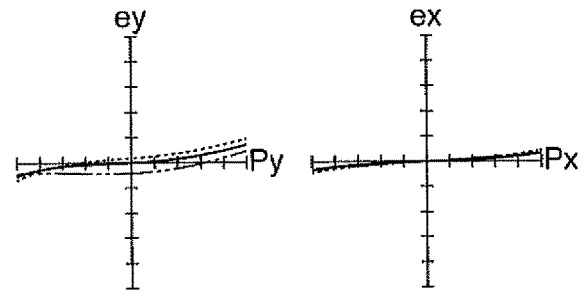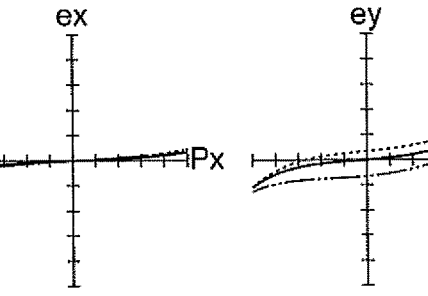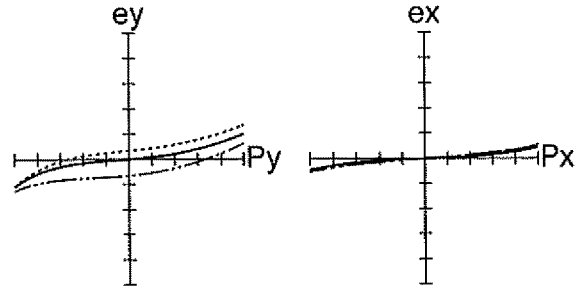

AS
FIY 1.4

-0.20　　0.00　　0.20
(mm)

DT
FIY 1.4

-50　　0　　50
(%)

Ta, IH 0

Sa, IH 0

Ta, IH 0.5

Sa, IH 0.5

Ta, IH 0.7

Sa, IH 0.7

Ta, IH 1.0

Sa, IH 1.0

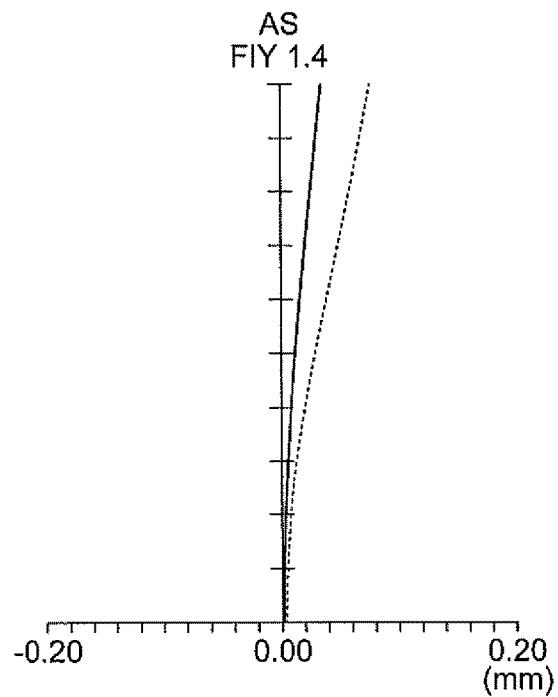
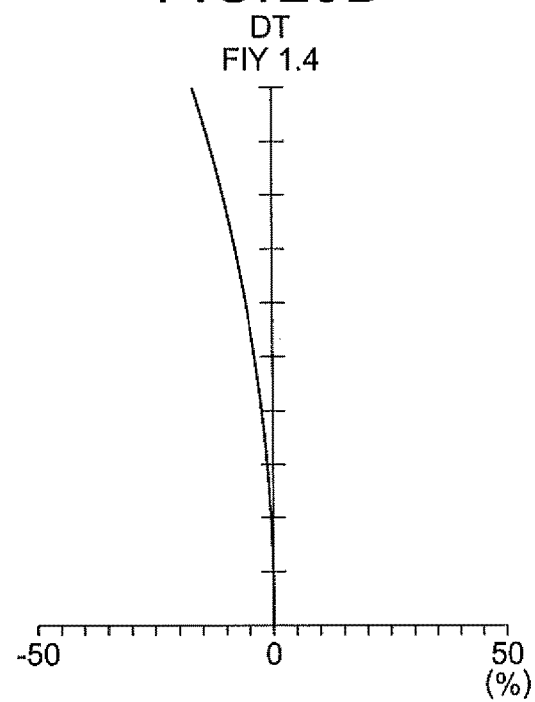
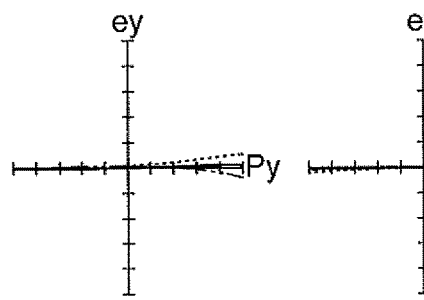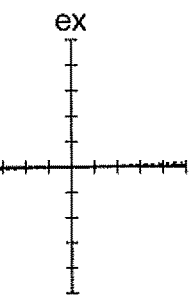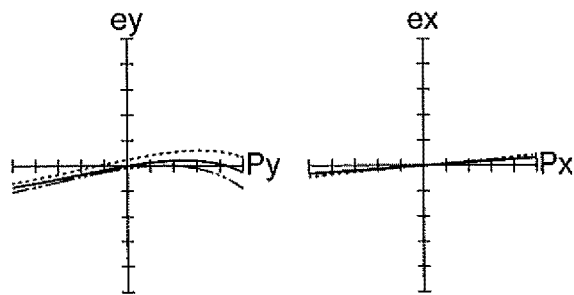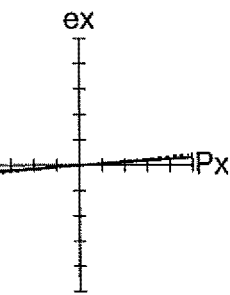
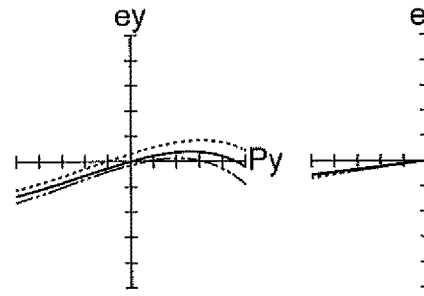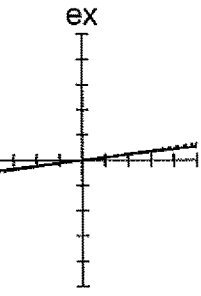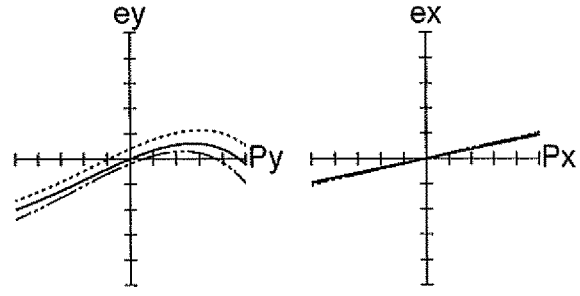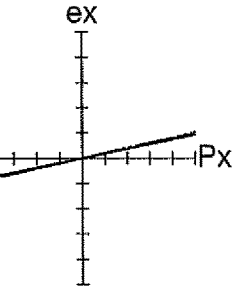

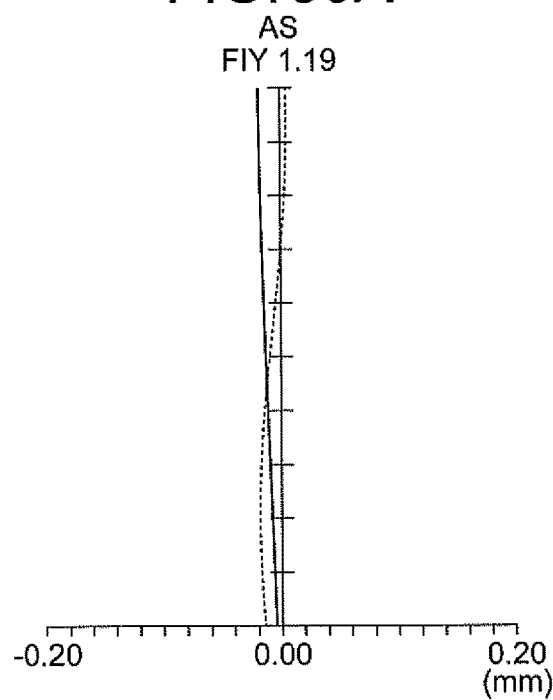
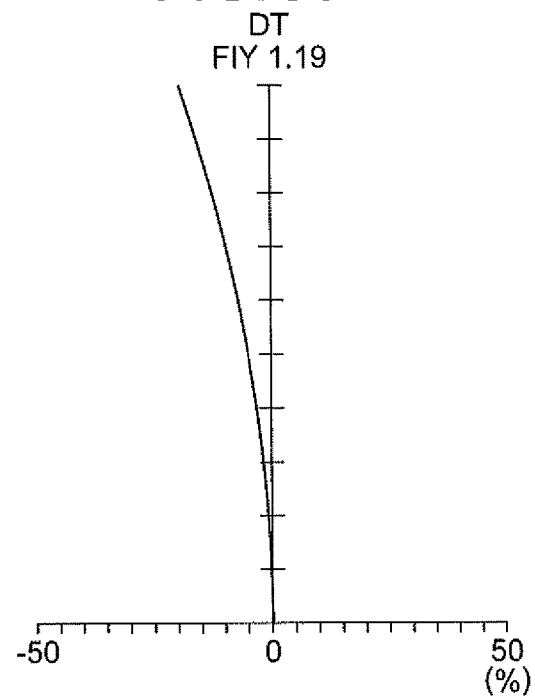
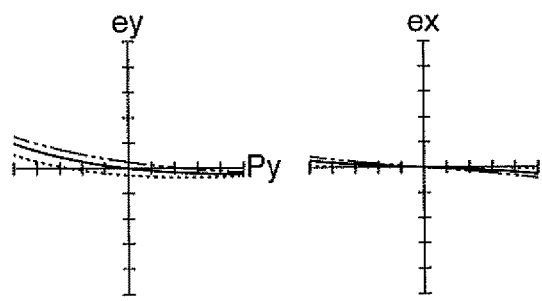
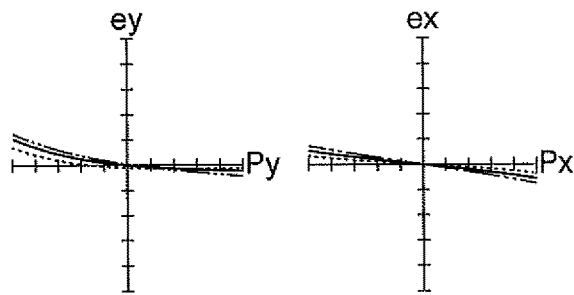
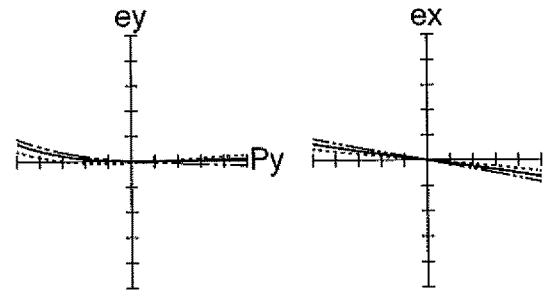
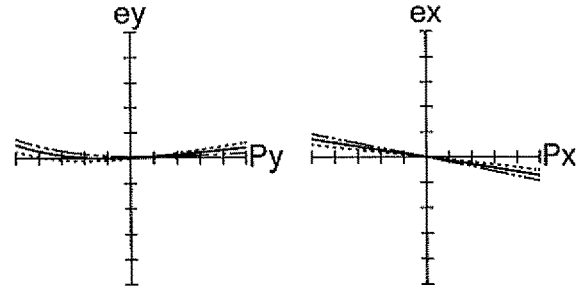

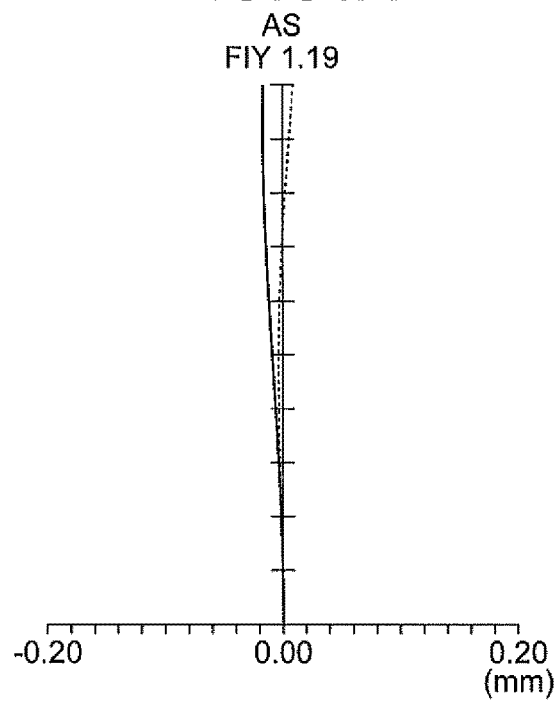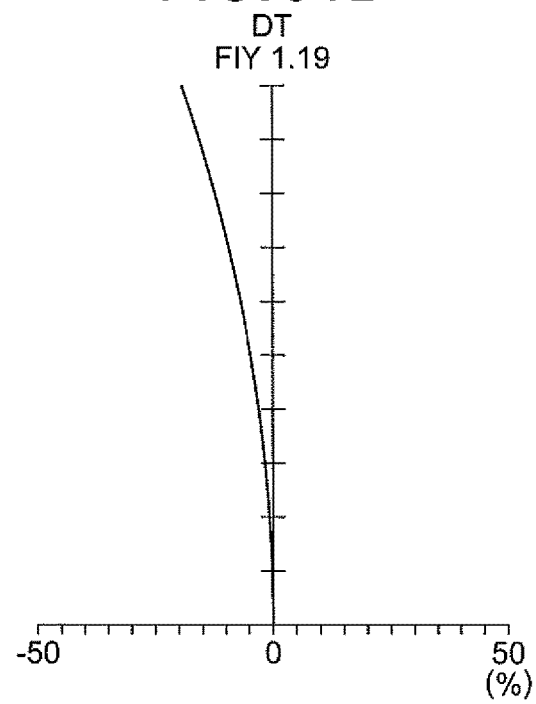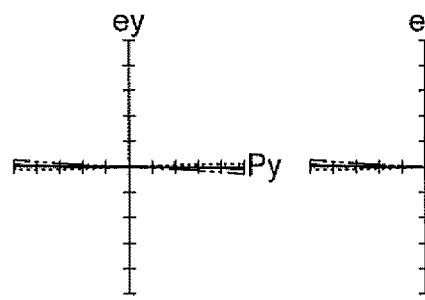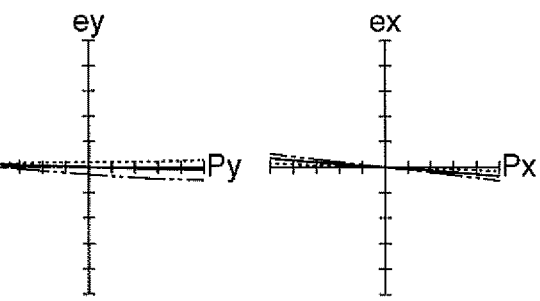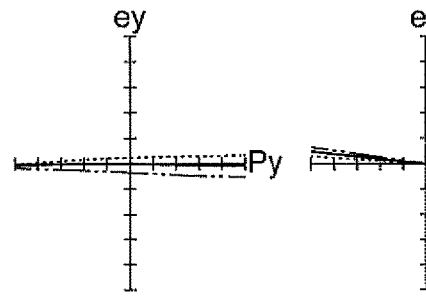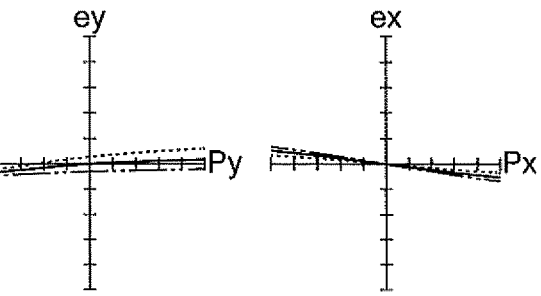

AS
FIY 1.19

DT
FIY 1.19

Ta, IH 0

Sa, IH 0

Ta, IH 0.5

Sa, IH 0.5

Ta, IH 0.7

Sa, IH 0.7

Ta, IH 1.0

Sa, IH 1.0

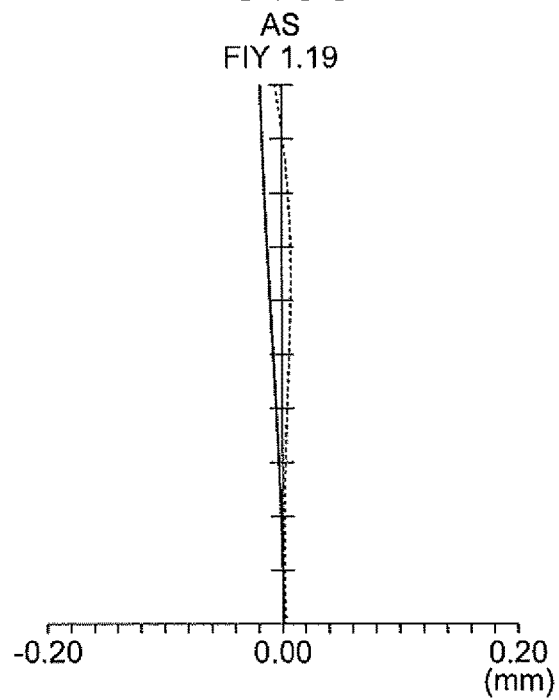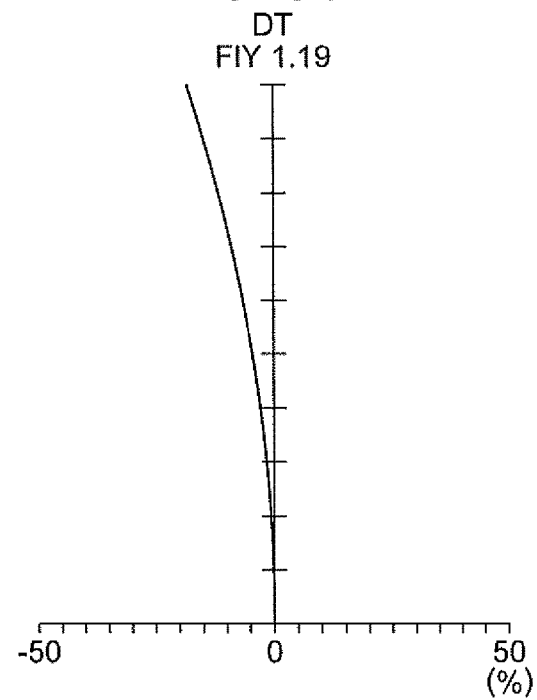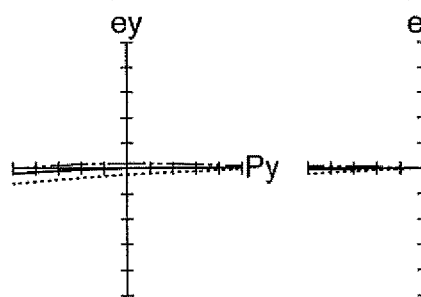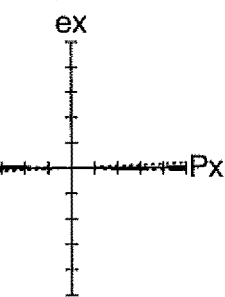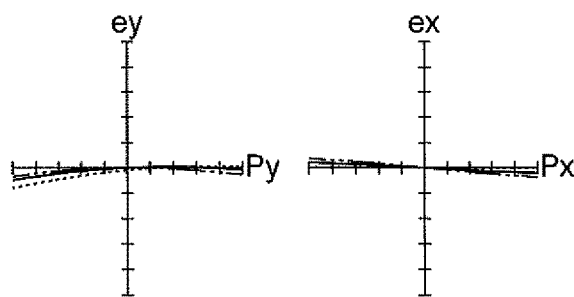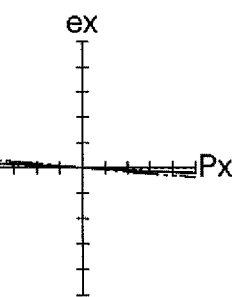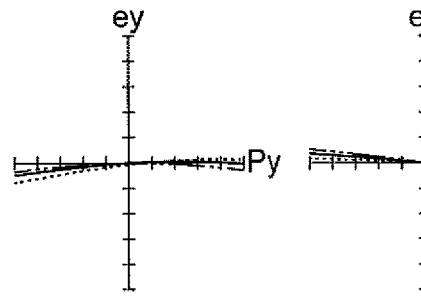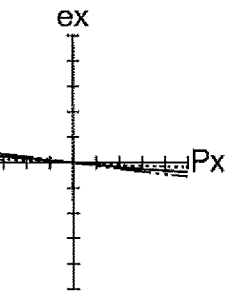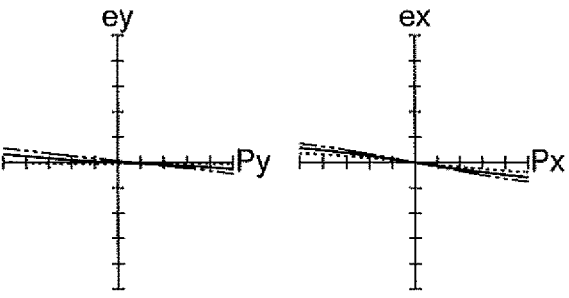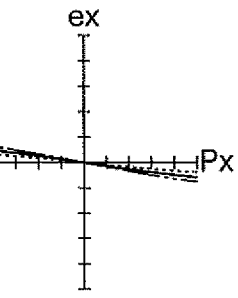

AS
FIY 1.19

DT
FIY 1.19

Ta, IH 0
ey

Sa, IH 0
ex

Ta, IH 0.5
ey

Sa, IH 0.5
ex

Ta, IH 0.7
ey

Sa, IH 0.7
ex

Ta, IH 1.0
ey

Sa, IH 1.0
ex

FIG.36A
AS
FIY 1.66
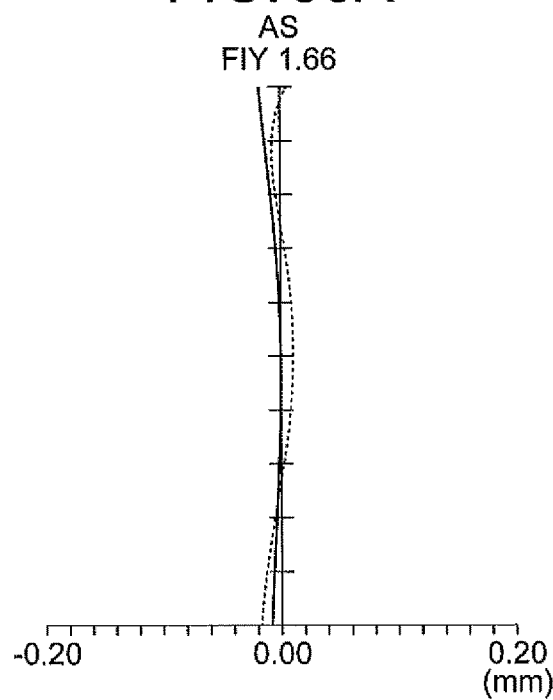
FIG.36B
DT
FIY 1.66
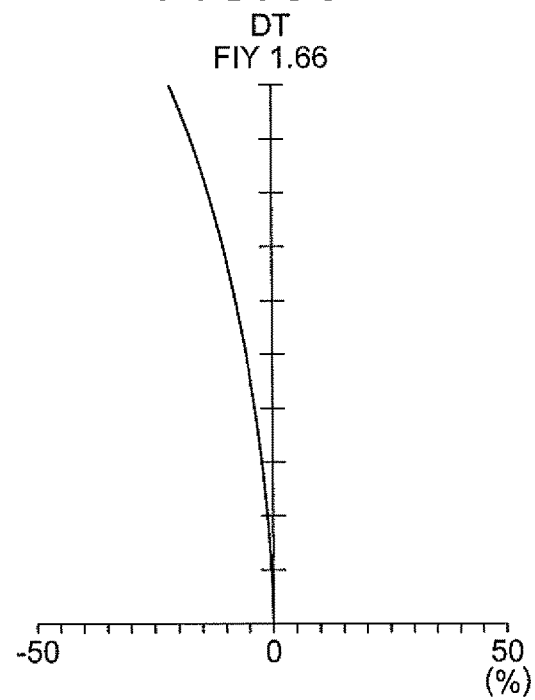
FIG.36C
Ta, IH 0
ey
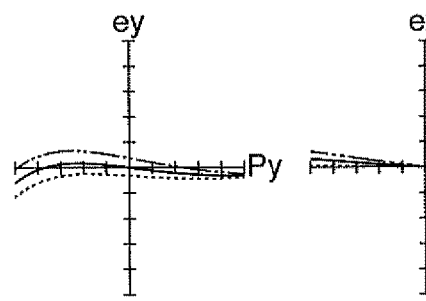
FIG.36D
Sa, IH 0
ex
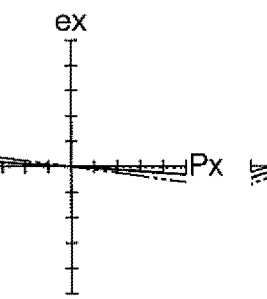
FIG.36E
Ta, IH 0.5
ey
FIG.36F
Sa, IH 0.5
ex
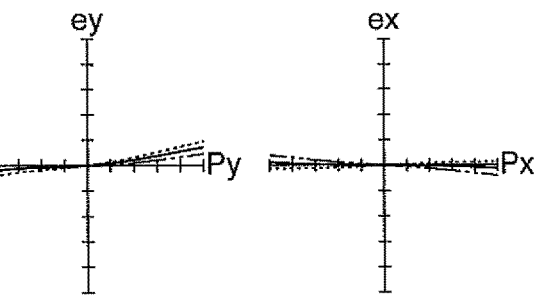
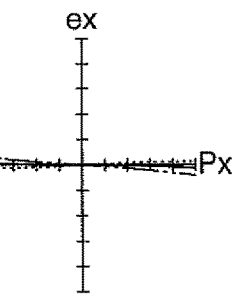
FIG.36G
Ta, IH 0.7
ey
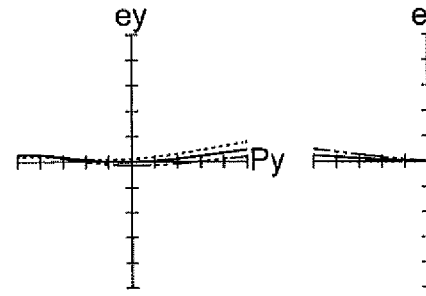
FIG.36H
Sa, IH 0.7
ex
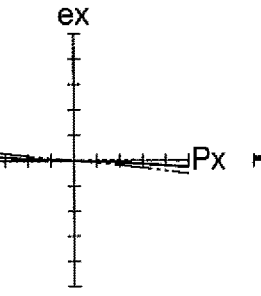
FIG.36I
Ta, IH 1.0
ey
FIG.36J
Sa, IH 1.0
ex
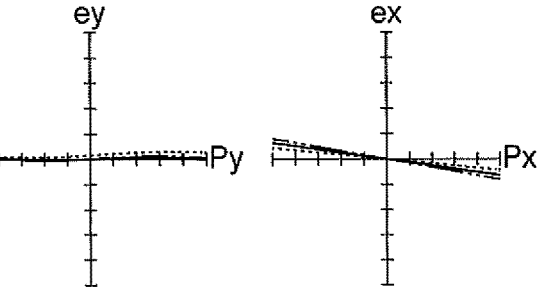
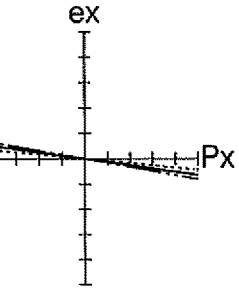

FIG.37A
AS
FIY 1.66
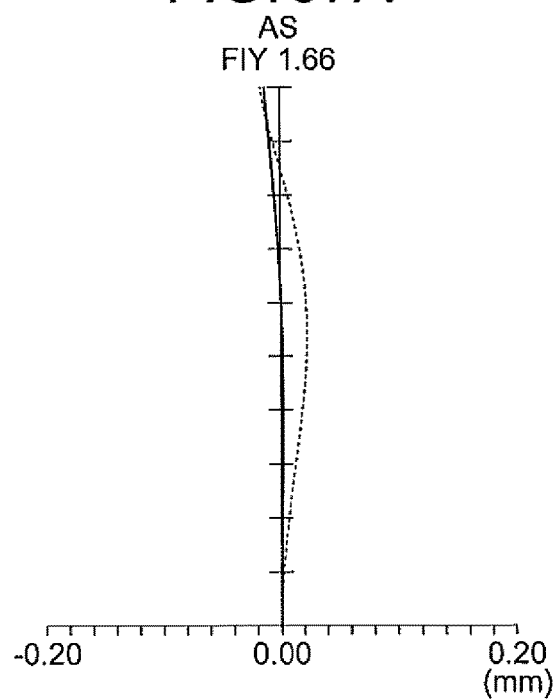
FIG.37B
DT
FIY 1.66
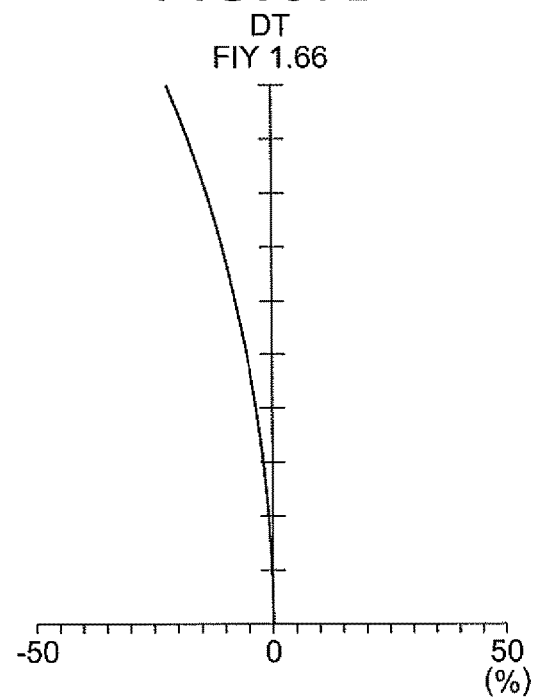
FIG.37C
Ta, IH 0
FIG.37D
Sa, IH 0
FIG.37E
Ta, IH 0.5
FIG.37F
Sa, IH 0.5
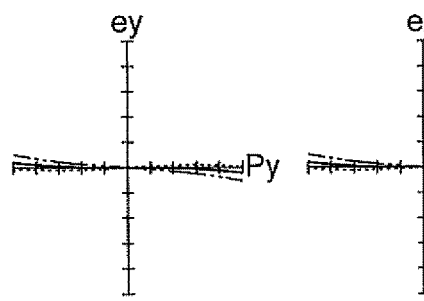
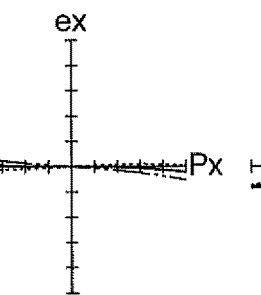
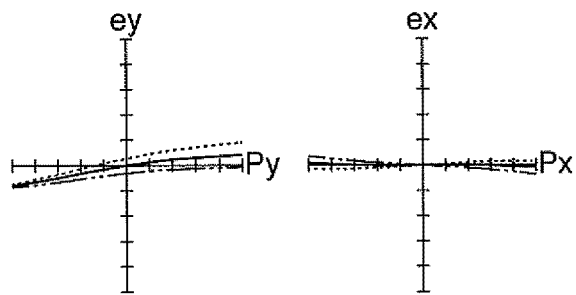
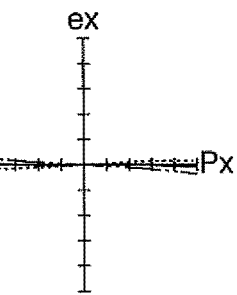
FIG.37G
Ta, IH 0.7
FIG.37H
Sa, IH 0.7
FIG.37I
Ta, IH 1.0
FIG.37J
Sa, IH 1.0
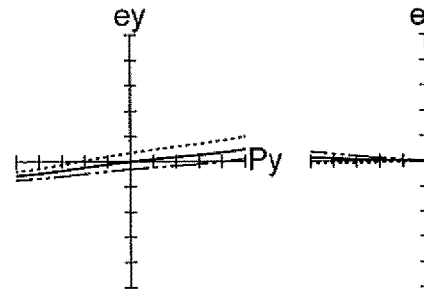
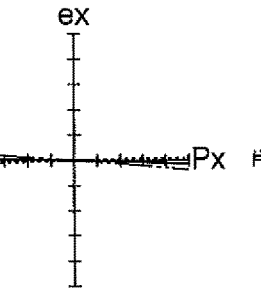
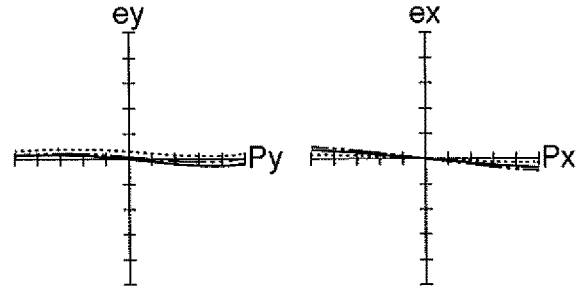
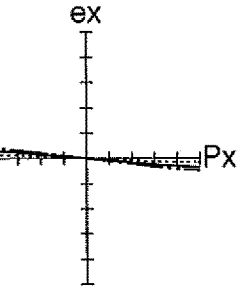

AS
FIY 1.66

DT
FIY 1.66

Ta, IH 0

Sa, IH 0

Ta, IH 0.5

Sa, IH 0.5

Ta, IH 0.7

Sa, IH 0.7

Ta, IH 1.0

Sa, IH 1.0

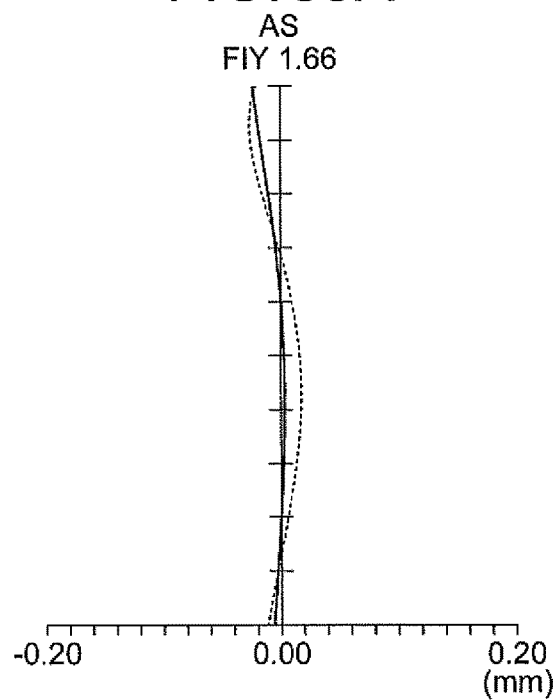
FIG.39A
AS
FIY 1.66
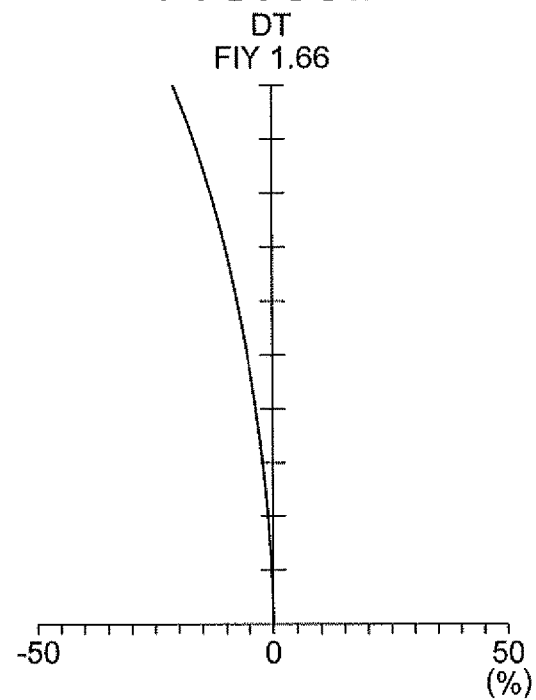
FIG.39B
DT
FIY 1.66
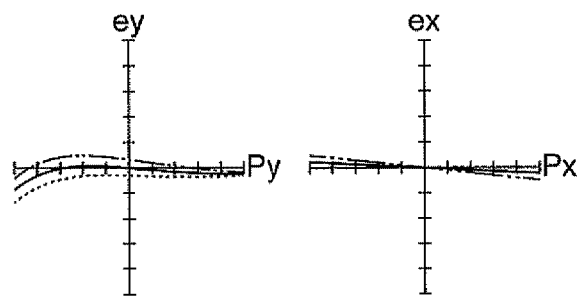
FIG.39C
Ta, IH 0
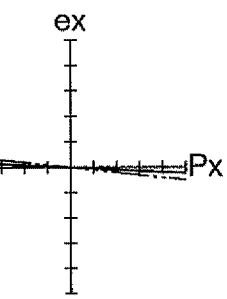
FIG.39D
Sa, IH 0
FIG.39E
Ta, IH 0.5
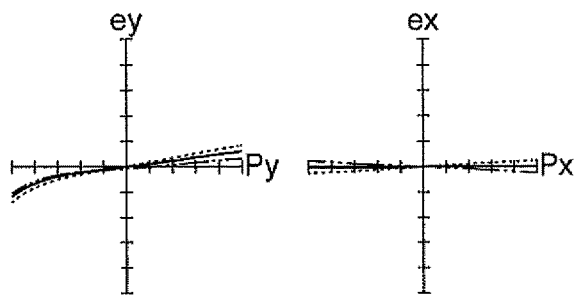
FIG.39F
Sa, IH 0.5
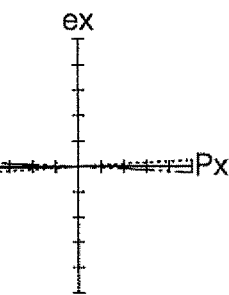
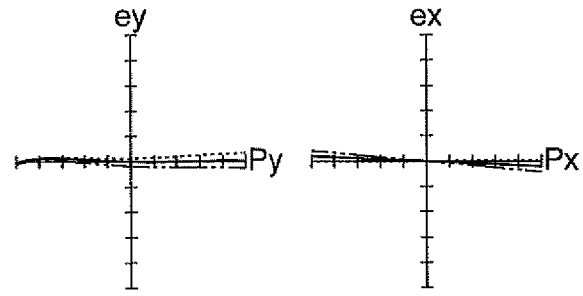
FIG.39G
Ta, IH 0.7
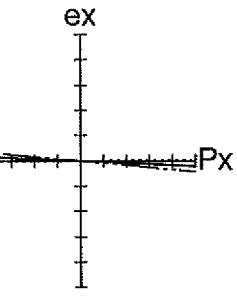
FIG.39H
Sa, IH 0.7
FIG.39I
Ta, IH 1.0
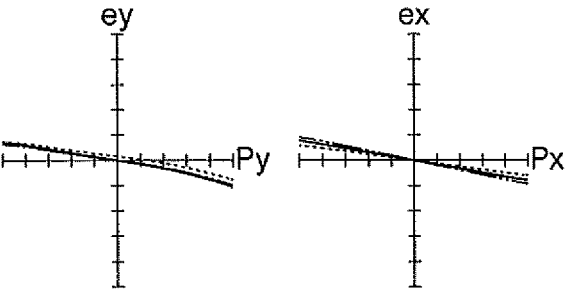
FIG.39J
Sa, IH 1.0
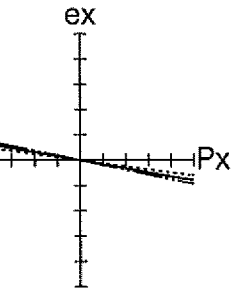

FIG.40A
AS
FIY 1.66
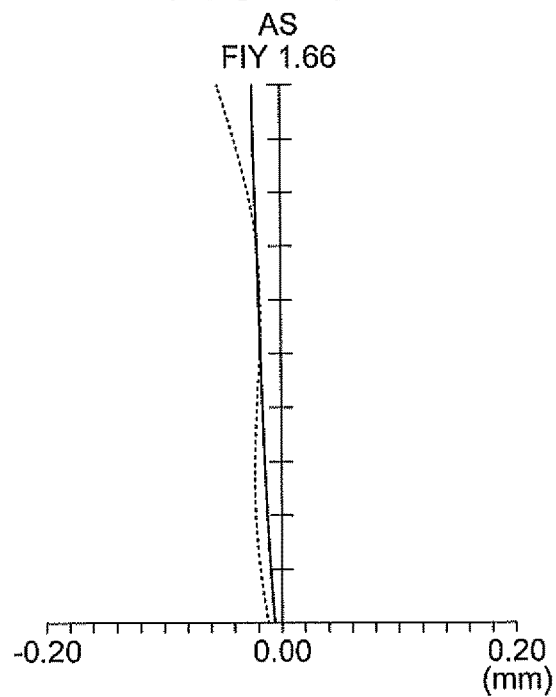
FIG.40B
DT
FIY 1.66
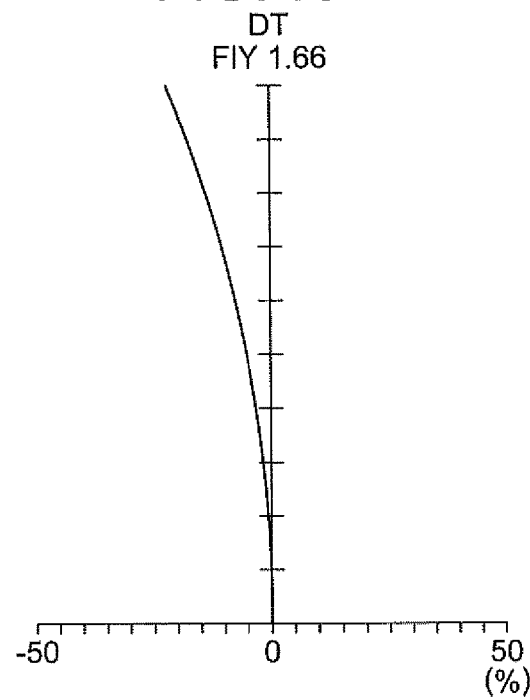
FIG.40C
Ta, IH 0
FIG.40D
Sa, IH 0
FIG.40E
Ta, IH 0.5
FIG.40F
Sa, IH 0.5
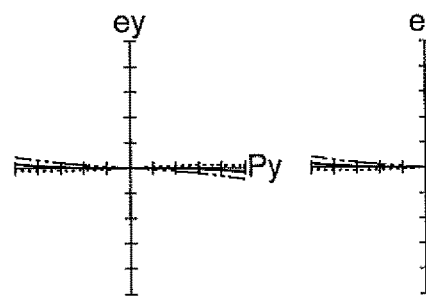
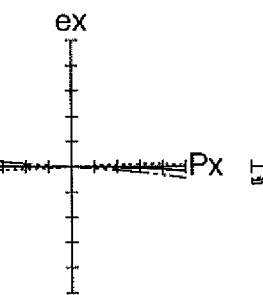
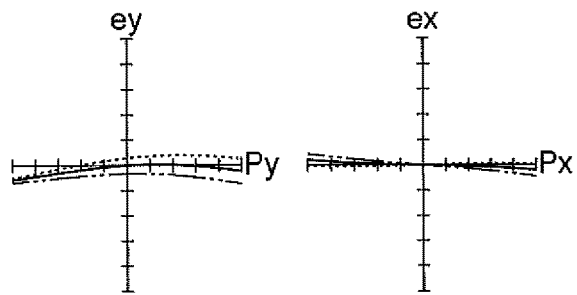
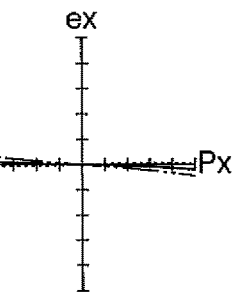
FIG.40G
Ta, IH 0.7
FIG.40H
Sa, IH 0.7
FIG.40I
Ta, IH 1.0
FIG.40J
Sa, IH 1.0
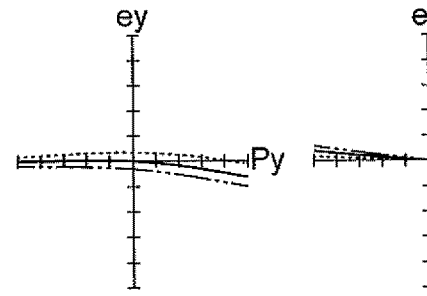
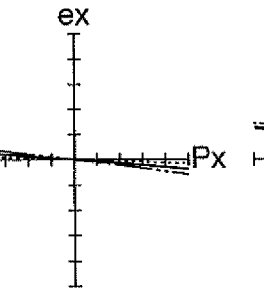
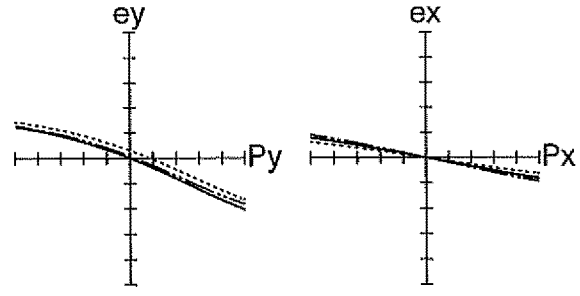
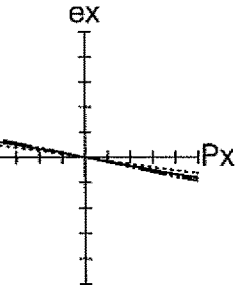

AS
FIY 1.66

DT
FIY 1.66

Ta, IH 0
ey

Sa, IH 0
ex

Ta, IH 0.5
ey

Sa, IH 0.5
ex

Ta, IH 0.7
ey

Sa, IH 0.7
ex

Ta, IH 1.0
ey

Sa, IH 1.0
ex

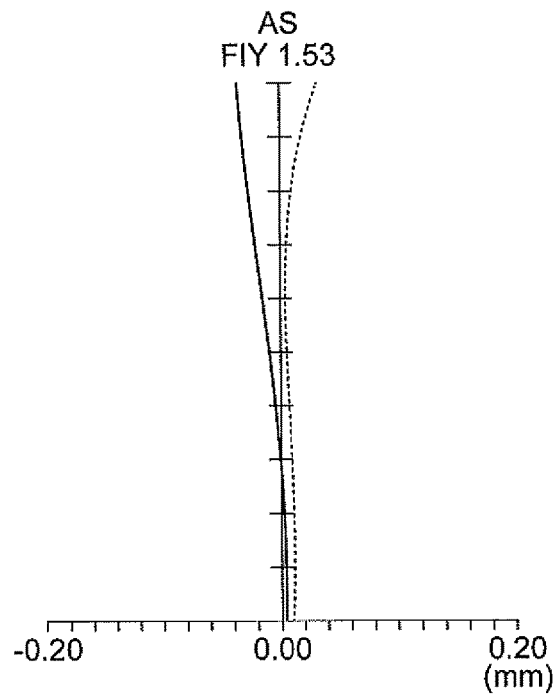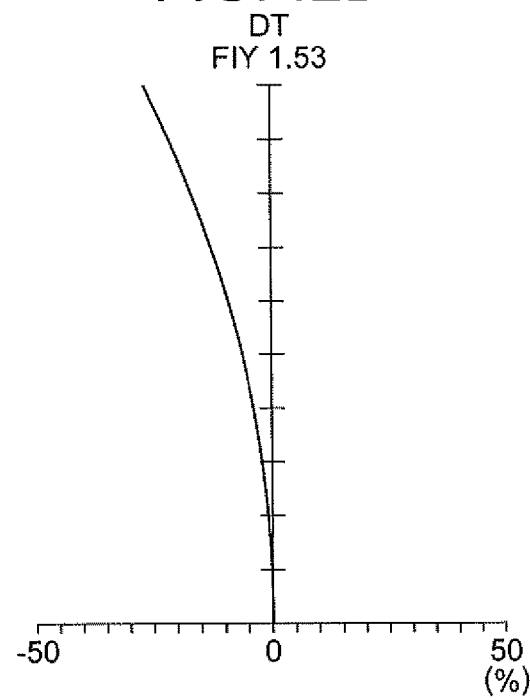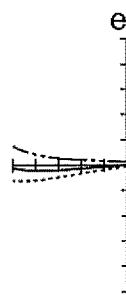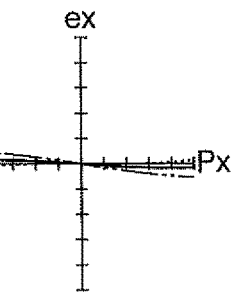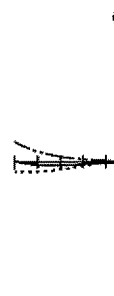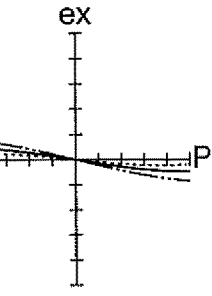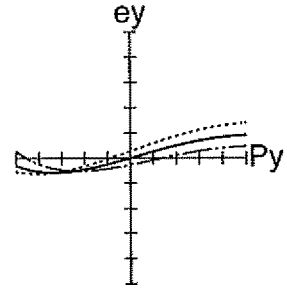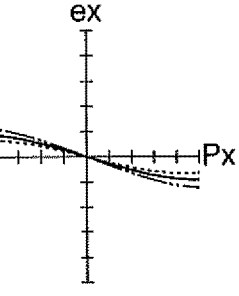

AS
FIY 1.53

DT
FIY 1.53

Ta, IH 0

Sa, IH 0

Ta, IH 0.5

Sa, IH 0.5

Ta, IH 0.7

Sa, IH 0.7

Ta, IH 1.0

Sa, IH 1.0

AS
FIY 1.53

DT
FIY 1.53

Ta, IH 0

Sa, IH 0

Ta, IH 0.5

Sa, IH 0.5

Ta, IH 0.7

Sa, IH 0.7

Ta, IH 1.0

Sa, IH 1.0

AS
FIY 0.97

DT
FIY 0.97

Ta, IH 0

Sa, IH 0

Ta, IH 0.5

Sa, IH 0.5

Ta, IH 0.7

Sa, IH 0.7

Ta, IH 1.0

Sa, IH 1.0

FIG.46A
AS
FIY 0.97
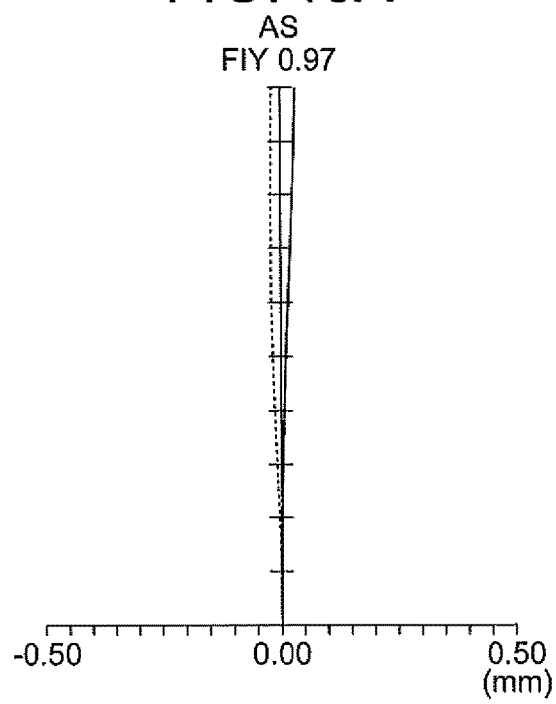
-0.50    0.00    0.50
              (mm)
FIG.46B
DT
FIY 0.97
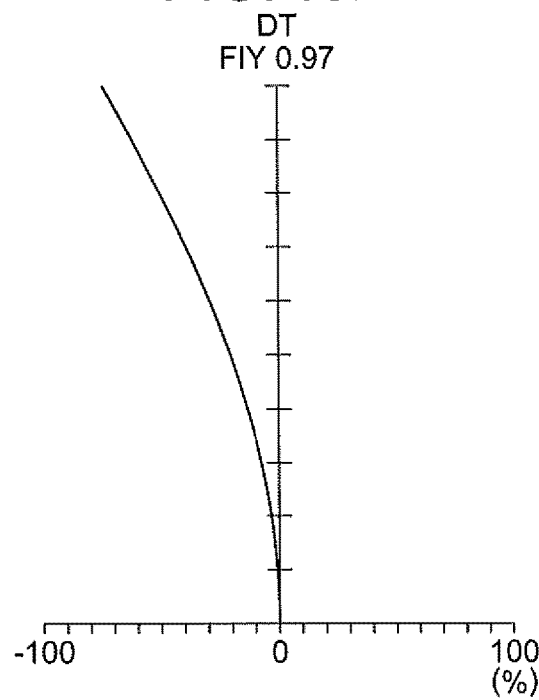
-100     0     100
              (%)
FIG.46C
Ta, IH 0
ey
FIG.46D
Sa, IH 0
ex
FIG.46E
Ta, IH 0.5
ey
FIG.46F
Sa, IH 0.5
ex
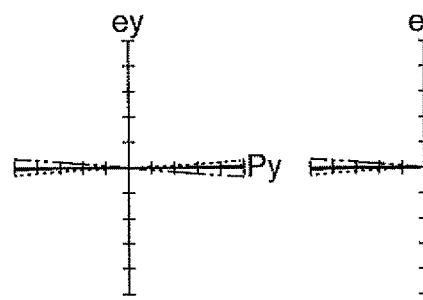 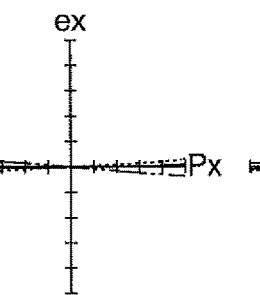 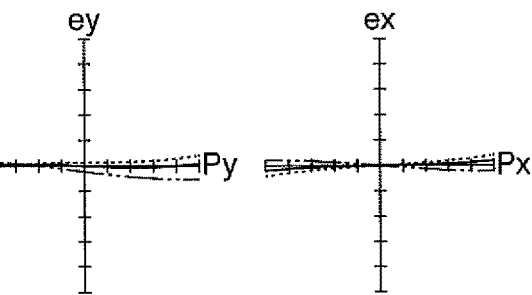 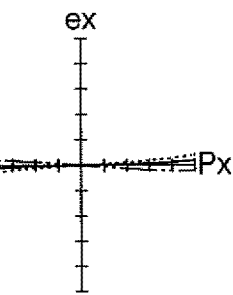
FIG.46G
Ta, IH 0.7
ey
FIG.46H
Sa, IH 0.7
ex
FIG.46I
Ta, IH 1.0
ey
FIG.46J
Sa, IH 1.0
ex
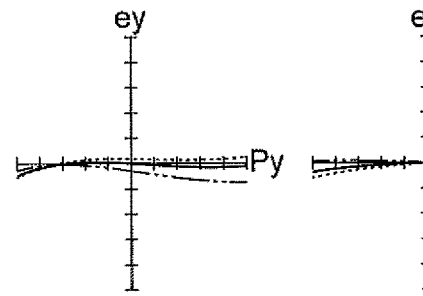 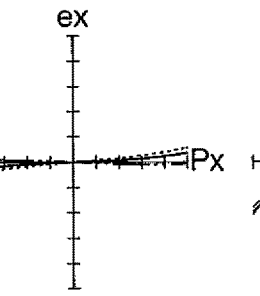 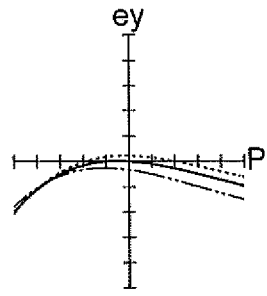 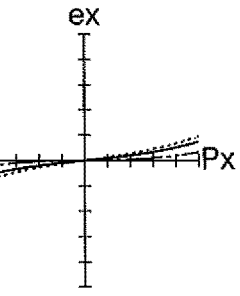

AS
FIY 0.97

-0.50    0.00    0.50
(mm)

DT
FIY 0.97

-100    0    100
(%)

Ta, IH 0

Sa, IH 0

Ta, IH 0.5

Sa, IH 0.5

Ta, IH 0.7

Sa, IH 0.7

Ta, IH 1.0

Sa, IH 1.0

AS
FIY 0.97

DT
FIY 0.97

Ta, IH 0

Sa, IH 0

Ta, IH 0.5

Sa, IH 0.5

Ta, IH 0.7

Sa, IH 0.7

Ta, IH 1.0

Sa, IH 1.0

AS
FIY 0.97

DT
FIY 0.97

Ta, IH 0

Sa, IH 0

Ta, IH 0.5

Sa, IH 0.5

Ta, IH 0.7

Sa, IH 0.7

Ta, IH 1.0

Sa, IH 1.0

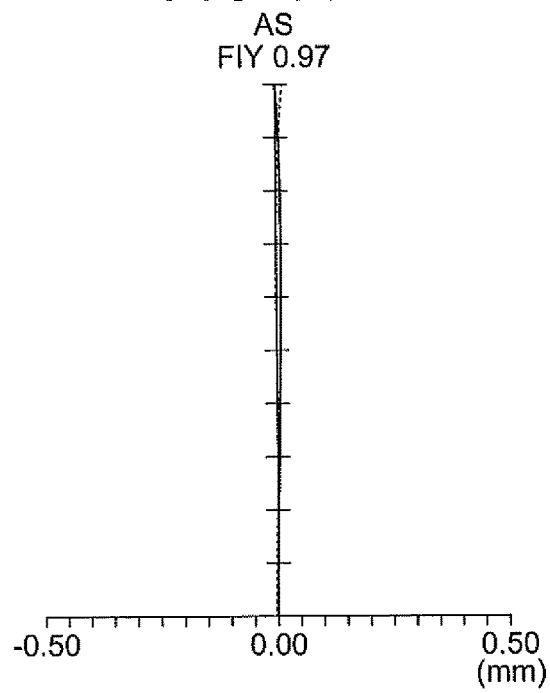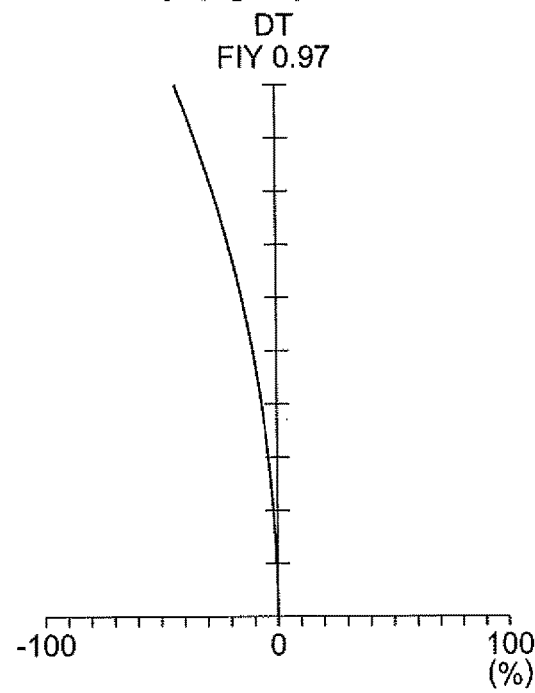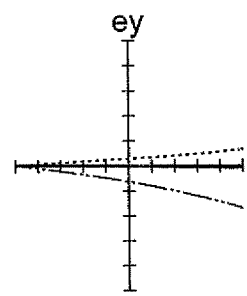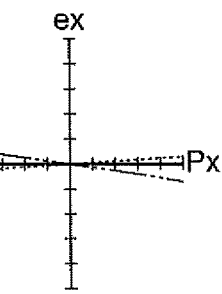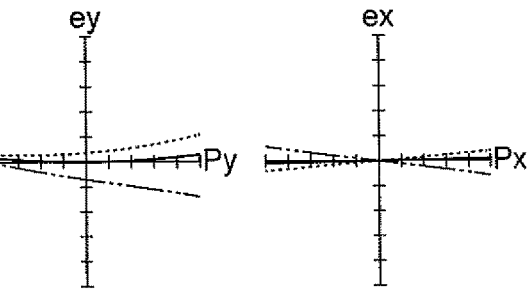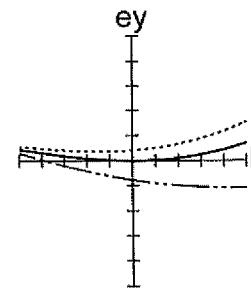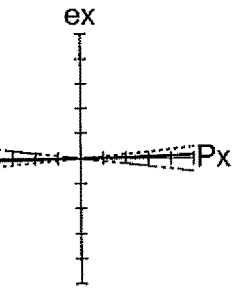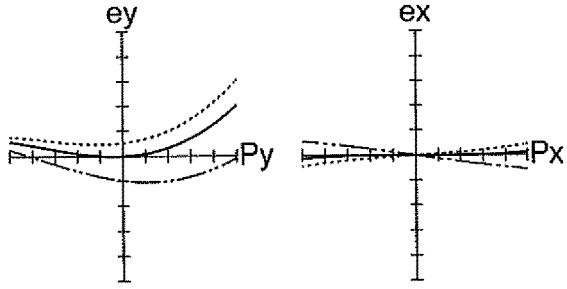

AS
FIY 1.32

DT
FIY 1.32

Ta, IH 0

Sa, IH 0

Ta, IH 0.5

Sa, IH 0.5

Ta, IH 0.7

Sa, IH 0.7

Ta, IH 1.0

Sa, IH 1.0

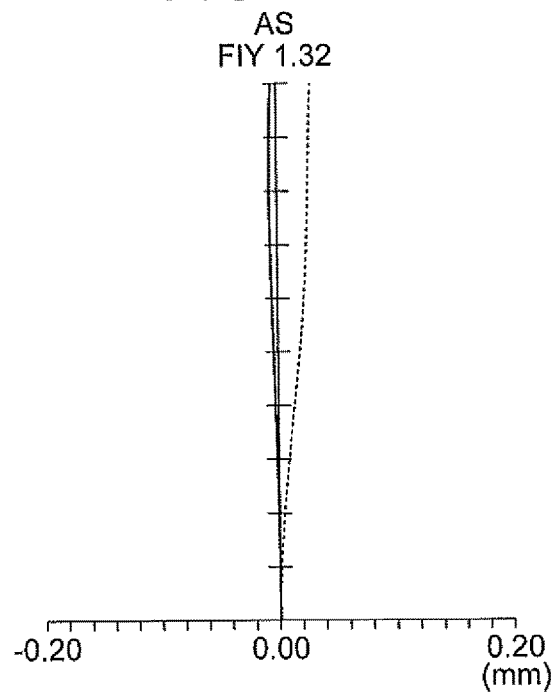
FIG.52A
AS
FIY 1.32
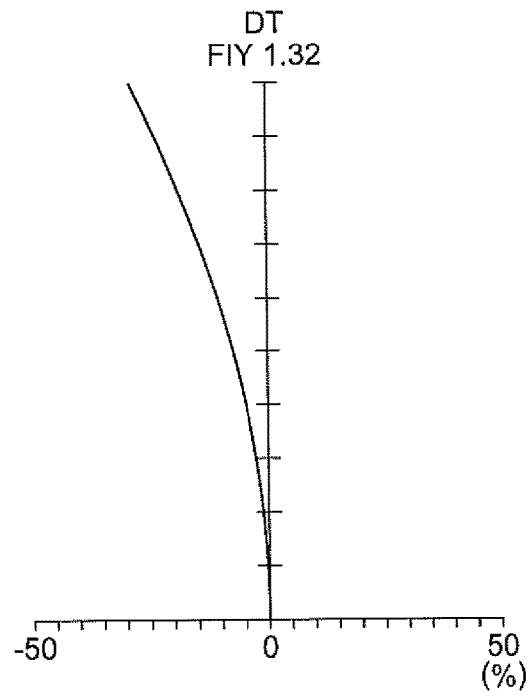
FIG.52B
DT
FIY 1.32
FIG.52C
Ta, IH 0
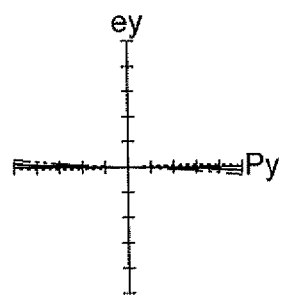
FIG.52D
Sa, IH 0
FIG.52E
Ta, IH 0.5
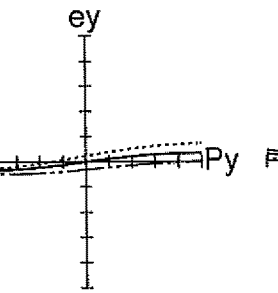
FIG.52F
Sa, IH 0.5
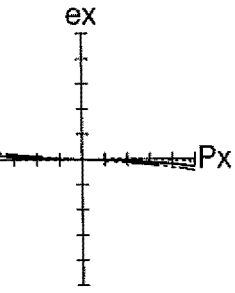
FIG.52G
Ta, IH 0.7
FIG.52H
Sa, IH 0.7
FIG.52I
Ta, IH 1.0
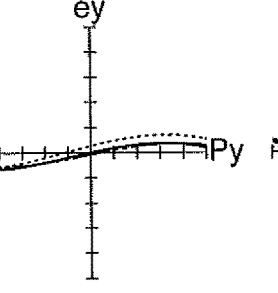
FIG.52J
Sa, IH 1.0
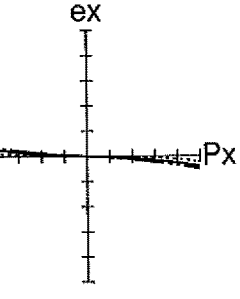

AS
FIY 1.32

DT
FIY 1.32

Ta, IH 0

Sa, IH 0

Ta, IH 0.5

Sa, IH 0.5

Ta, IH 0.7

Sa, IH 0.7

Ta, IH 1.0

Sa, IH 1.0

AS
FIY 1.32

DT
FIY 1.32

Ta, IH 0

Sa, IH 0

Ta, IH 0.5

Sa, IH 0.5

Ta, IH 0.7

Sa, IH 0.7

Ta, IH 1.0

Sa, IH 1.0

FIG.55A
AS
FIY 1.32
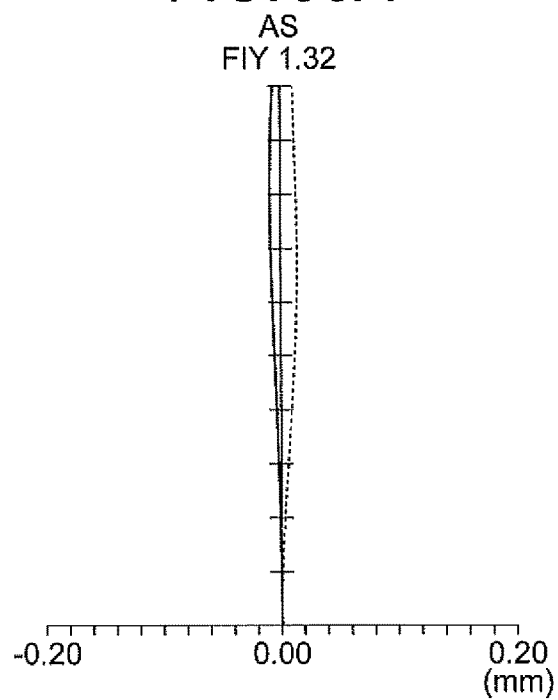
-0.20　　0.00　　0.20
(mm)
FIG.55B
DT
FIY 1.32
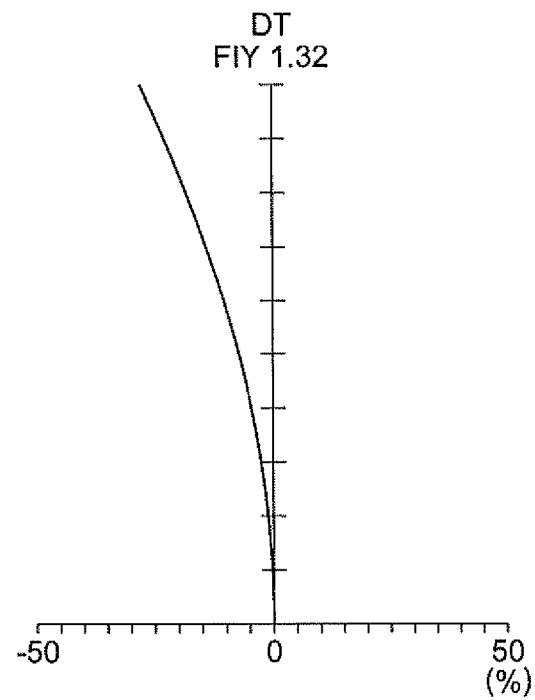
-50　　　0　　　50
(%)
FIG.55C
Ta, IH 0
ey
FIG.55D
Sa, IH 0
ex
FIG.55E
Ta, IH 0.5
ey
FIG.55F
Sa, IH 0.5
ex
FIG.55G
Ta, IH 0.7
ey
FIG.55H
Sa, IH 0.7
ex
FIG.55I
Ta, IH 1.0
ey
FIG.55J
Sa, IH 1.0
ex

AS
FIY 1.32

DT
FIY 1.32

Ta, IH 0
ey

Sa, IH 0
ex

Ta, IH 0.5
ey

Sa, IH 0.5
ex

Ta, IH 0.7
ey

Sa, IH 0.7
ex

Ta, IH 1.0
ey

Sa, IH 1.0
ex

OPTICAL SYSTEM FOR STEREOSCOPIC VISION AND ENDOSCOPE USING THE SAME

CROSS-REFERENCE TO RELATED APPLICATION

The present application is a continuation application of International Application No. PCT/JP2017/018392 filed on May 16, 2017, the entire contents of which are incorporated herein by reference.

BACKGROUND OF THE INVENTION

Field of the Invention

The present invention relates to an optical system for stereoscopic vision and an endoscope using the same.

Description of the Related Art

As a pupil distance varies for the same object point, an angle of convergence varies. As the angle of convergence varies, a stereoscopic vision (hereinafter, referred to as 'stereoscopic effect') varies. The angle of convergence is an angle made by a line of sight of a right eye and a line of sight of a left eye when the same object point is viewed.

An image pickup apparatus which generates an image that can be viewed stereoscopically is known. In this apparatus, an image for left eye and an image for the right eye are acquired.

In Japanese Patent Application Laid-open Publication No. 2012-113281, an apparatus which includes a pair of optical systems is disclosed. The pair of optical systems is arranged in parallel. A stop having an opening section is disposed in each optical system.

When the pair of optical systems is deemed as two eyes of a human being, a distance between the two opening sections, or in other words, a distance between the two stops is corresponds to a distance between pupils.

In the apparatus in Japanese Patent Application Laid-open Publication No. 2012-113281, light emerged from the same object point is incident on the pair of optical systems. Out of the light incident, a light ray passing through a center of the opening section corresponds to the line of sight. A light ray passing through the center of the opening section of one optical system and a light ray passing through the center of the opening section of the other optical system intersect at a position of the same object point. When an angle of intersection of these two lines of intersection is an inward angle, the inward angle corresponds to the angle of convergence.

In the apparatus in Japanese Patent Application Laid-open Publication No. 2012-113281, it is possible to vary the distance between the two stops. By varying the distance between the two stops, the inward angle varies. As a result, it is possible to vary the stereoscopic effect.

In Japanese Patent No. 3283084 Publication, an apparatus which includes a single optical system, a pupil divider, and a pupil-distance converter is disclosed. In the apparatus of Japanese Patent No. 3283084 Publication, an optical path of the single optical system is divided into two optical paths by the pupil divider. The pupil-distance converter is disposed in each optical path.

The pupil-distance converter is a stop having an opening section. In the apparatus of Japanese Patent No. 3283084 Publication, it is possible to vary a diameter of the opening section. As the diameter of the opening section varies, a distance between the two opening sections varies. Consequently, it is possible to vary the stereoscopic effect.

SUMMARY OF THE INVENTION

An optical system for stereoscopic vision according to at least some embodiments of the present invention comprises:
a first optical system, and
a second optical system, wherein
the first optical system and the second optical system are identical optical systems,
each of the first optical system and the second optical system includes in order from an object side, a front unit, a stop, and a rear unit having a positive refractive power,
each of the two font units includes a first negative lens,
the first negative lens is a lens positioned nearest to an object, among lenses in the front unit,
each of the two stops moves in a direction parallel to a plane including an optical axis of the first optical system and an optical axis of the second optical system,
both the stops move to be drawn away from a central axis or move to come closer to the central axis, and
the following conditional expressions (1) and (2) are satisfied:

$$-20.0 < FLFGn1/IH < -0.5 \quad (1)$$

$$1.5 < Ls/IH < 7.5 \quad (2)$$

where,
FLFGn1 denotes a focal length of the first negative lens,
IH denotes the maximum image height, and
Ls denotes a distance on an optical axis from a predetermined object-side surface up to the stop, and here
the predetermined object-side surface is an object-side surface of a lens positioned nearest to the object in the optical system for stereoscopic vision, and
the central axis is an axis positioned between the optical axis of the first optical system and the optical axis of the second optical system.

Moreover, another optical system for stereoscopic vision according to at least some embodiments of the present invention comprises:
a first optical system, and
a second optical system, wherein
the first optical system and the second optical system are identical optical systems,
each of the first optical system and the second optical system includes in order from an object side, a front unit, a stop, and a rear unit having a positive refractive power,
each of the two front units includes a first negative lens,
the first negative lens is a lens positioned nearest to an object among lenses in the front unit,
each of the two stops moves in a direction parallel to a plane including an optical axis of the first optical system and an optical axis of the second optical system,
both the stops move to be drawn away from a central axis or move to come closer to the central axis, and
the following conditional expressions (1) and (3) are satisfied:

$$-20.0 < FLFGn1/IH < -0.5 \quad (1)$$

$$0.25 < Ls/Ltotal < 0.58 \quad (3)$$

where,
FLFGn1 denotes a focal length of the first negative lens,
IH denotes the maximum image height, Ls denotes a distance on an optical axis from a predetermined object-side surface up to the stop, Ltotal denotes a distance on the optical axis from the predetermined object-side surface up to an image plane, and here the predetermined object-side surface is an object-side surface of a lens positioned nearest to the object in the optical system for stereoscopic vision, and the central axis is an axis positioned between the optical axis of the first optical system and the optical axis of the second optical system.

Moreover, an image pickup apparatus according to at least some embodiments of the present invention comprises:

an optical system, and an imager having an image pickup surface, which converts an image formed on the image pickup surface by the optical system to an electric signal, wherein the optical system is the abovementioned optical system for stereoscopic vision.

BRIEF DESCRIPTION OF THE DRAWINGS

FIG. 14A, FIG. 14B, FIG. 14C, FIG. 14D, FIG. 14E, FIG. 14F, FIG. 14G, FIG. 14H, FIG. 14I, and FIG. 14J are aberration diagrams of the optical system for stereoscopic vision of the example 1;

FIG. 15A, FIG. 15B, FIG. 15C, FIG. 15D, FIG. 15E, FIG. 15F, FIG. 15G, FIG. 15H, FIG. 15I, and FIG. 15J are aberration diagrams of the optical system for stereoscopic vision of the example 1;

FIG. 19A, FIG. 19B, FIG. 19C, FIG. 19D, FIG. 19E, FIG. 19F, FIG. 19G, FIG. 19H, FIG. 19I, and FIG. 19J are aberration diagrams of the optical system for stereoscopic vision of the example 2;

FIG. 23A, FIG. 23B, FIG. 23C, FIG. 23D, FIG. 23E, FIG. 23F, FIG. 23G, FIG. 23H, FIG. 23I, and FIG. 23J are aberration diagrams of the optical system for stereoscopic vision of the example 2;

FIG. 24A, FIG. 24B, FIG. 24C, FIG. 24D, FIG. 24E, FIG. 24F, FIG. 24G, FIG. 24H, FIG. 24I, and FIG. 24J are aberration diagrams of the optical system for stereoscopic vision of the example 3;

FIG. 25A, FIG. 25B, FIG. 25C, FIG. 25D, FIG. 25E, FIG. 25F, FIG. 25G, FIG. 25H, FIG. 25I, and FIG. 25J are aberration diagrams of the optical system for stereoscopic vision of the example 3;

FIG. 27A, FIG. 27B, FIG. 27C, FIG. 27D, FIG. 27E, FIG. 27F, FIG. 27G, FIG. 27H, FIG. 27I, and FIG. 27J are aberration diagrams of the optical system for stereoscopic vision of the example 3;

FIG. 29A, FIG. 29B, FIG. 29C, FIG. 29D, FIG. 29E, FIG. 29F, FIG. 29G, FIG. 29H, FIG. 29I, and FIG. 29J are aberration diagrams of the optical system for stereoscopic vision of the example 3;

FIG. 30A, FIG. 30B, FIG. 30C, FIG. 30D, FIG. 30E, FIG. 30F, FIG. 30G, FIG. 30H, FIG. 30I, and FIG. 30J are aberration diagrams of the optical system for stereoscopic vision of the example 4;

FIG. 31A, FIG. 31B, FIG. 31C, FIG. 31D, FIG. 31E, FIG. 31F, FIG. 31G, FIG. 31H, FIG. 31I, and FIG. 31J are aberration diagrams of the optical system for stereoscopic vision of the example 4;

FIG. 33A, FIG. 33B, FIG. 33C, FIG. 33D, FIG. 33E, FIG. 33F, FIG. 33G, FIG. 33H, FIG. 33I, and FIG. 33J are aberration diagrams of the optical system for stereoscopic vision of the example 4;

FIG. 35A, FIG. 35B, FIG. 35C, FIG. 35D, FIG. 35E, FIG. 35F, FIG. 35G, FIG. 35H, FIG. 35I, and FIG. 35J are aberration diagrams of the optical system for stereoscopic vision of the example 4;

FIG. 36A, FIG. 36B, FIG. 36C, FIG. 36D, FIG. 36E, FIG. 36F, FIG. 36G, FIG. 36H, FIG. 36I, and FIG. 36J are aberration diagrams of the optical system for stereoscopic vision of the example 5;

FIG. 37A, FIG. 37B, FIG. 37C, FIG. 37D, FIG. 37E, FIG. 37F, FIG. 37G, FIG. 37H, FIG. 37I, and FIG. 37J are aberration diagrams of the optical system for stereoscopic vision of the example 5;

FIG. 39A, FIG. 39B, FIG. 39C, FIG. 39D, FIG. 39E, FIG. 39F, FIG. 39G, FIG. 39H, FIG. 39I, and FIG. 39J are aberration diagrams of the optical system for stereoscopic vision of the example 5;

FIG. 40A, FIG. 40B, FIG. 40C, FIG. 40D, FIG. 40E, FIG. 40F, FIG. 40G, FIG. 40H, FIG. 40I, and FIG. 40J are aberration diagrams of the optical system for stereoscopic vision of the example 5;

FIG. 42A, FIG. 42B, FIG. 42C, FIG. 42D, FIG. 42E, FIG. 42F, FIG. 42G, FIG. 42H, FIG. 42I, and FIG. 42J are aberration diagrams of the optical system for stereoscopic vision of the example 6;

FIG. 46A, FIG. 46B, FIG. 46C, FIG. 46D, FIG. 46E, FIG. 46F, FIG. 46G, FIG. 46H, FIG. 46I, and FIG. 46J are aberration diagrams of the optical system for stereoscopic vision of the example 7;

FIG. 50A, FIG. 50B, FIG. 50C, FIG. 50D, FIG. 50E, FIG. 50F, FIG. 50G, FIG. 50H, FIG. 50I, and FIG. 50J are aberration diagrams of the optical system for stereoscopic vision of the example 7;

FIG. 52A, FIG. 52B, FIG. 52C, FIG. 52D, FIG. 52E, FIG. 52F, FIG. 52G, FIG. 52H, FIG. 52I, and FIG. 52J are aberration diagrams of the optical system for stereoscopic vision of the example 8;

FIG. 55A, FIG. 55B, FIG. 55C, FIG. 55D, FIG. 55E, FIG. 55F, FIG. 55G, FIG. 55H, FIG. 55I, and FIG. 55J are aberration diagrams of the optical system for stereoscopic vision of the example 8;

DETAILED DESCRIPTION OF THE INVENTION

Figure 1A:
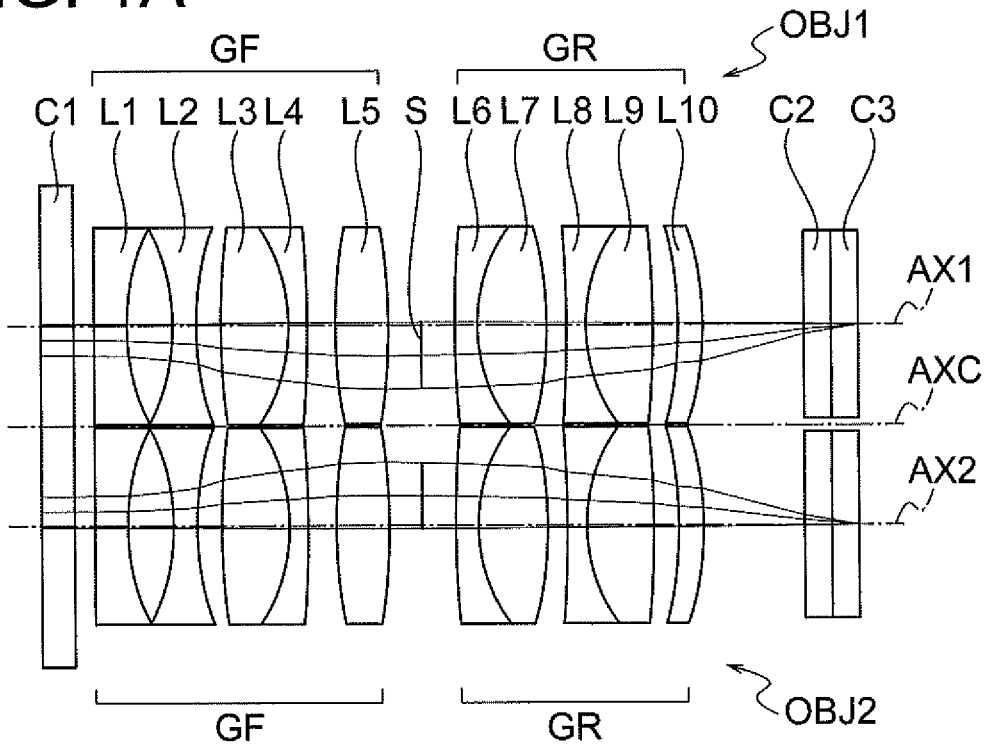
FIG. 1A and FIG. 1B are lens cross-sectional views of a first example of a common optical system.

Action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

An optical system for stereoscopic vision of a first embodiment and an optical system for stereoscopic vision of a second embodiment will be described below. Prior to the description, an optical system common to the optical system for stereoscopic vision of the two embodiments (hereinafter, referred to as 'common optical system') will be described below.

The common optical system includes a first optical system and a second optical system, and the first optical system and the second optical system are identical optical systems, each of the first optical system and the second optical system includes in order from an object side, a front unit, a stop, and a rear unit having a positive refractive power, each of the two front units includes a first negative lens, the first negative lens is a lens positioned nearest to an object, among lenses in the front unit, each of the two stops moves in a direction parallel to a plane including an optical axis of the first optical system and an optical axis of the second optical system, both the stops move to be drawn away from a central axis or move to come closer to the central axis, and the following conditional expression (1) is satisfied:

$$-20.0 < FLFGn1/IH < -0.5 \quad (1)$$

where,

FLFGn1 denotes a focal length of the first negative lens, IH denotes the maximum image height, and the central axis is an axis positioned between the optical axis of the first optical system and the optical axis of the second optical system.

The common optical system includes the first optical system and the second optical system. The first optical system and the second optical system are the identical optical systems. Accordingly, in the common optical system, two images of same size are formed. Moreover, the first optical system and the second optical system are disposed to be parallel. Consequently, there is a shift between the image formed by the first optical system and the image formed by the second optical system. Accordingly, it is possible to view stereoscopically by using these two images.

Each of the first optical system and the second optical system includes in order from the object side, the front unit, the stop, and the rear unit having a positive refractive power. Each of the two front units includes the first negative lens. The negative lens is a lens positioned nearest to the object, among the lenses in the front lens unit.

In the common optical system, the negative lens is disposed nearest to the object, among the lenses of the front unit. Accordingly, it is possible to realize an optical system having a wide angle of view.

Each of the two stops move in the direction parallel to the plane including the optical axis of the first optical system and the optical axis of the second optical system. At this time, the two stops move to be drawn away from the central axis or move to come closer to the central axis.

The central axis is an axis positioned between the optical axis of the first optical system and the optical axis of the second optical system. The first optical system and the second optical system are disposed such that a distance from the central axis up to the optical axis of the first optical system and a distance from the central axis up to the optical axis of the second optical system become equal.

As mentioned above, in the common optical system, the first optical system and the second optical system are disposed in parallel. Moreover, each of the first optical system and the second optical system includes the stop. In the stop, an opening section is provided. When the first optical system and the second optical system are deemed as human eyes, a distance between the two opening sections, or in other words, a distance between the two stops corresponds to a distance between pupils.

An angle of convergence is an angle made by a line of sight of a right eye and a line of sight of a left eye when the same object point is viewed. In the common optical system, light emerged from the same object point is incident on the first optical system and the second optical system. Out of the light incident, a light ray passing through a center of the opening section corresponds to the line of sight. A light ray passing through a center of the opening section of the first optical system and a light ray passing through a center of the opening section of the second optical system intersect at a position of the same object point. When an angle made by these two intersecting light rays is an inward angle, the inward angle corresponds to the angle of convergence.

As a pupil distance varies for the same object point, the angle of convergence varies. As the angle of convergence varies, a stereoscopic vision (hereinafter, referred to as 'stereoscopic effect') varies. Accordingly, the inward angle varies by moving of the two stops to be drawn away from the central axis or by the moving of the two stops to come closer to the central axis. As a result, it is possible to vary the stereoscopic effect.

In a case of falling below a lower limit value of conditional expression (1), a refractive power of the first negative lens becomes excessively small. In this case, it becomes difficult to widen an angle of view of the optical system. When an attempt is made to widen the angle of view of the optical system, the optical system has to be made large. Therefore, falling below the lower limit value of conditional expression (1) is not preferable.

In a case of exceeding an upper limit value of conditional expression (1), the refractive power of the first negative lens becomes excessively large. In this case, an off-axis aberration, particularly a coma and a distortion, occurs largely. Therefore, exceeding the upper limit value of conditional expression (1) is not preferable.

It is preferable that the two stops move in a direction orthogonal to the optical axis of the first optical system or in a direction substantially orthogonal to the optical axis of the first optical system. The first optical system and the second optical system being disposed in parallel, the optical axis of the first optical system and the optical axis of the second optical system are parallel. Accordingly, the direction in which the two stops move is a direction orthogonal to the optical axis of the second optical system or a direction substantially orthogonal to the optical axis of the second optical system.

In a case in which the two stops move in the direction substantially orthogonal to the optical axis of the first optical system, it is preferable that both the stops move toward the object side or both the stops move toward the image side.

Figure 1B:
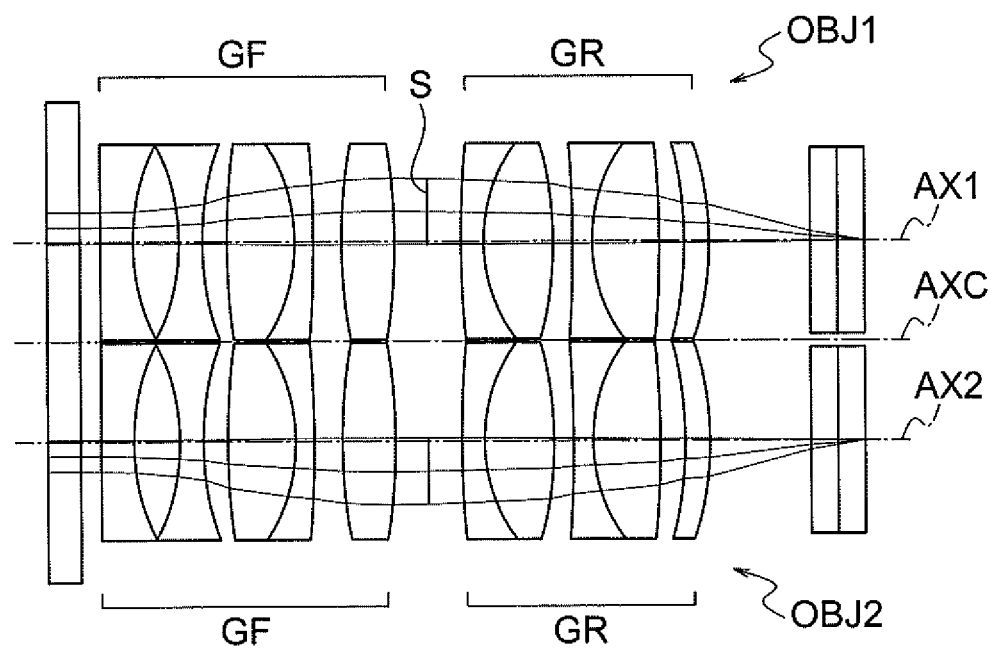

A specific arrangement of the common optical system will be shown. FIG. 1A and FIG. 1B are lens cross-sectional views of a first example of the common optical system. FIG. 1A shows a case in which the two stops move to come closer to the central axis. FIG. 1B shows a case in which the two stops move to be drawn away from the central axis. In FIG. 1A and FIG. 1B, the opening section of the stop is depicted by a straight line. Similar is a case in other diagrams.

The common optical system includes a first optical system OBJ1 and a second optical system OBJ2. A central axis AXC is positioned between an optical axis AX1 of the first optical system OBJ1 and an optical axis AX2 of the second optical system OBJ2. The first optical system OBJ1 and the second optical system OBJ2 are disposed symmetrically about the central axis AXC.

Both the first optical system OBJ1 and the second optical system OBJ2 include in order from an object side, a front unit GF, a stop S, and a rear unit GR having a positive refractive power.

The front unit GF includes a planoconcave negative lens L1, a biconcave negative lens L2, a biconvex positive lens L3, a negative meniscus lens L4 having a convex surface directed toward an image side, and a biconvex positive lens L5. The rear unit GR includes a negative meniscus lens L6 having a convex surface directed toward the object side, a biconvex positive lens L7, a biconcave negative lens L8, a biconvex positive lens L9, and a positive meniscus lens L10 having a convex surface directed toward the image side. The positive meniscus lens L10 is positioned near the biconvex positive lens L9.

The stop S is disposed between the biconvex positive lens L5 and the negative meniscus lens L6. A cover glass C1 is disposed on the object side of the planoconcave negative lens L1. A cover glass C2 and a cover glass C3 are disposed on the image side of the positive meniscus lens L10.

In the common optical system, both the stops move together. In FIG. 1A, the stop S of the first optical system OBJ1 and the stop S of the second optical system OBJ2 are positioned between the optical axis AX1 and the optical axis AX2. When a space between the optical axis AX1 and the optical axis AX2 is an inner side, in FIG. 1B, the stop S of the first optical system OBJ1 is positioned at an outer side of the optical axis AX1 and the stop S of the second optical system OBJ2 is positioned at an outer side of the optical axis AX2.

Figure 2A:
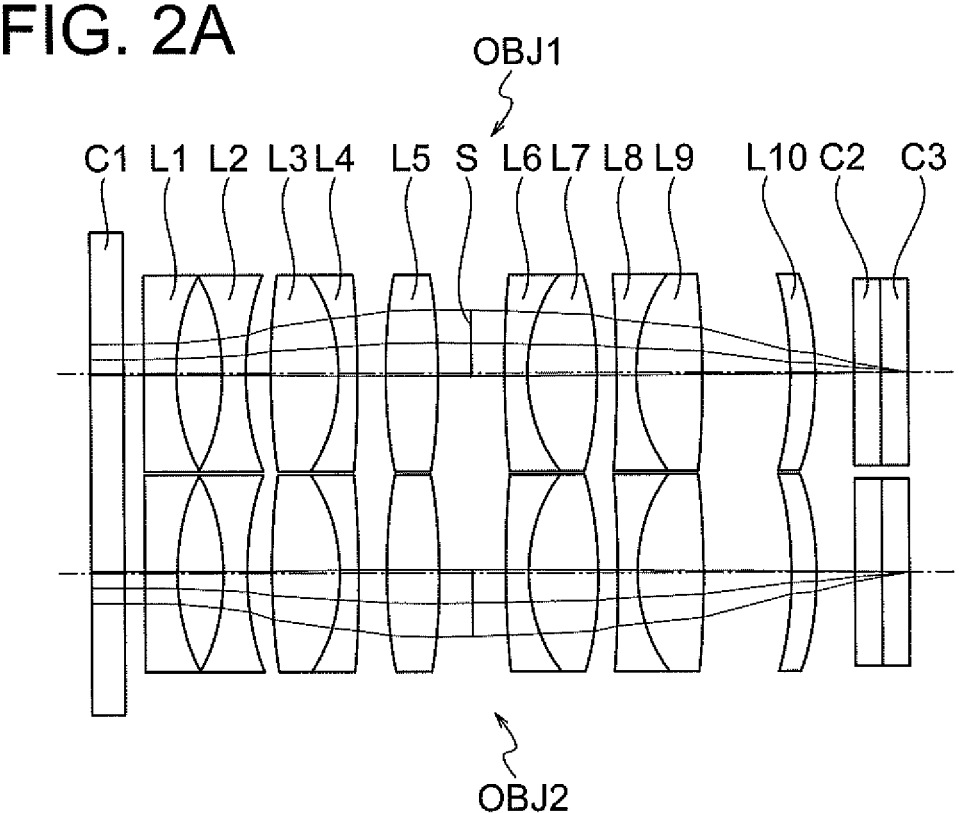
FIG. 2A and FIG. 2B are lens cross-sectional views of a second example of the common optical system.
Figure 2B:
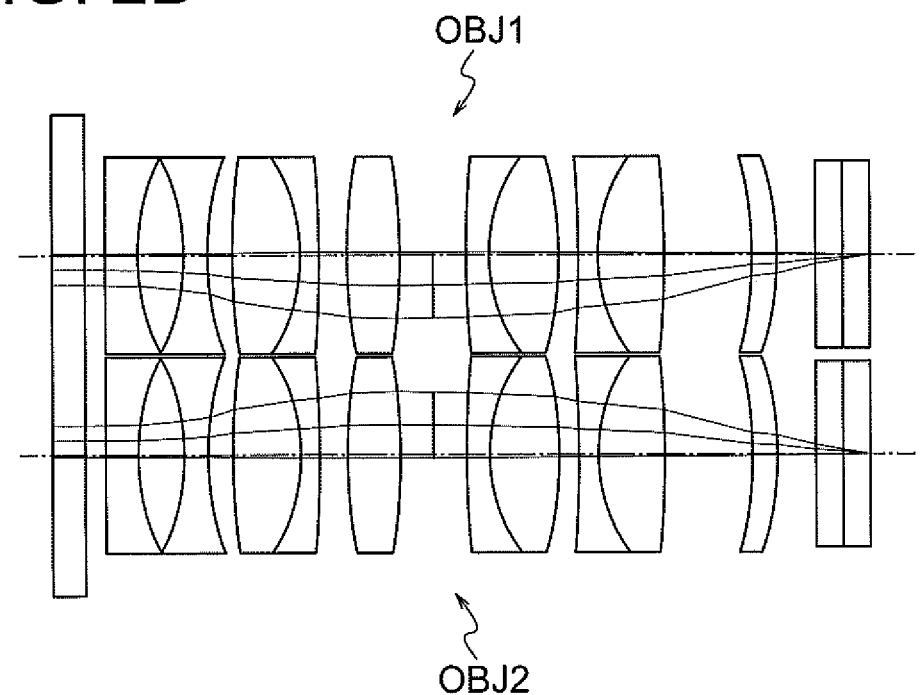

FIG. 2A and FIG. 2B are lens cross-sectional views of a second example of the common optical system. FIG. 2A shows a case in which the two stops move to be drawn away from the central axis. FIG. 2B shows a case in which the two stops move to come closer to the central axis.

The common optical system of the second example includes lenses same as in the common optical system of the first example. A point of difference from the common optical system of the first example is a position of the positive meniscus lens L10. In the common optical system of the second example, the positive meniscus lens L10 is positioned near the cover glass C2. Therefore, a focal length of the common optical system of the second example differs from a focal length of the common optical system of the first example.

In this case, an object distance when an image is formed differs for the common optical system of the first example and the common optical system of the second example. Therefore, it is possible to form an image of an object positioned at a close distance by the common optical system of the first example and to form an image of an object positioned at a long distance by the common optical system of the second example.

In the optical system of the second example, the two stops move together. In FIG. 2A, the stop S of the first optical system OBJ1 is positioned at an outer side of the optical axis AX1, and the stop S of the second optical system OBJ2 is positioned at an outer side of the optical axis AX2. In FIG. 2B, the stop S of the first optical system OBJ1 and the stop S of the second optical system OBJ2 are positioned at an inner side.

An optical system for stereoscopic vision of a first embodiment includes the abovementioned common optical system, and the following conditional expression (2) is satisfied:

$$1.5 < Ls/IH < 7.5 \quad (2)$$

where,

Ls denotes a distance on an optical axis from a predetermined object-side surface up to the stop, IH denotes the maximum image height, and the predetermined object-side surface is an object-side surface of a lens positioned nearest to the object in the optical system for stereoscopic vision.

In a case of falling below a lower limit value of conditional expression (2), a distance from the predetermined object-side surface up to the stop becomes excessively short. In other words, the stop is positioned on the object side of a preferable position. In this case, in spite of satisfying conditional expression (1), it becomes difficult to widen the angle of view. When an attempt is made to widen the angle of view, the optical system has to be made large.

Moreover, it becomes difficult to secure a favorable aberration correction and an adequate F-number. When an attempt is made to secure an adequate F-number, a spherical aberration and the coma are deteriorated. Therefore, falling below the lower limit value of conditional expression (2) is not preferable.

In a case of exceeding an upper limit value of conditional expression (2), the distance from the predetermined object-side surface up to the stop becomes excessively long. In other words, the stop is positioned on the image side of the preferable position. In this case, in spite of satisfying conditional expression (1), a diameter of a lens positioned on the object side, among the lenses of the front unit, becomes large.

Moreover, a distance between an entrance pupil and the stop becomes excessively long. As the distance between the entrance pupil and the stop becomes excessively long, an effect of adjustment of the stereoscopic effect by moving of the stop becomes small. Therefore, exceeding the upper limit value of conditional expression (2) is not preferable.

An optical system for stereoscopic vision of a second embodiment includes the abovementioned common optical system, and satisfies the following conditional expression (3):

$$0.25 < Ls/Ltotal < 0.58 \quad (3)$$

where,

Ls denotes the distance on the optical axis from the predetermined object-side surface up to the stop, Ltotal denotes a distance on the optical axis from the predetermined object-side surface up to an image plane, and the predetermined object-side surface is the object-side surface of the lens positioned nearest to the object in the optical system for stereoscopic vision.

A technical significance of conditional expression (3) is same as the technical significance of conditional expression (2).

In the optical system for stereoscopic vision of the first embodiment and the optical system for stereoscopic vision of the second embodiment (hereinafter, referred to as 'the optical system for stereoscopic vision of the present embodiment'), it is preferable that each of the two rear units include a focusing lens, and the two focusing lenses move in a direction along the optical axis.

For instance, to capture a minute variation in a height at a surface to be observed, it is necessary to improve a depth resolution of an optical system. For achieving a high depth resolution, it is necessary to secure an adequate F-number. However, when the adequate F-number is secured, a depth of field becomes shallow. As a result, it becomes difficult to observe a wide range from a near point up to a far point in a focused state.

The optical system for stereoscopic vision of the present embodiment includes a focusing lens which moves in a direction along an optical axis. Therefore, it is possible to focus over a wide range from the near point to the far point.

Moreover, the focusing lens is disposed in the rear unit. By making such arrangement, it is possible to maintain appropriately a distance on the optical axis from the predetermined object-side surface up to the stop. As a result, it is possible to achieve an effect of adjusting the stereoscopic effect by the movement of the stop.

In the optical system for stereoscopic vision, there is an optical system having an optical element other than a lens disposed nearest to the object in the optical system for stereoscopic vision. Even with such optical system, by disposing the focusing lens in the rear unit, it is possible to maintain appropriately the distance on the optical axis from an object-side surface of the optical element up to the stop. As a result, it is possible to achieve the effect of adjusting the stereoscopic effect by the movement of the stop.

When the abovementioned distance is not secured appropriately, it is not possible to achieve the effect of adjusting the stereoscopic effect by the movement of the stop.

Figure 3A:
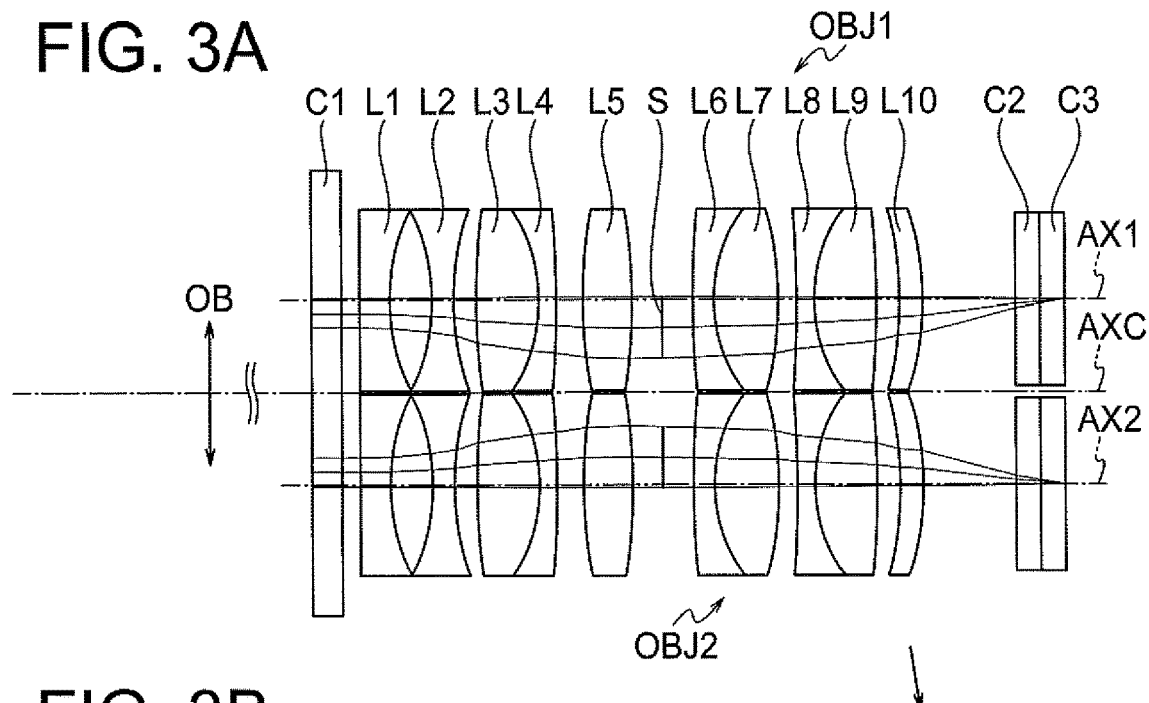
FIG. 3A, FIG. 3B, and FIG. 3C are lens cross-sectional views of a third example of the common optical system.
Figure 3B:
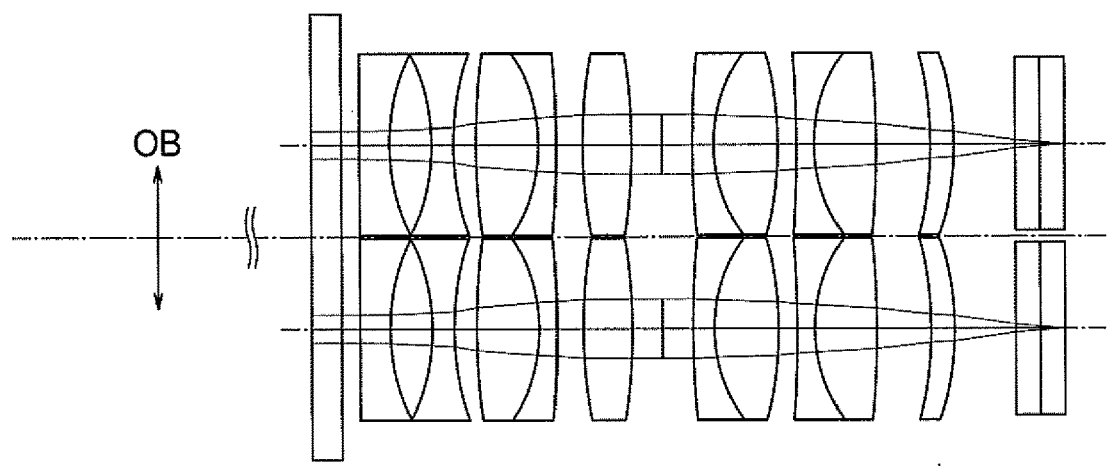
Figure 3C:
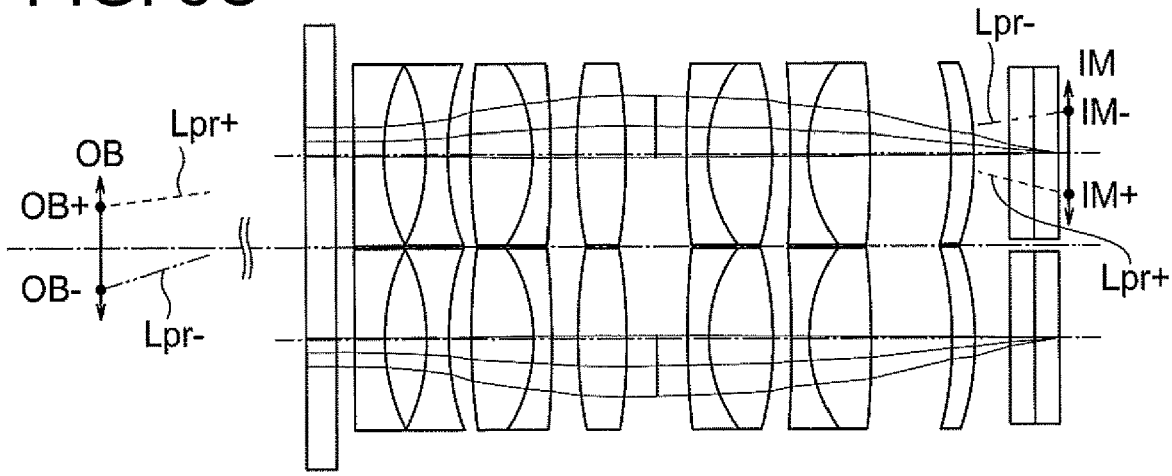
Figure 4A:
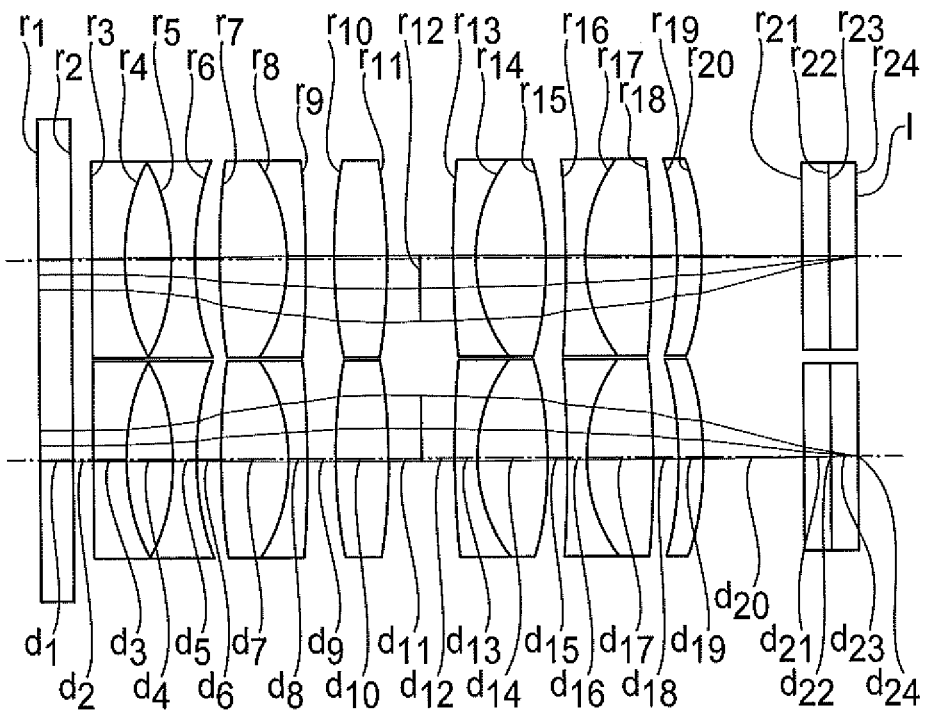
FIG. 4A and FIG. 4B are lens cross-sectional views of an optical system for stereoscopic vision of an example 1.
Figure 4B:
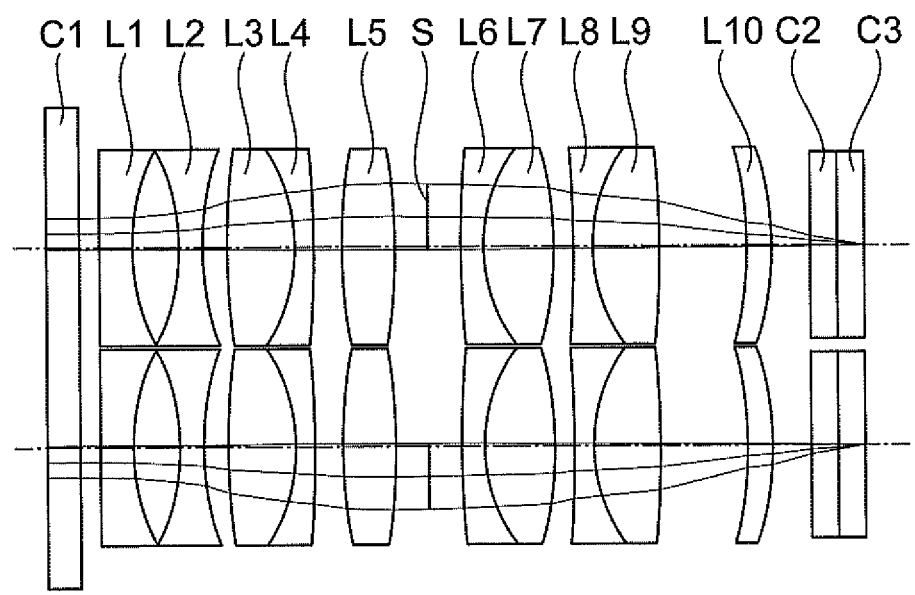
Figure 5A:
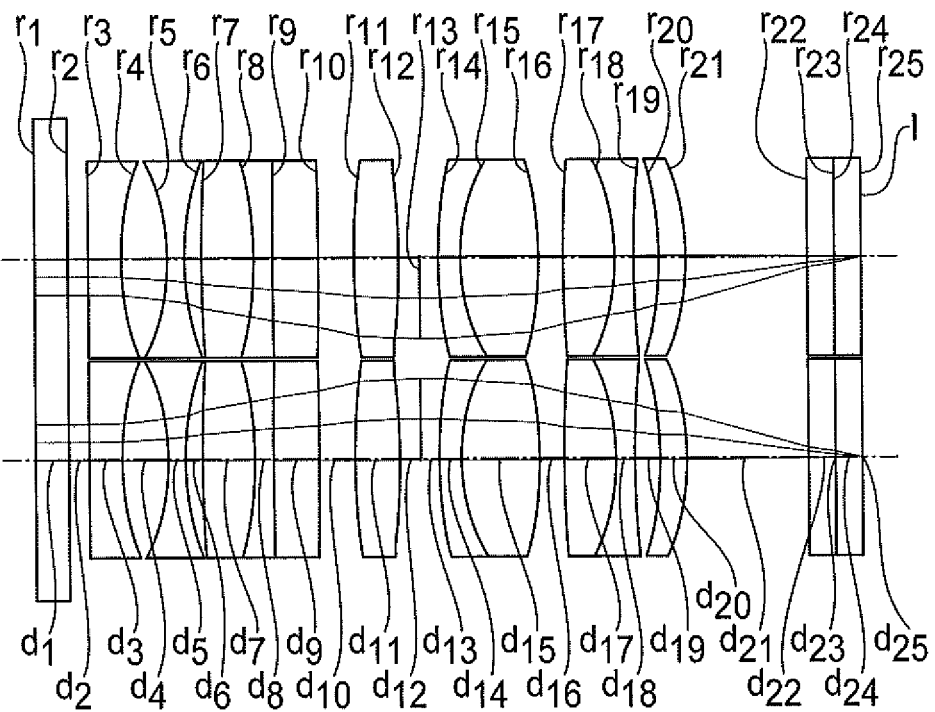
FIG. 5A and FIG. 5B are lens cross-sectional views of an optical system for stereoscopic vision of an example 2.
Figure 5B:
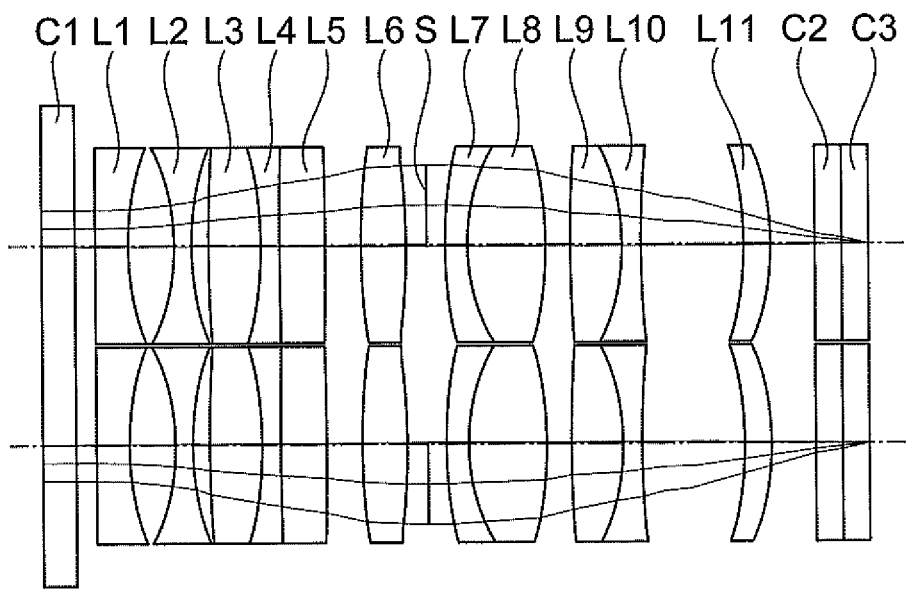
Figure 6A:
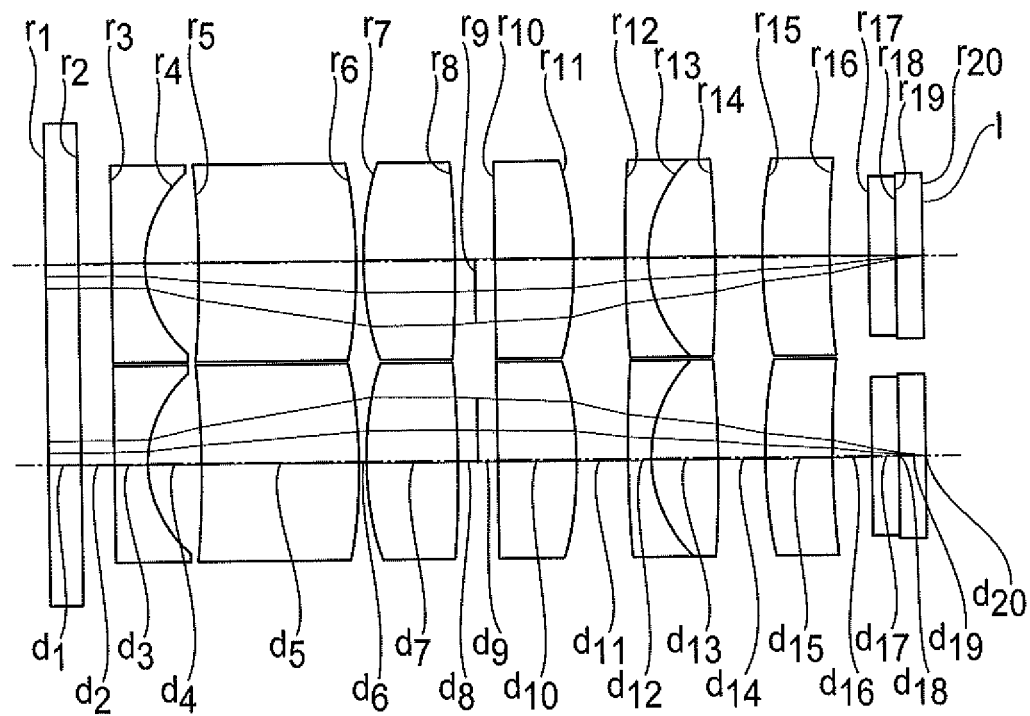
FIG. 6A and FIG. 6B are lens cross-sectional views of an optical system for stereoscopic vision of an example 3.
Figure 6B:
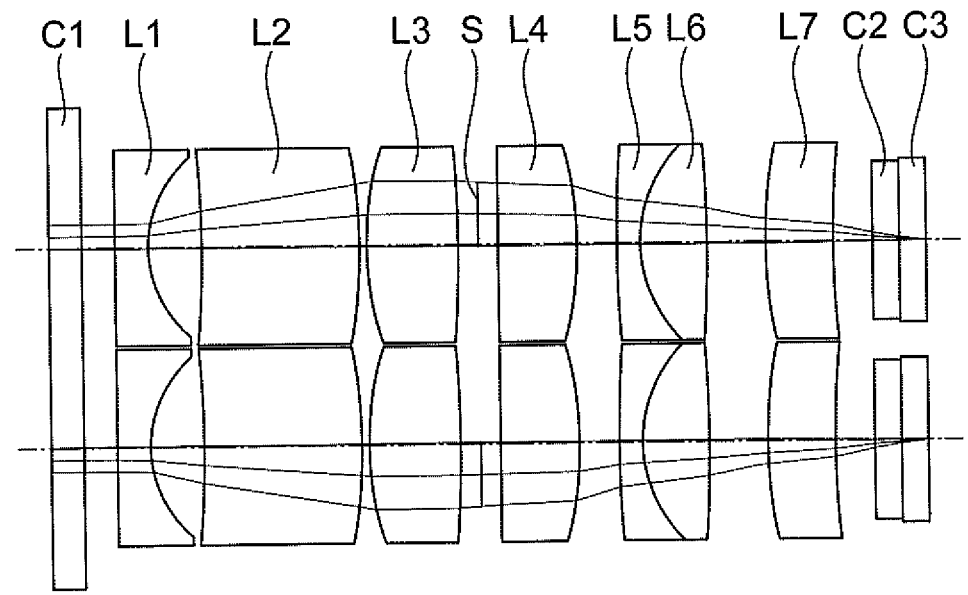
Figure 7A:
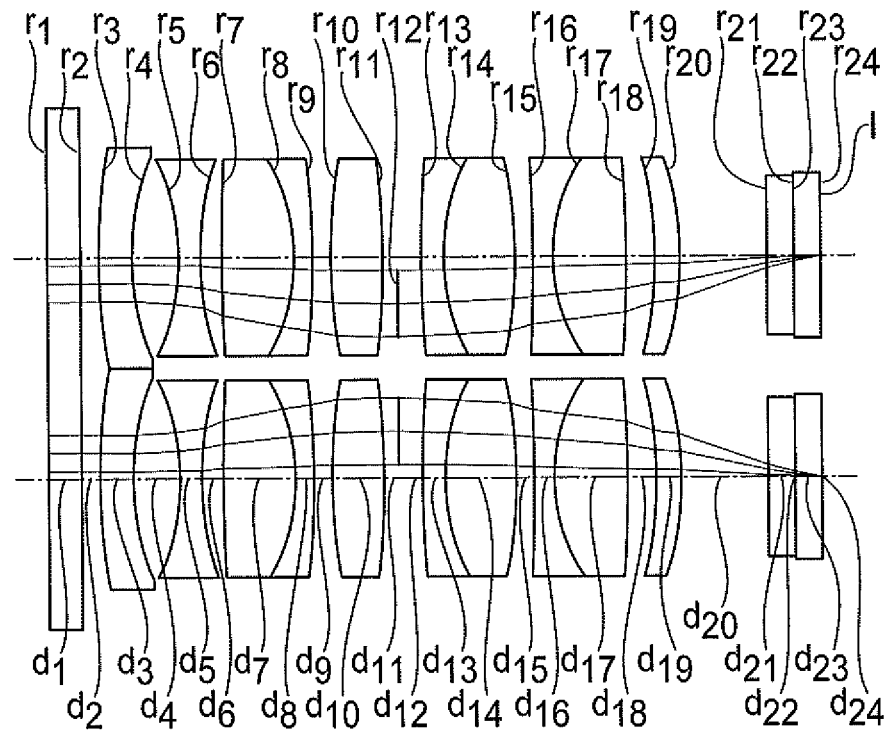
FIG. 7A and FIG. 7B are lens cross-sectional views of an optical system for stereoscopic vision of an example 4.
Figure 7B:
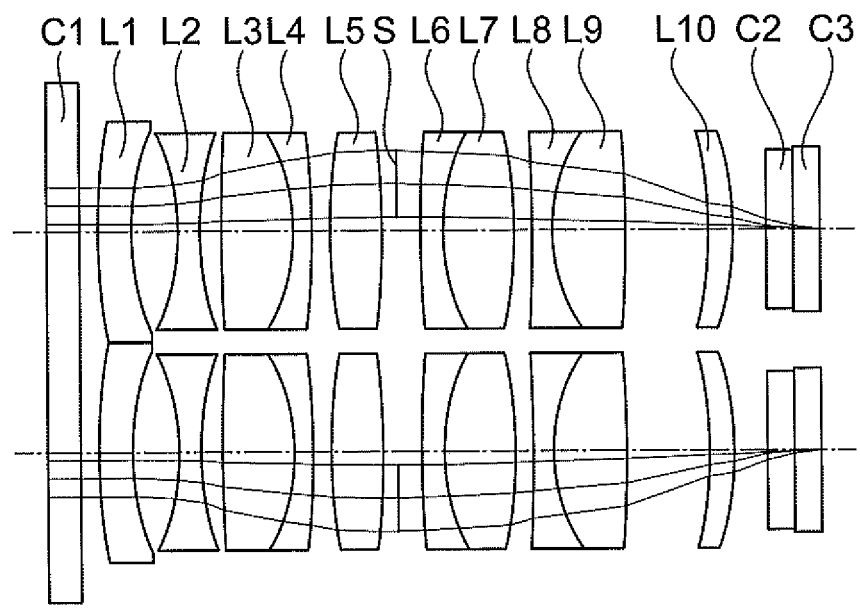
Figure 8A:
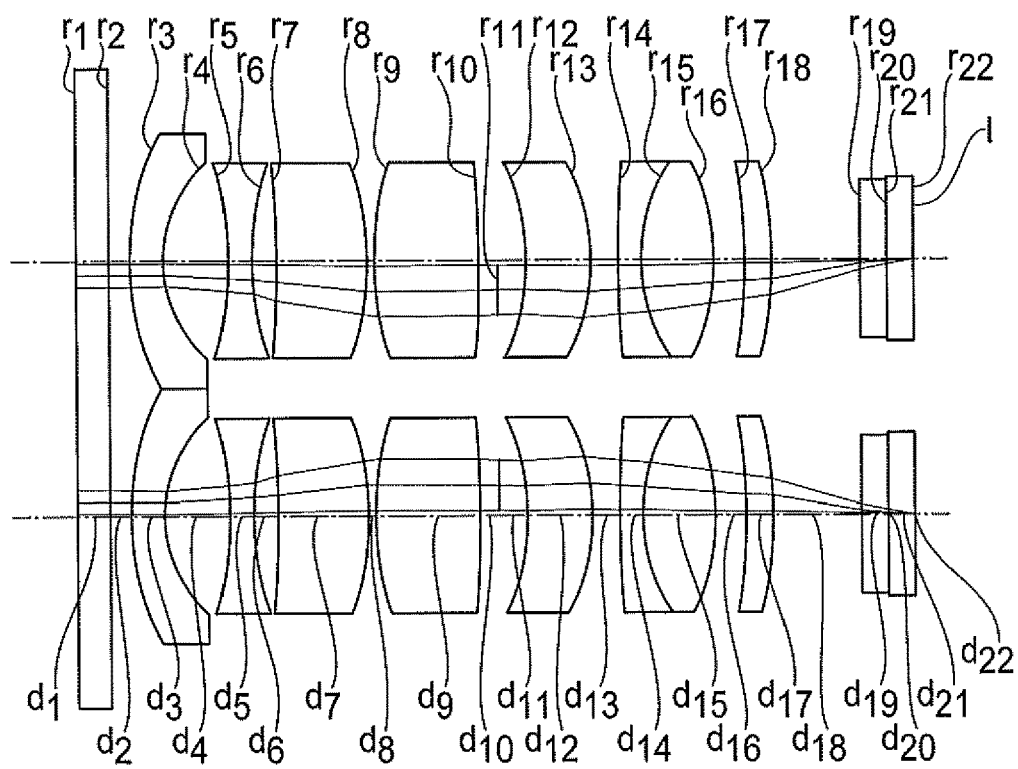
FIG. 8A and FIG. 8B are lens cross-sectional views of an optical system for stereoscopic vision of an example 5.
Figure 8B:
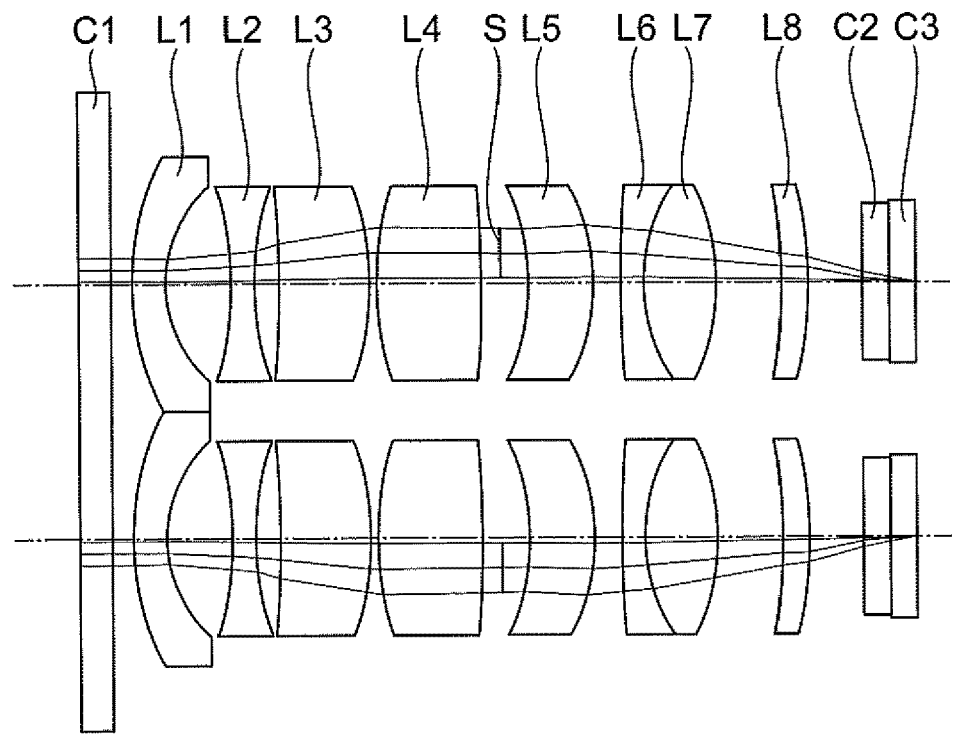
Figure 9:
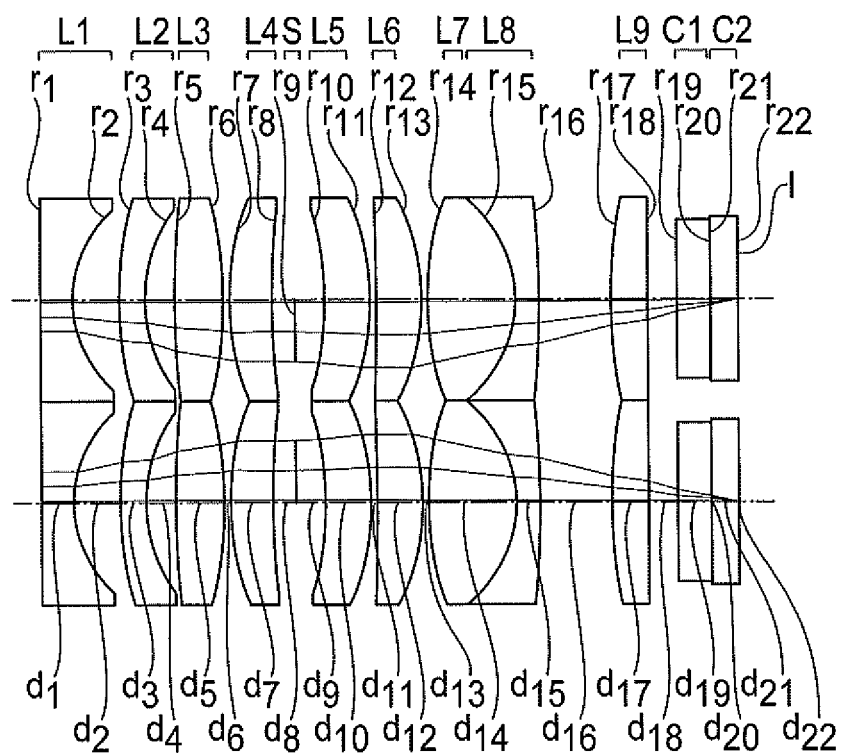
FIG. 9 is lens cross-sectional views of an optical system for stereoscopic vision of an example 6.
Figure 10A:
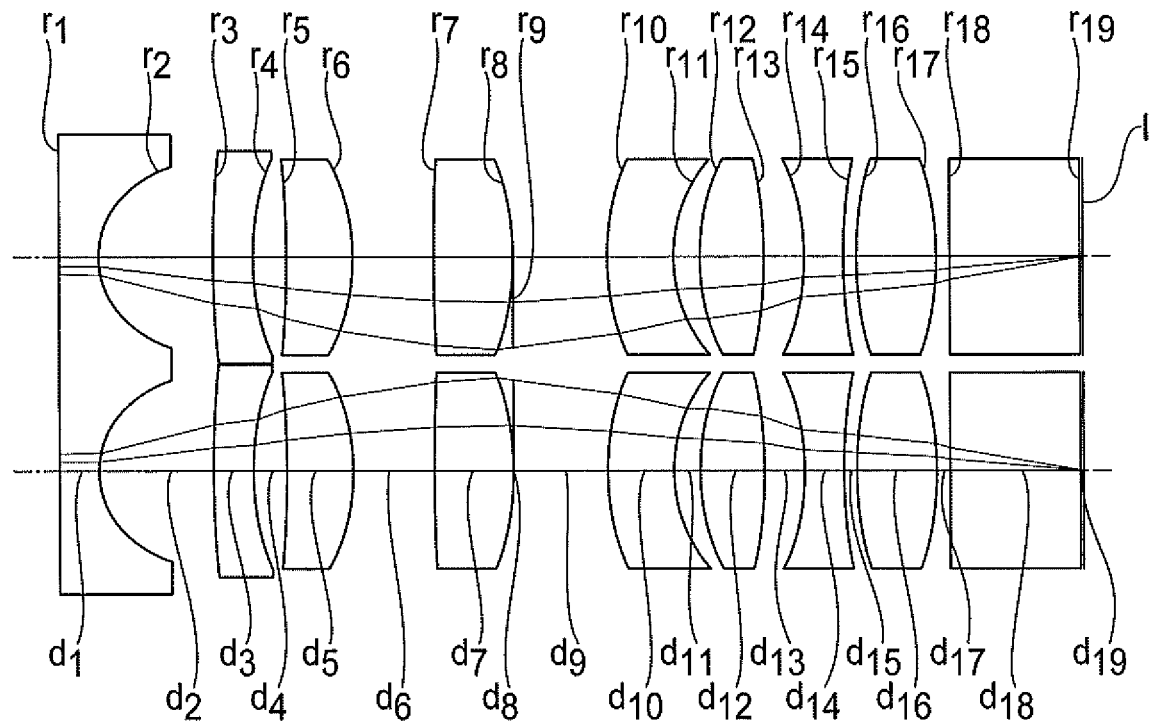
FIG. 10A and FIG. 10B are lens cross-sectional views of an optical system for stereoscopic vision of an example 7.
Figure 10B:
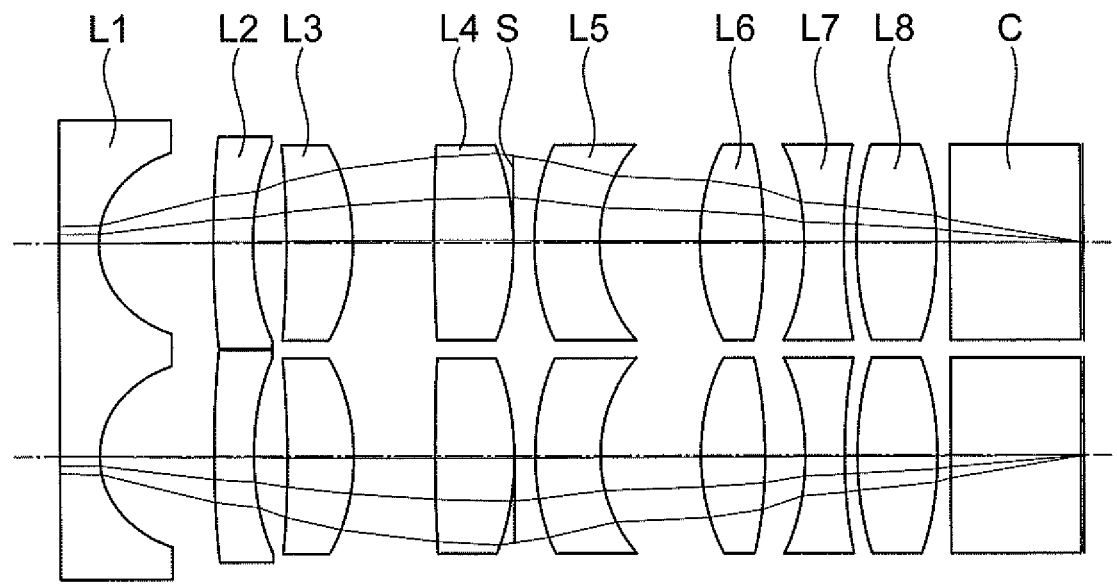
Figure 11A:
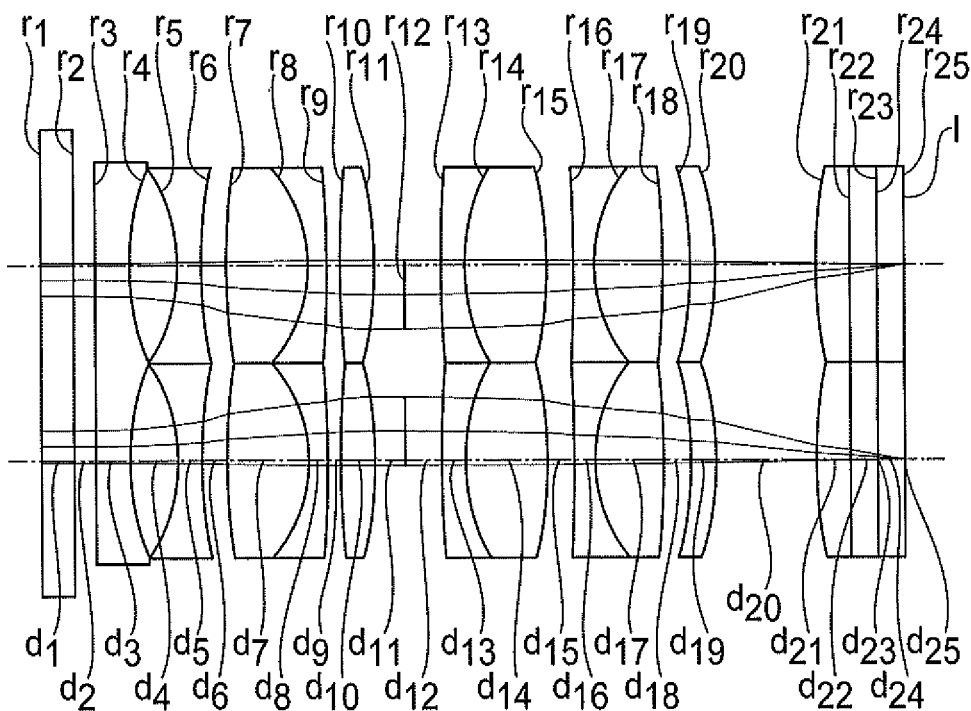
FIG. 11A and FIG. 11B are lens cross-sectional views of an optical system for stereoscopic vision of an example 8.
Figure 11B:
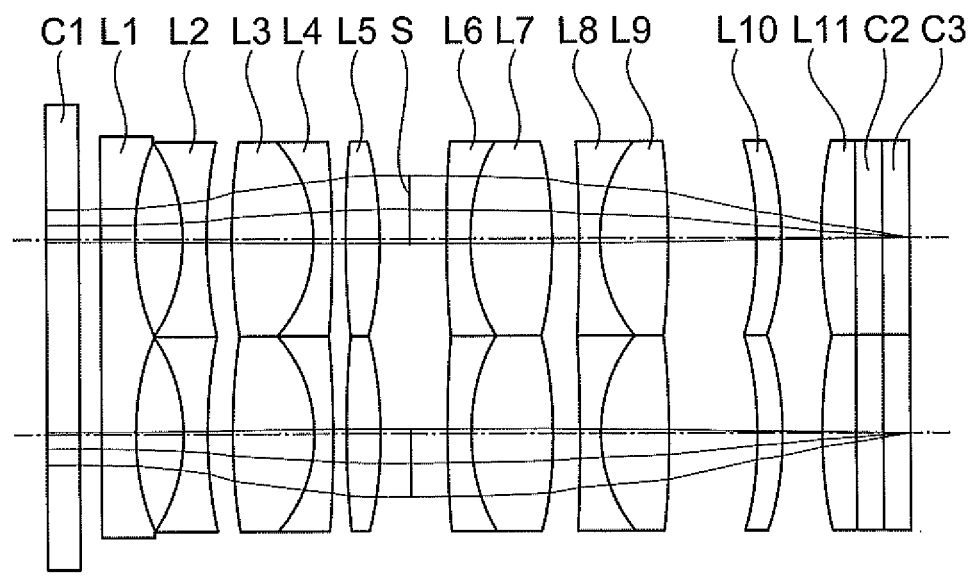
Figure 12A:
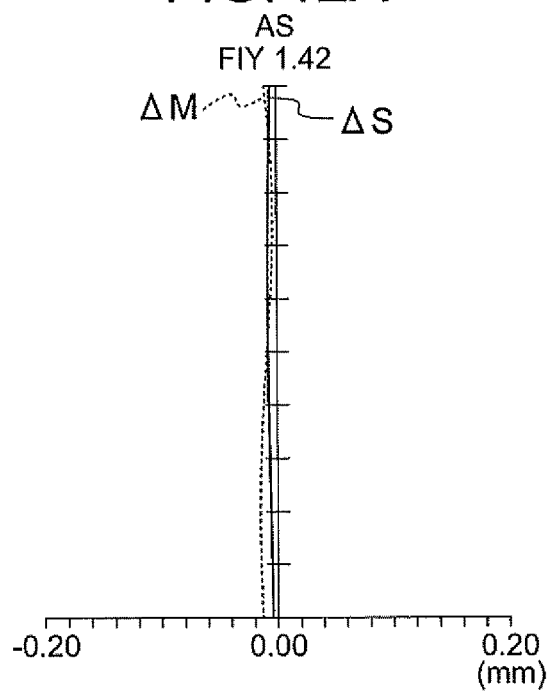
FIG. 12A, FIG. 12B, FIG. 12C, FIG. 12D, FIG. 12E, FIG. 12F, FIG. 12G, FIG. 12H, FIG. 12I, and FIG. 12J are aberration diagrams of the optical system for stereoscopic vision of the example 1.
Figure 12B:
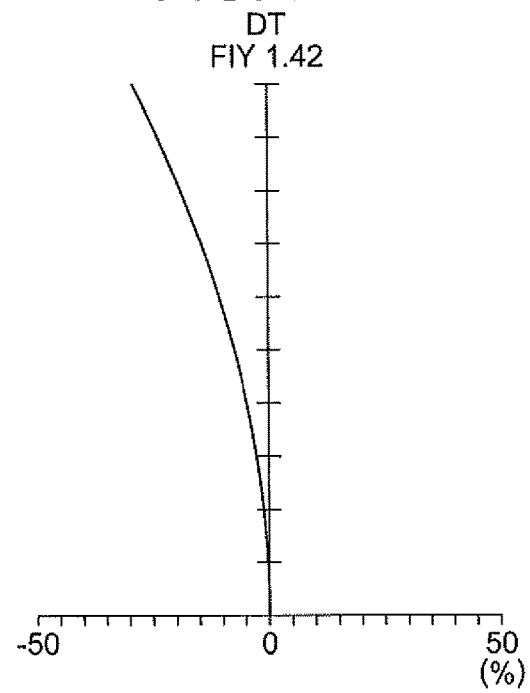
Figure 12C:
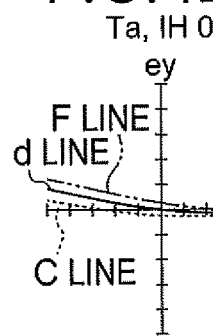
Figure 12D:
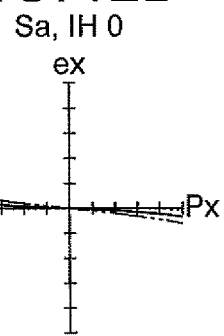
Figure 12E:
Figure 12F:
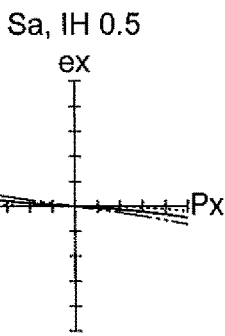
Figure 12G:
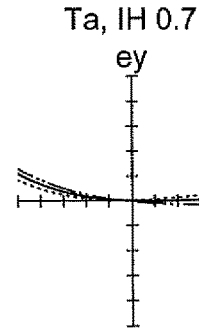
Figure 12H:
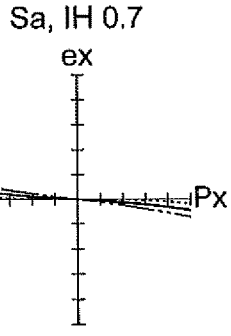
Figure 12I:
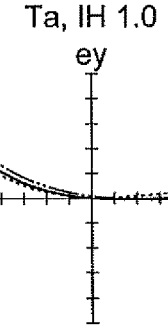
Figure 12J:
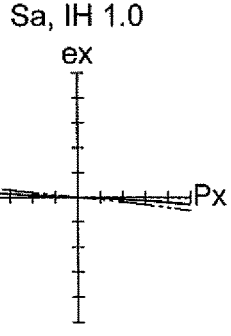
Figure 13A:
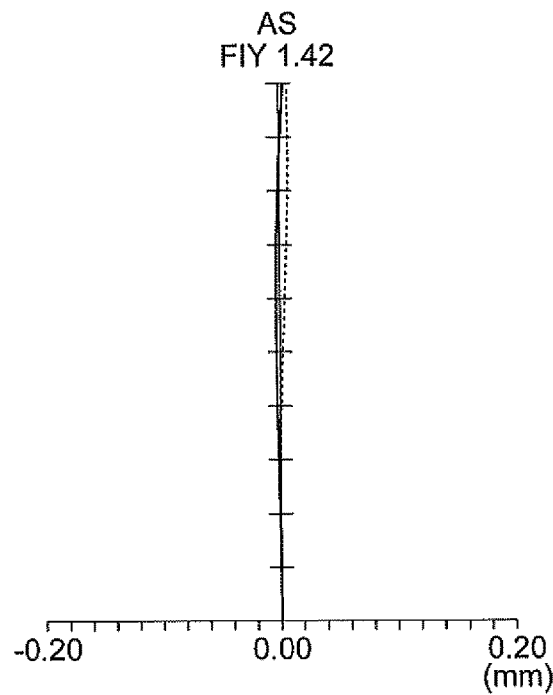
FIG. 13A, FIG. 13B, FIG. 13C, FIG. 13D, FIG. 13E, FIG. 13F, FIG. 13G, FIG. 13H, FIG. 13I, and FIG. 13J are aberration diagrams of the optical system for stereoscopic vision of the example 1.
Figure 13B:
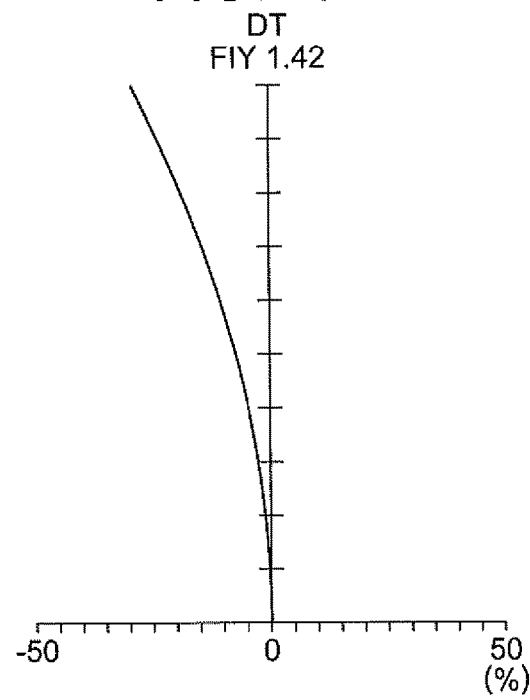
Figure 13C:
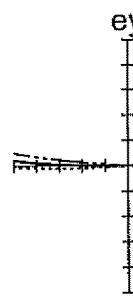
Figure 13D:
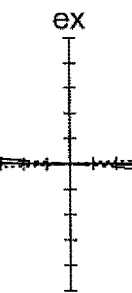
Figure 13E:
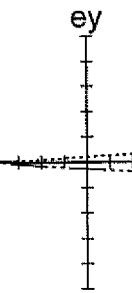
Figure 13F:
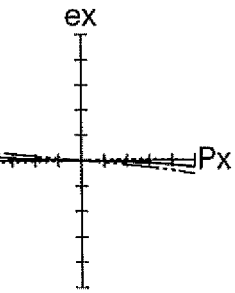
Figure 13G:
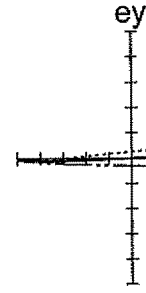
Figure 13H:
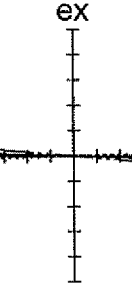
Figure 13I:
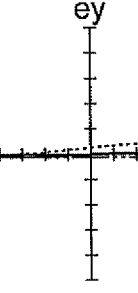
Figure 13J:
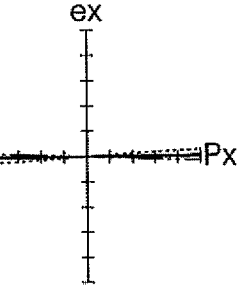
Figure 16A:
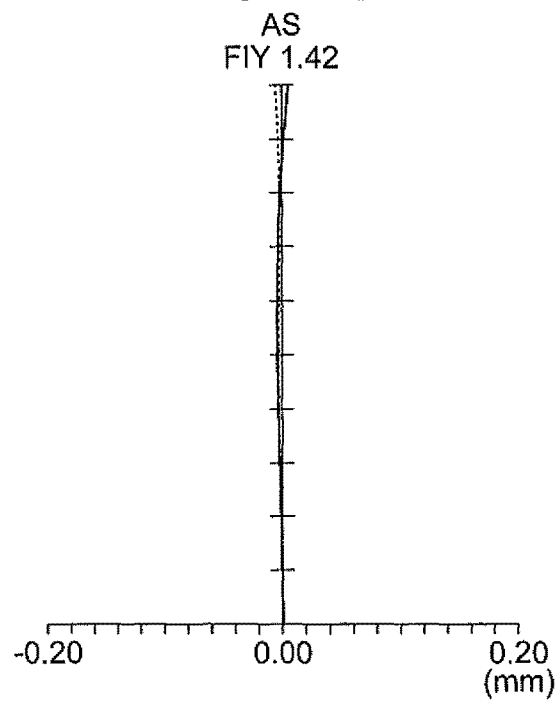
FIG. 16A, FIG. 16B, FIG. 16C, FIG. 16D, FIG. 16E, FIG. 16F, FIG. 16G, FIG. 16H, FIG. 16I, and FIG. 16J are aberration diagrams of the optical system for stereoscopic vision of the example 1.
Figure 16B:
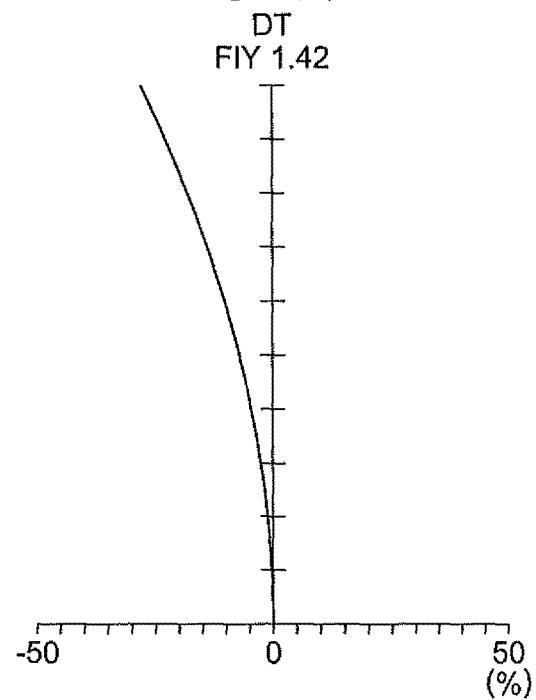
Figure 16C:
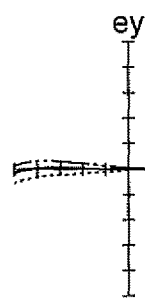
Figure 16D:
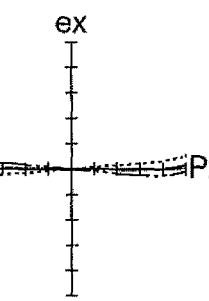
Figure 16E:
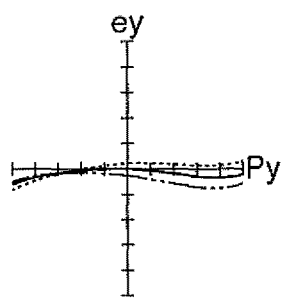
Figure 16F:
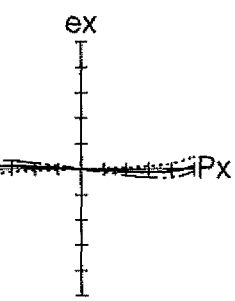
Figure 16G:
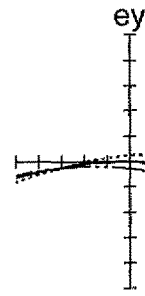
Figure 16H:
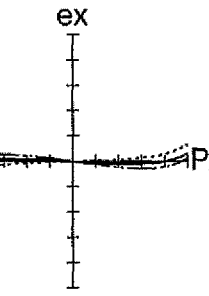
Figure 16I:
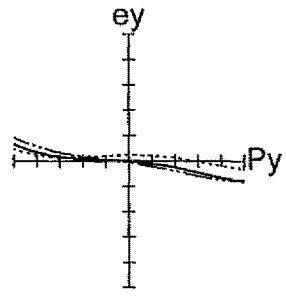
Figure 16J:
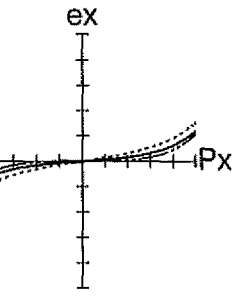
Figure 17A:
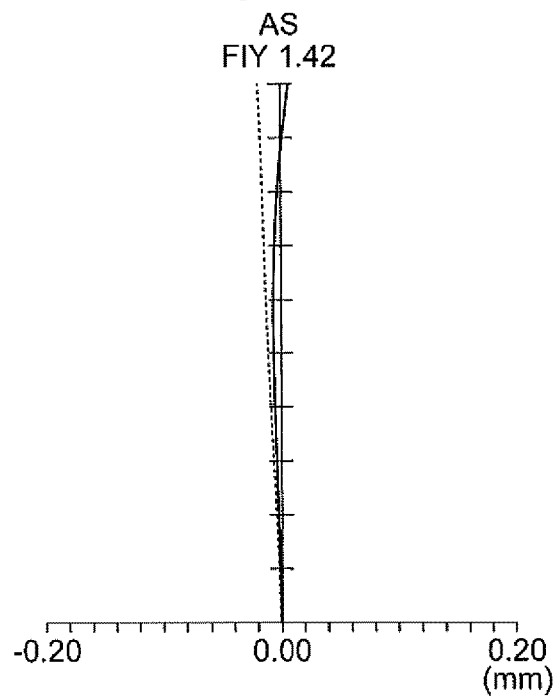
FIG. 17A, FIG. 17B, FIG. 17C, FIG. 17D, FIG. 17E, FIG. 17F, FIG. 17G, FIG. 17H, FIG. 17I, and FIG. 17J are aberration diagrams of the optical system for stereoscopic vision of the example 1.
Figure 17B:
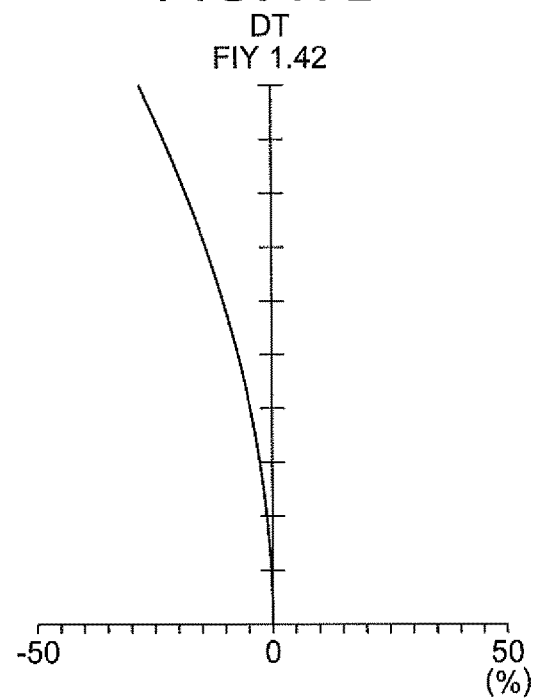
Figure 17C:
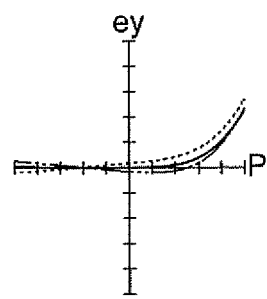
Figure 17D:
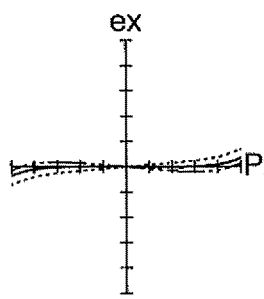
Figure 17E:
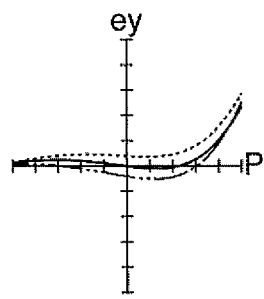
Figure 17F:
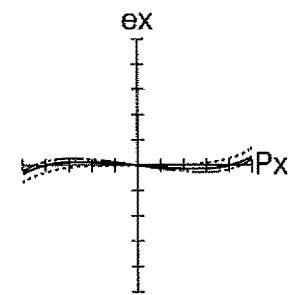
Figure 17G:
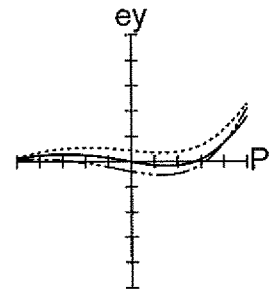
Figure 17H:
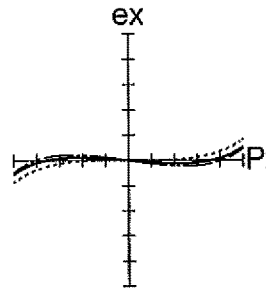
Figure 17I:
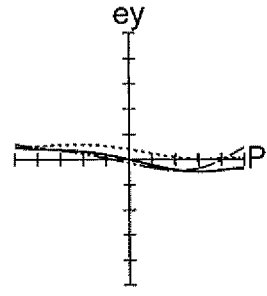
Figure 17J:
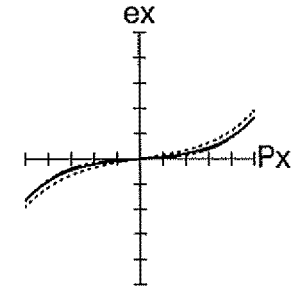
Figure 18A:
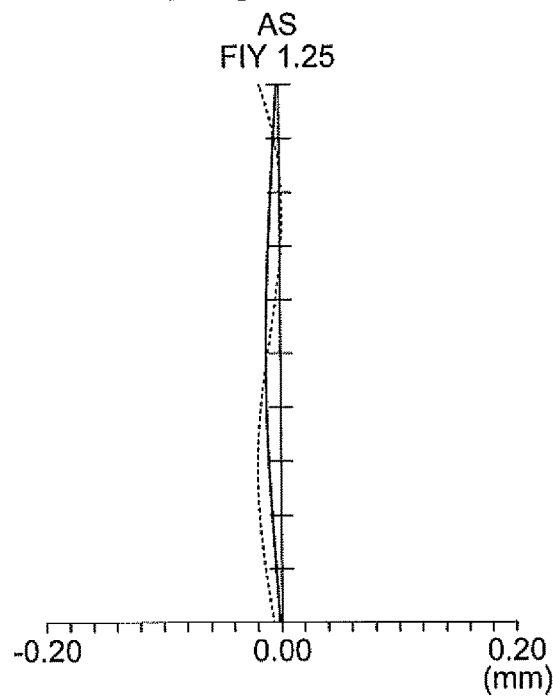
FIG. 18A, FIG. 18B, FIG. 18C, FIG. 18D, FIG. 18E, FIG. 18F, FIG. 18G, FIG. 18H, FIG. 18I, and FIG. 18J are aberration diagrams of the optical system for stereoscopic vision of the example 2.
Figure 18B:
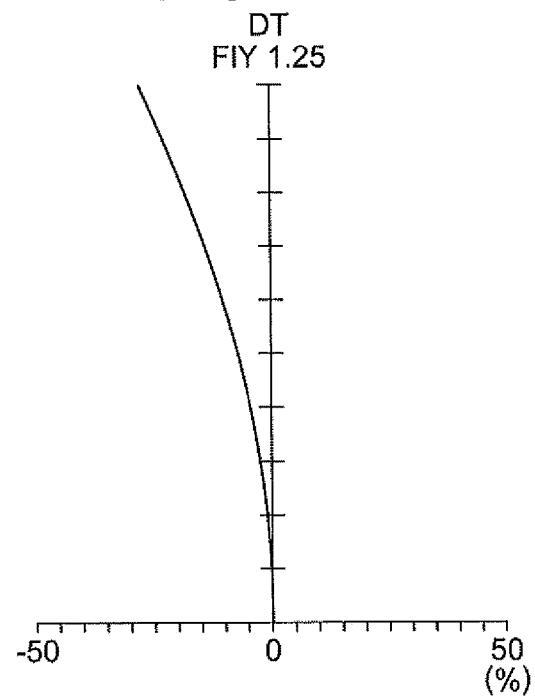
Figure 18C:
Figure 18D:
Figure 18E:
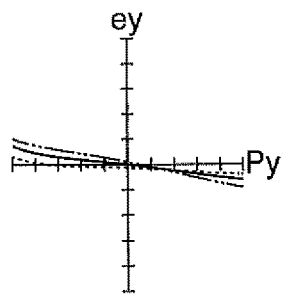
Figure 18F:
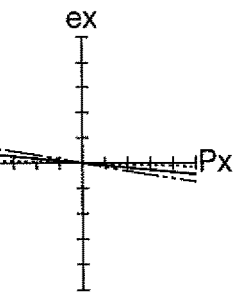
Figure 18G:
Figure 18H:
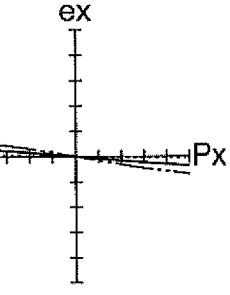
Figure 18I:
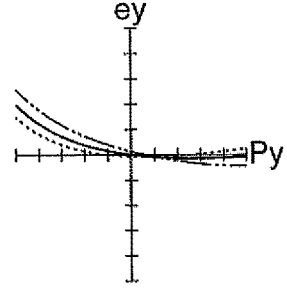
Figure 18J:
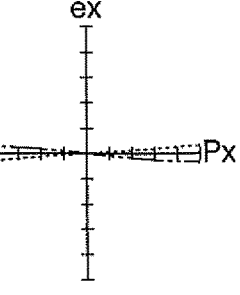
Figure 20A:
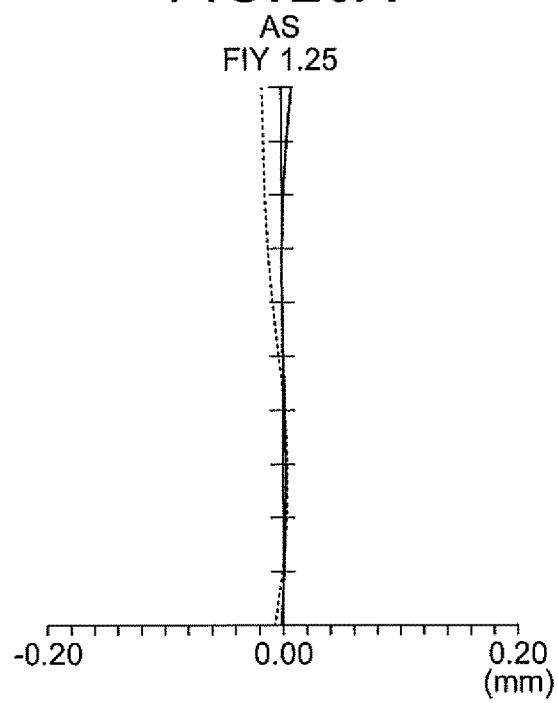
FIG. 20A, FIG. 20B, FIG. 20C, FIG. 20D, FIG. 20E, FIG. 20F, FIG. 20G, FIG. 20H, FIG. 20I, and FIG. 20J are aberration diagrams of the optical system for stereoscopic vision of the example 2.
Figure 20B:
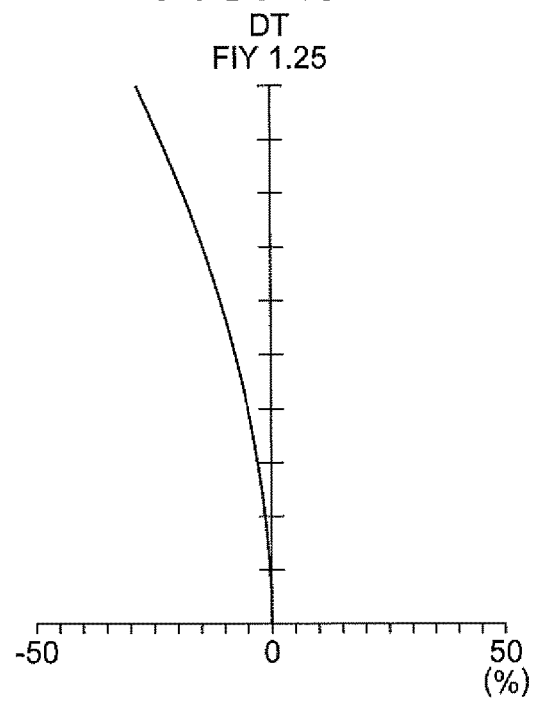
Figure 20C:
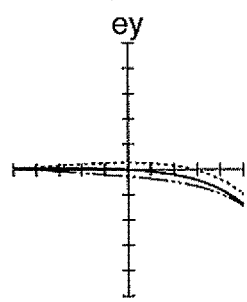
Figure 20D:
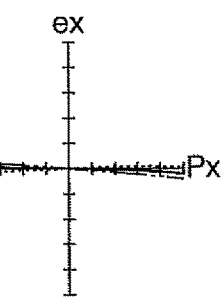
Figure 20E:
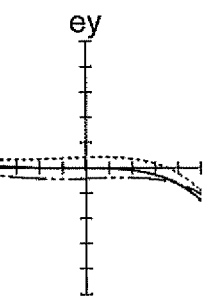
Figure 20F:
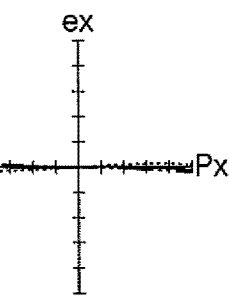
Figure 20G:
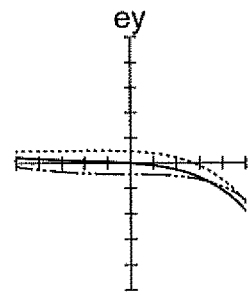
Figure 20H:
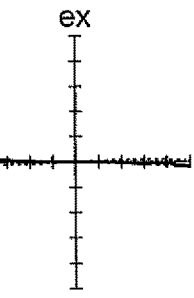
Figure 20I:
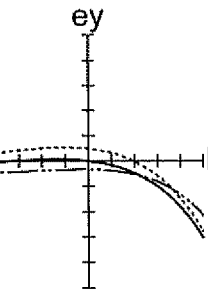
Figure 20J:
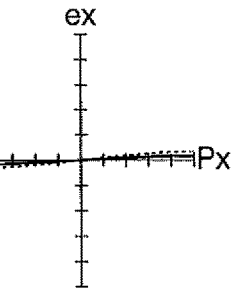
Figure 21A:
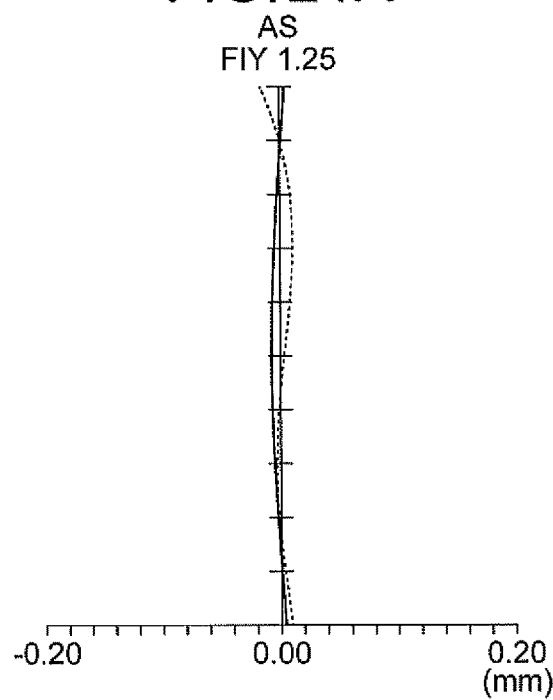
FIG. 21A, FIG. 21B, FIG. 21C, FIG. 21D, FIG. 21E, FIG. 21F, FIG. 21G, FIG. 21H, FIG. 21I, and FIG. 21J are aberration diagrams of the optical system for stereoscopic vision of the example 2.
Figure 21B:
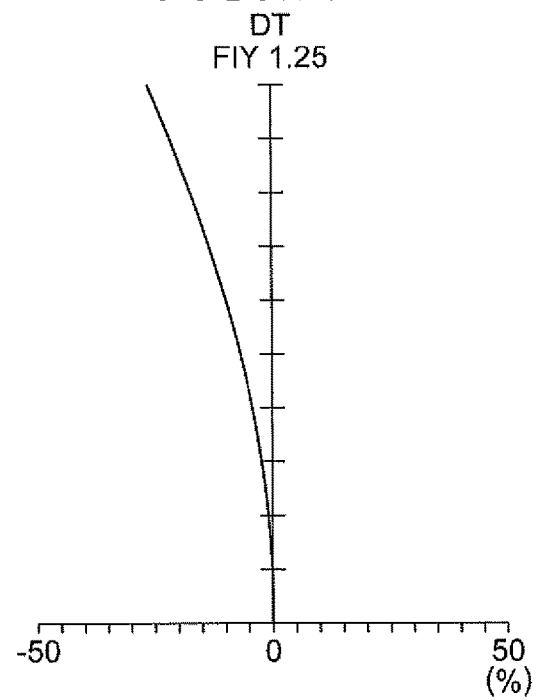
Figure 21C:
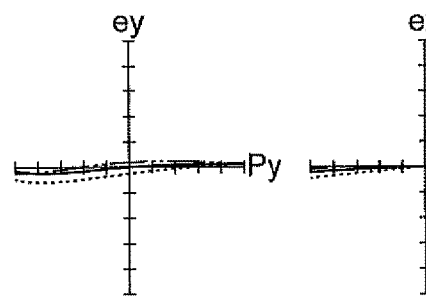
Figure 21D:
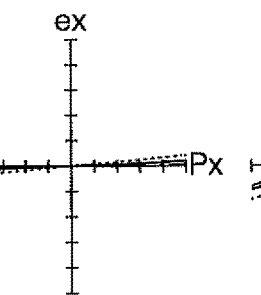
Figure 21E:
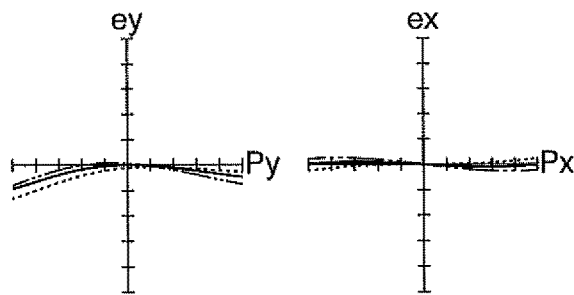
Figure 21F:
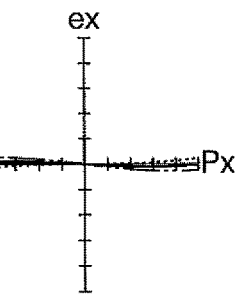
Figure 21G:
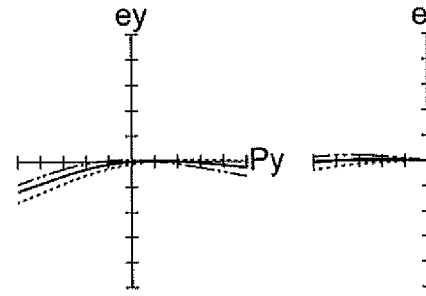
Figure 21H:
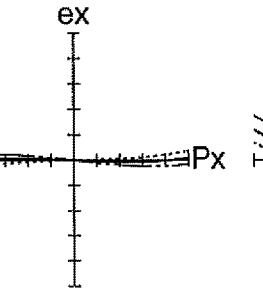
Figure 21I:
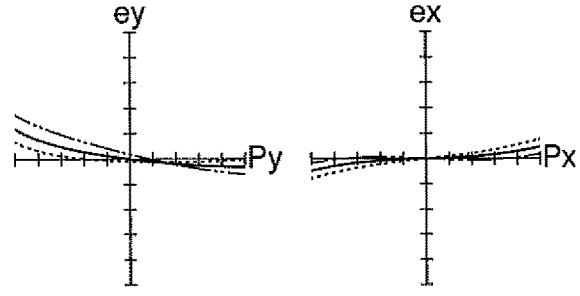
Figure 21J:
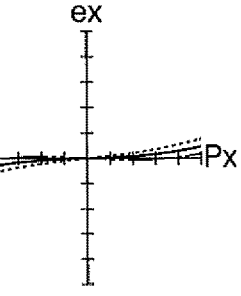
Figure 22A:
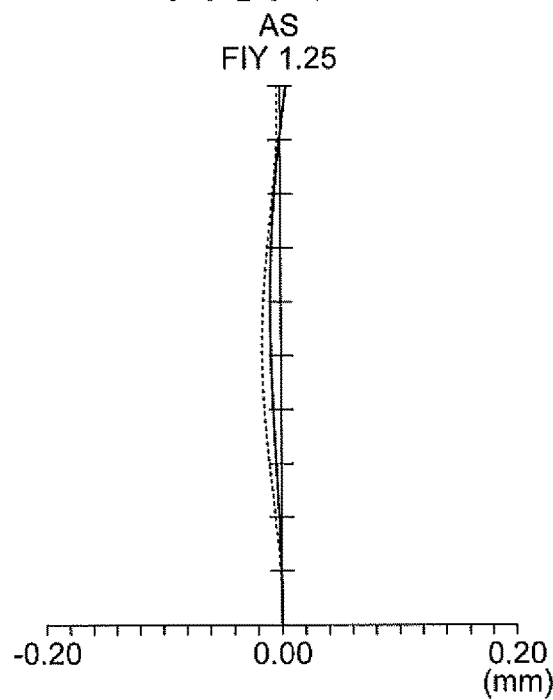
FIG. 22A, FIG. 22B, FIG. 22C, FIG. 22D, FIG. 22E, FIG. 22F, FIG. 22G, FIG. 22H, FIG. 22I, and FIG. 22J are aberration diagrams of the optical system for stereoscopic vision of the example 2.
Figure 22B:
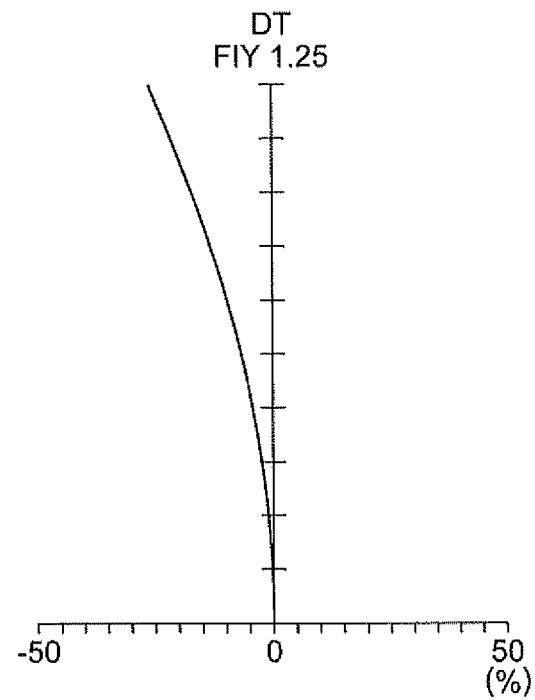
Figure 22C:
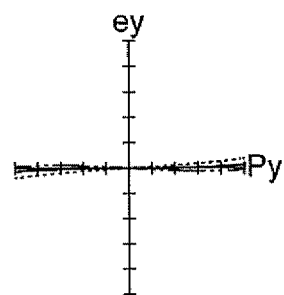
Figure 22D:
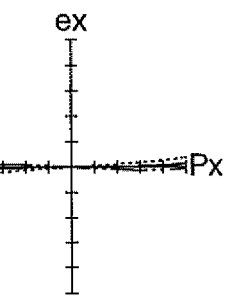
Figure 22E:
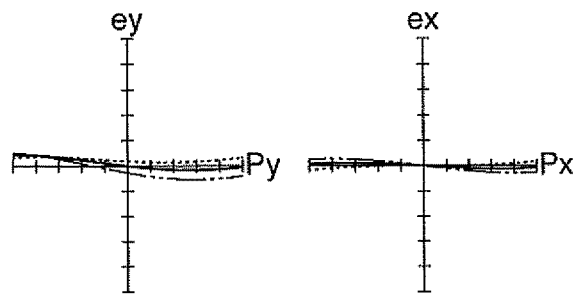
Figure 22F:
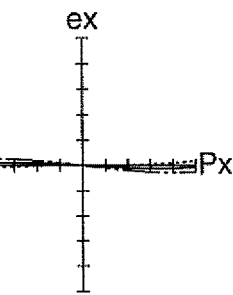
Figure 22G:
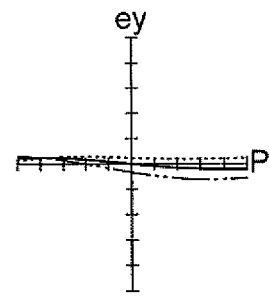
Figure 22H:
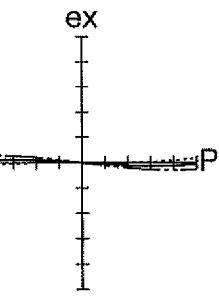
Figure 22I:
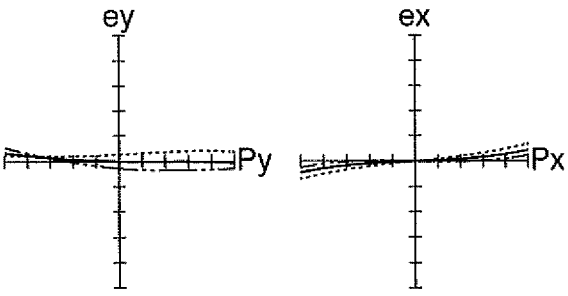
Figure 22J:
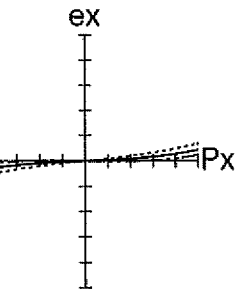
Figure 26A:
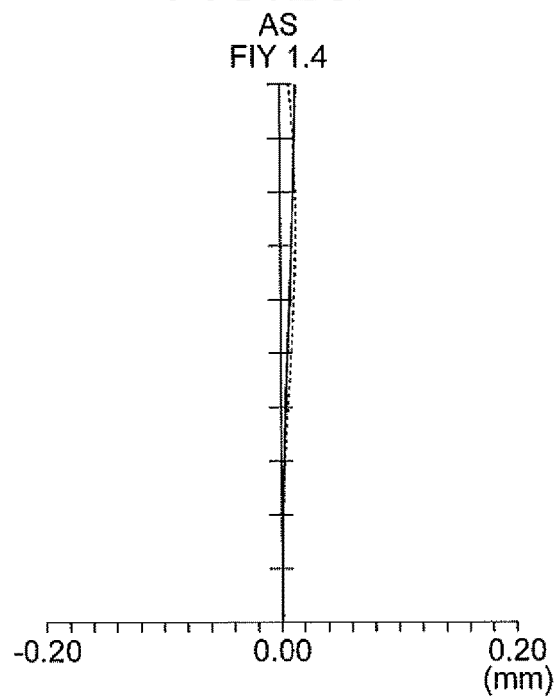
FIG. 26A, FIG. 26B, FIG. 26C, FIG. 26D, FIG. 26E, FIG. 26F, FIG. 26G, FIG. 26H, FIG. 26I, FIG. 26J are aberration diagrams of the optical system for stereoscopic vision of the example 3.
Figure 26B:
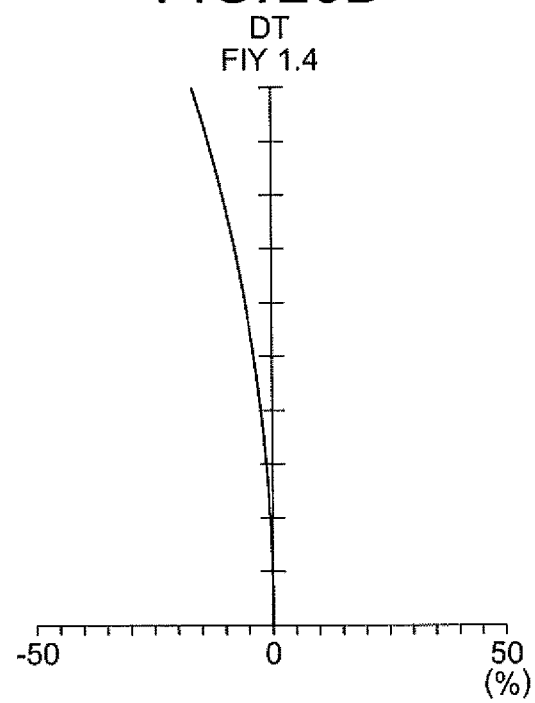
Figure 26C:
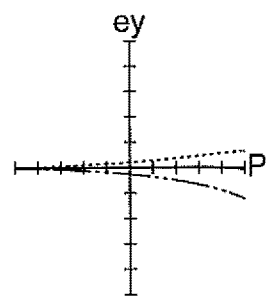
Figure 26D:
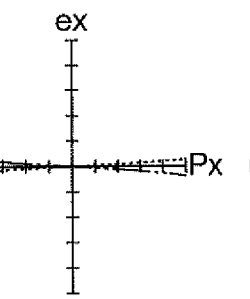
Figure 26E:
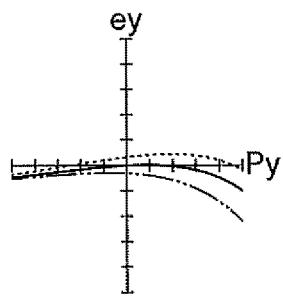
Figure 26F:
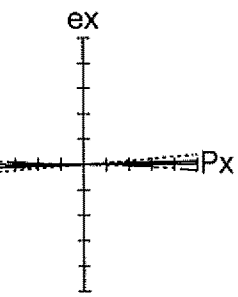
Figure 26G:
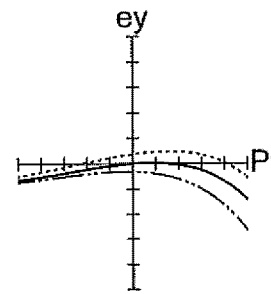
Figure 26H:
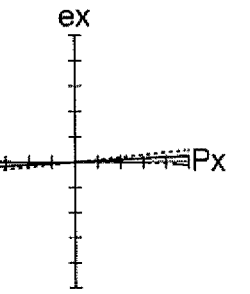
Figure 26I:
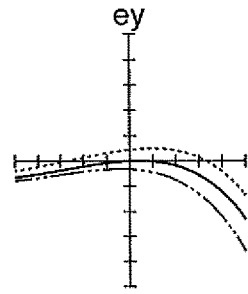
Figure 26J:
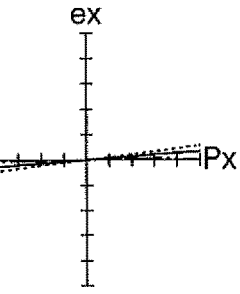
Figure 28A:
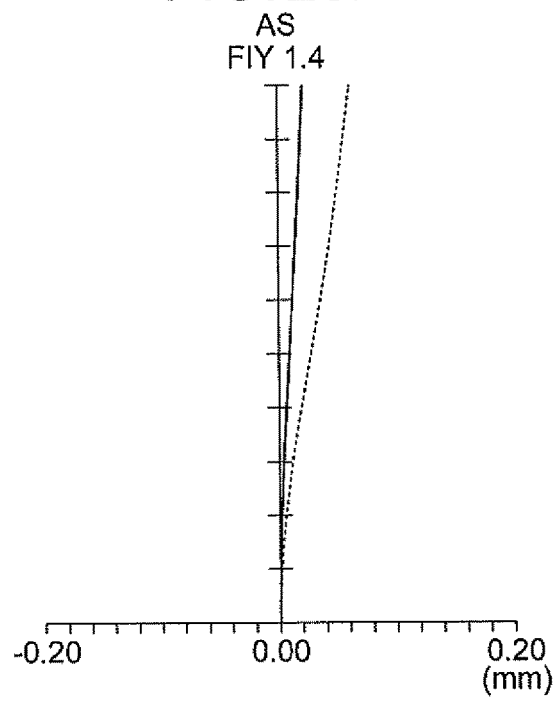
FIG. 28A, FIG. 28B, FIG. 28C, FIG. 28D, FIG. 28E, FIG. 28F, FIG. 28G, FIG. 28H, FIG. 28I, and FIG. 28J are aberration diagrams of the optical system for stereoscopic vision of the example 3.
Figure 28B:
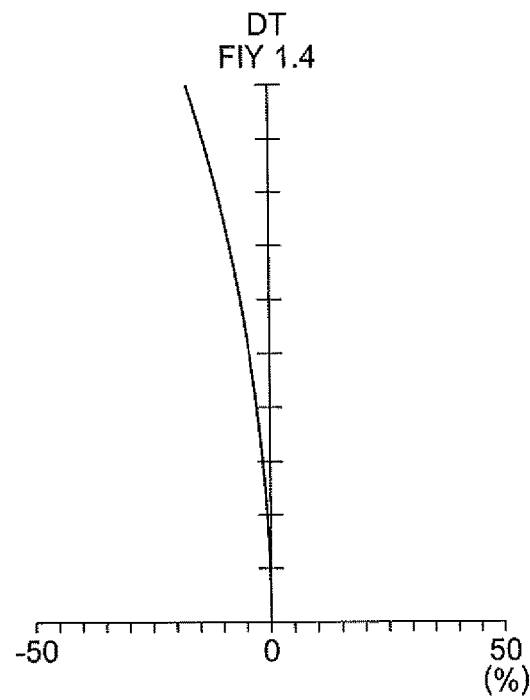
Figure 28C:
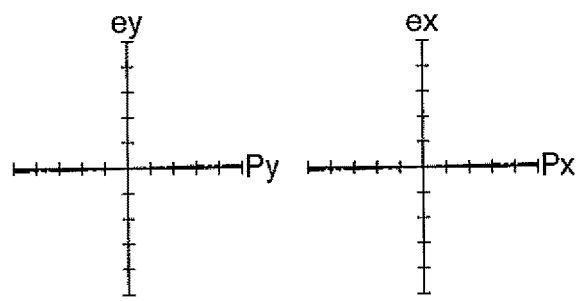
Figure 28D:
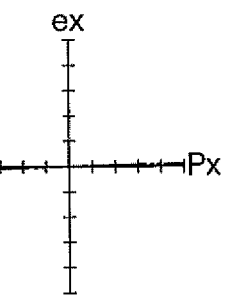
Figure 28E:
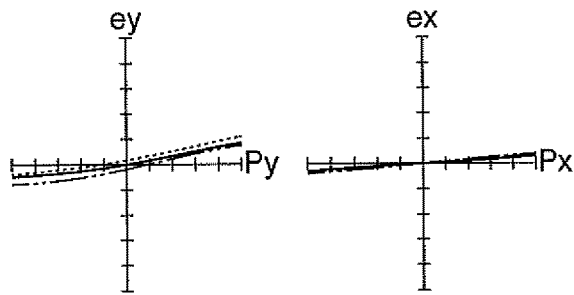
Figure 28F:
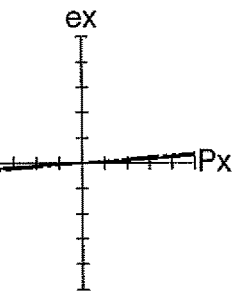
Figure 28G:
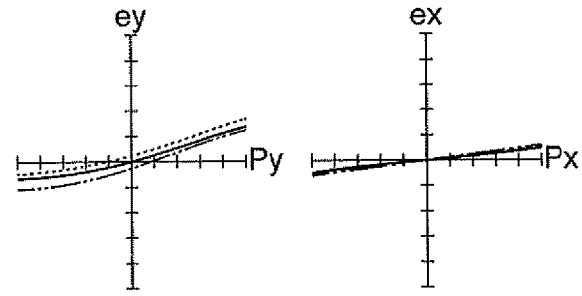
Figure 28H:
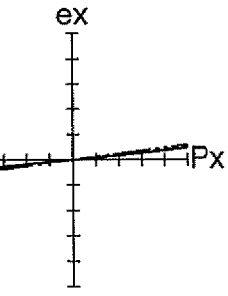
Figure 28I:
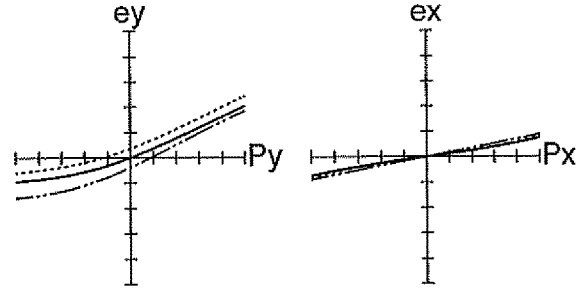
Figure 28J:
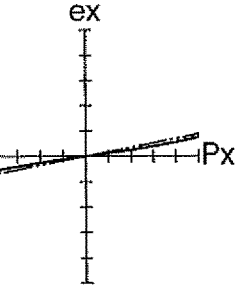
Figure 32A:
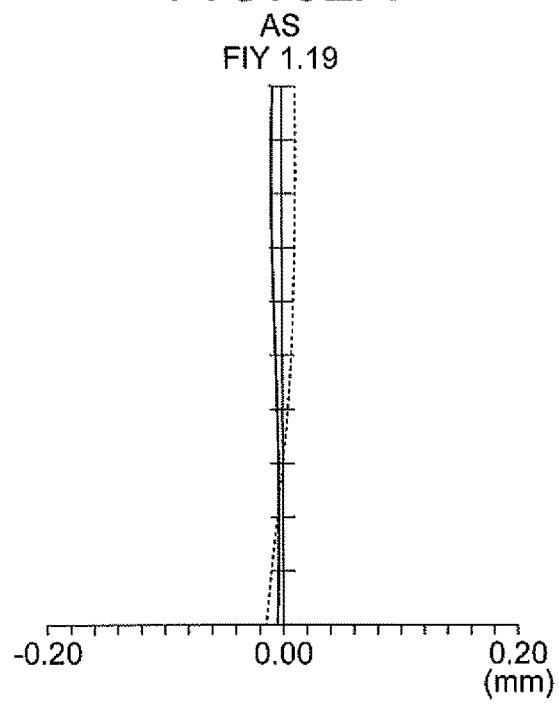
FIG. 32A, FIG. 32B, FIG. 32C, FIG. 32D, FIG. 32E, FIG. 32F, FIG. 32G, FIG. 32H, FIG. 32I, and FIG. 32J are aberration diagrams of the optical system for stereoscopic vision of the example 4.
Figure 32B:
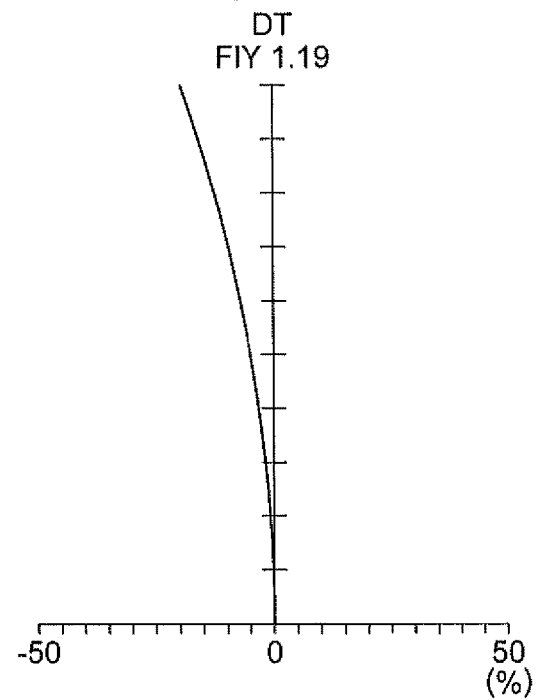
Figure 32C:
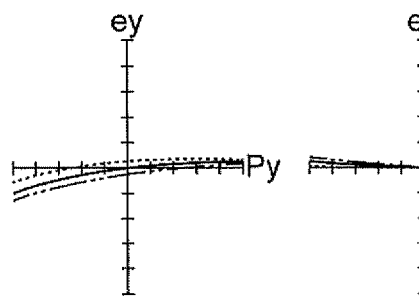
Figure 32D:
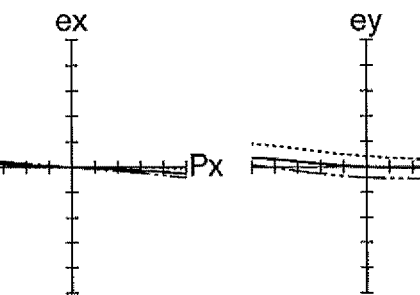
Figure 32E:
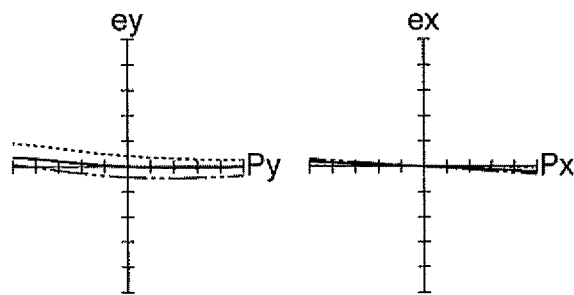
Figure 32F:
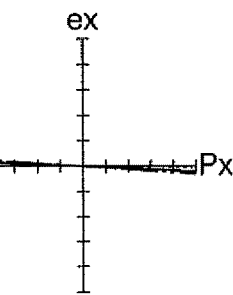
Figure 32G:
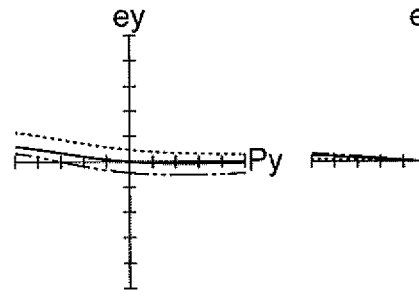
Figure 32H:
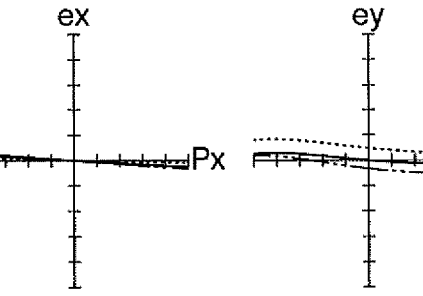
Figure 32I:
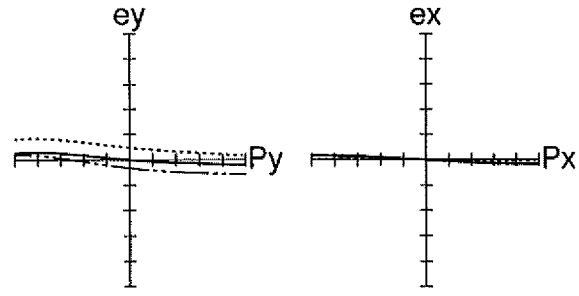
Figure 32J:
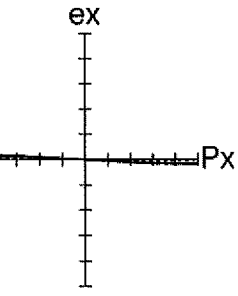
Figure 34A:
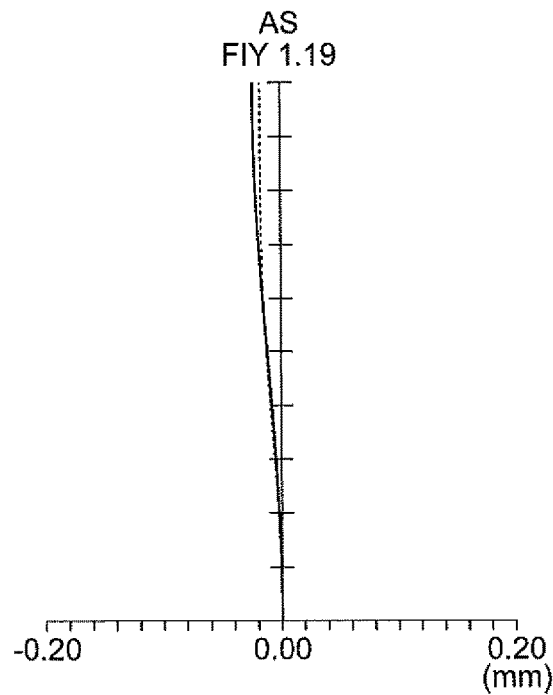
FIG. 34A, FIG. 34B, FIG. 34C, FIG. 34D, FIG. 34E, FIG. 34F, FIG. 34G, FIG. 34H, FIG. 34I, and FIG. 34J are aberration diagrams of the optical system for stereoscopic vision of the example 4.
Figure 34B:
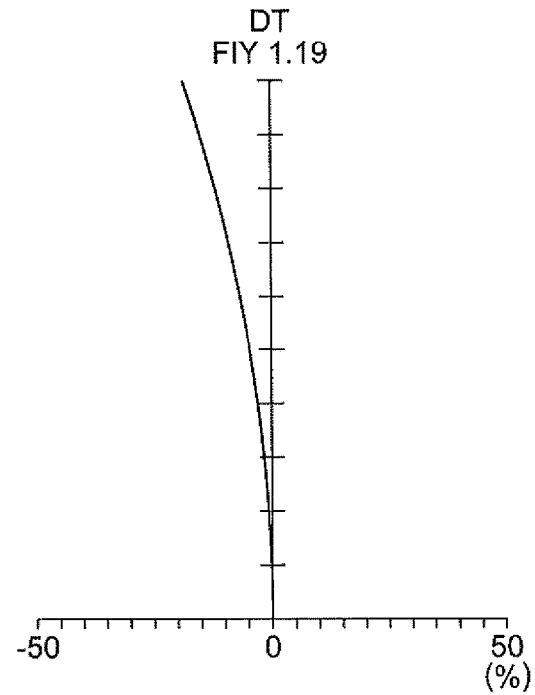
Figure 34C:
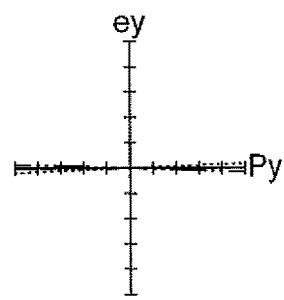
Figure 34D:
Figure 34E:
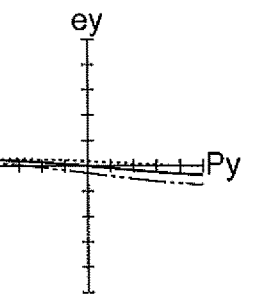
Figure 34F:
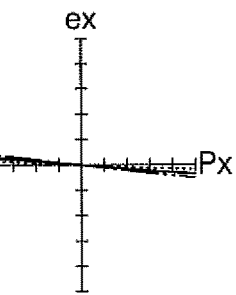
Figure 34G:
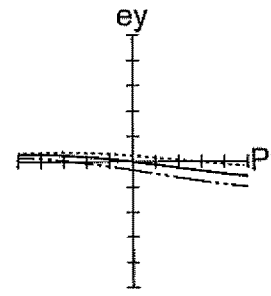
Figure 34H:
Figure 34I:
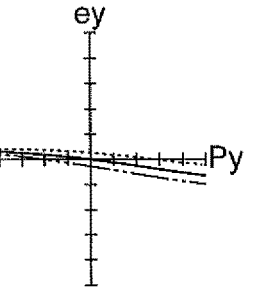
Figure 34J:
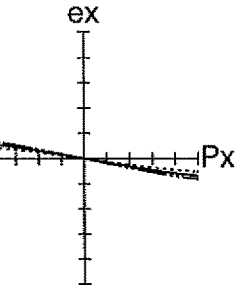
Figure 35A:
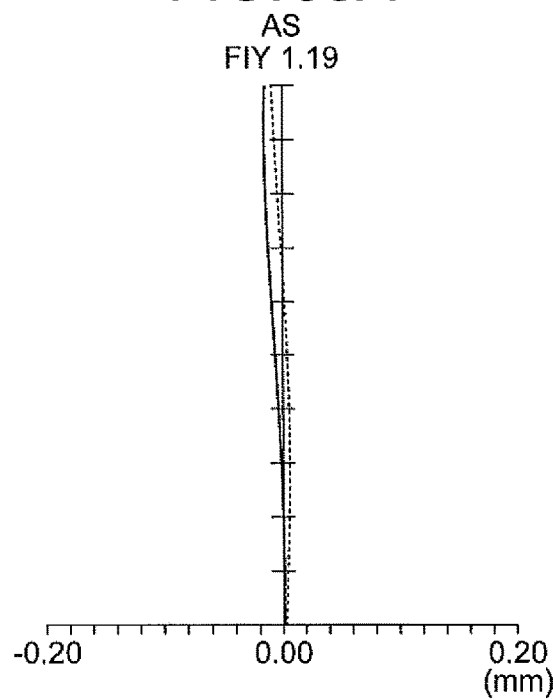
Figure 35B:
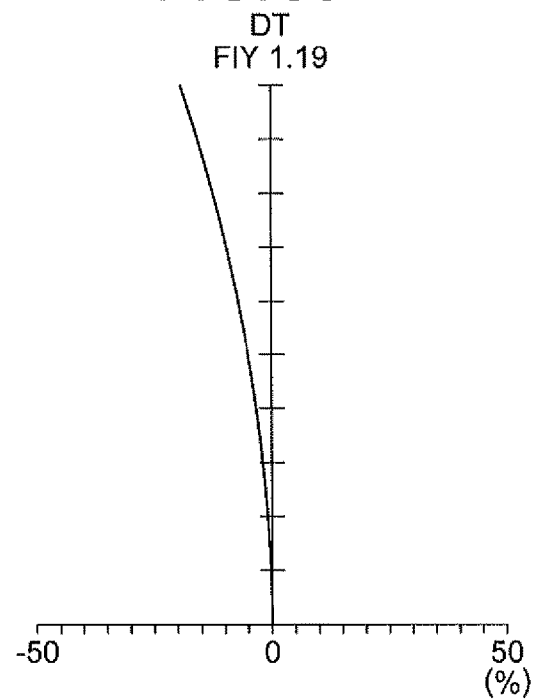
Figure 35C:
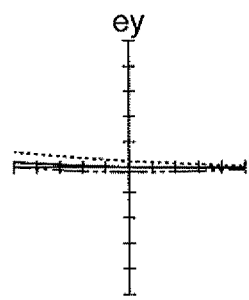
Figure 35D:
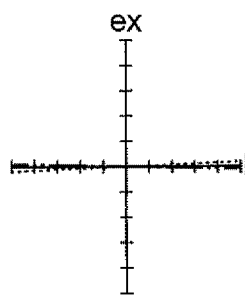
Figure 35E:
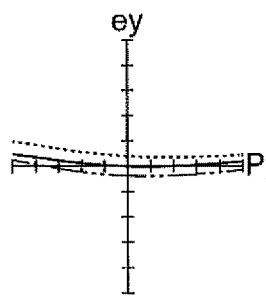
Figure 35F:
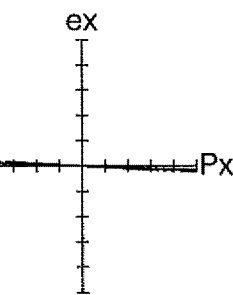
Figure 35G:
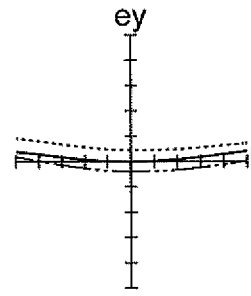
Figure 5H:
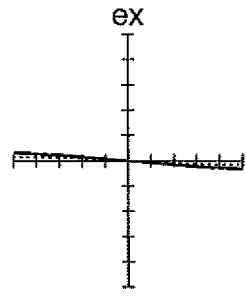
Figure 35I:
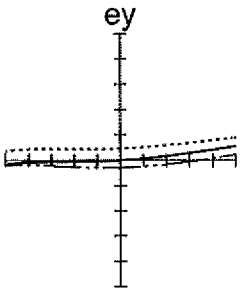
Figure 35J:
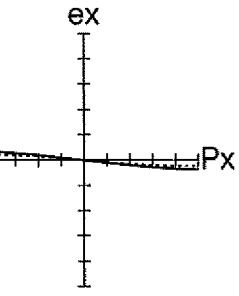
Figure 38A:
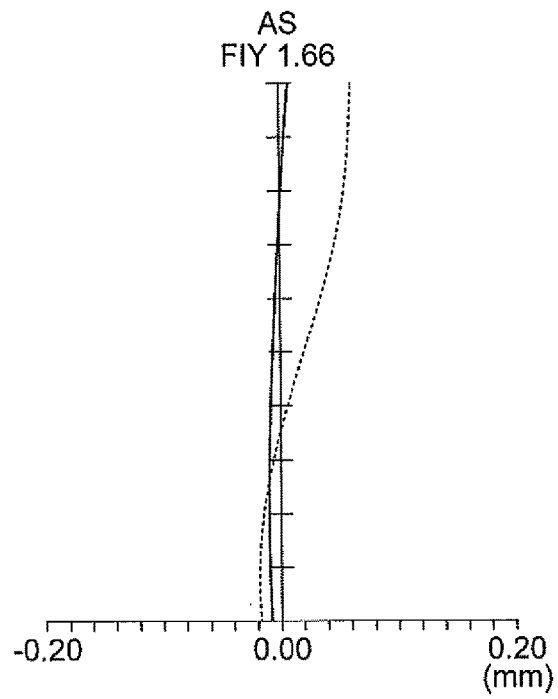
FIG. 38A, FIG. 38B, FIG. 38C, FIG. 38D, FIG. 38E, FIG. 38F, FIG. 38G, FIG. 38H, FIG. 38I, and FIG. 38J are aberration diagrams of the optical system for stereoscopic vision of the example 5.
Figure 38B:
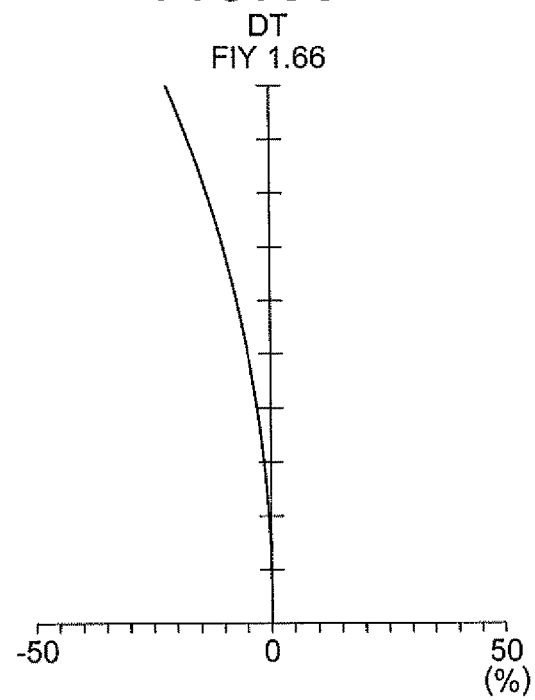
Figure 38C:
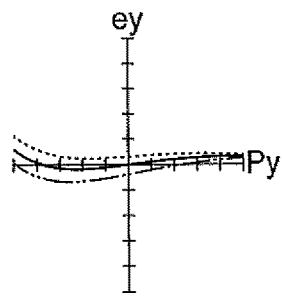
Figure 38D:
Figure 38E:
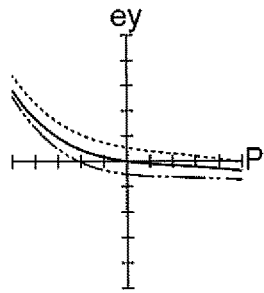
Figure 38F:
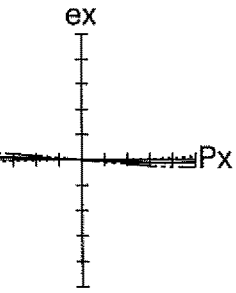
Figure 38G:
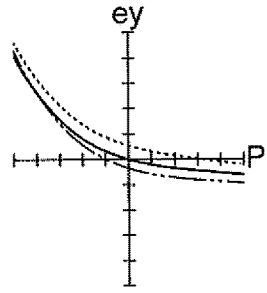
Figure 38H:
Figure 38I:
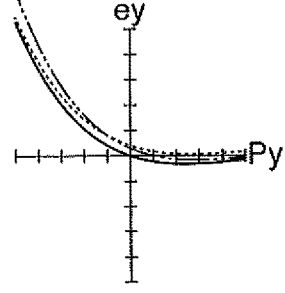
Figure 38J:
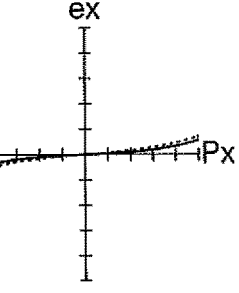
Figure 41A:
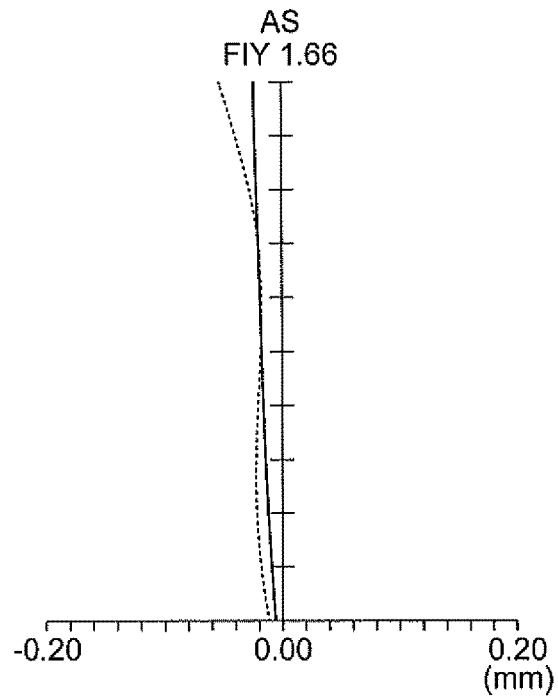
FIG. 41A, FIG. 41B, FIG. 41C, FIG. 41D, FIG. 41E, FIG. 41F, FIG. 41G, FIG. 41H, FIG. 41I, and FIG. 41J are aberration diagrams of the optical system for stereoscope vision of the example 5.
Figure 41B:
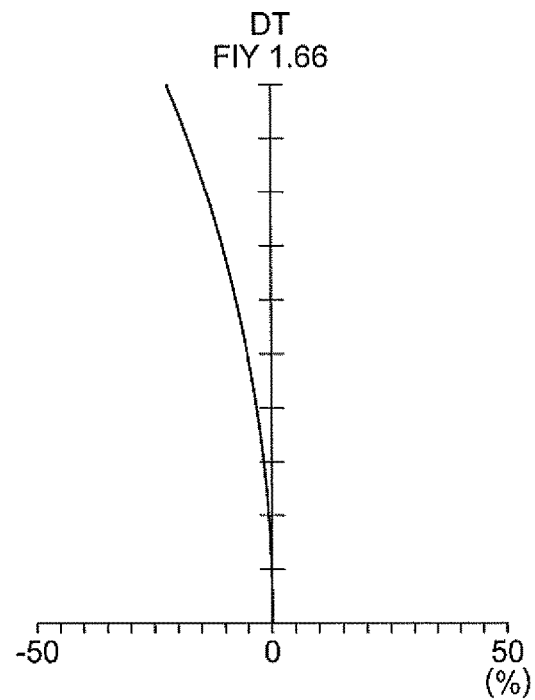
Figure 41C:
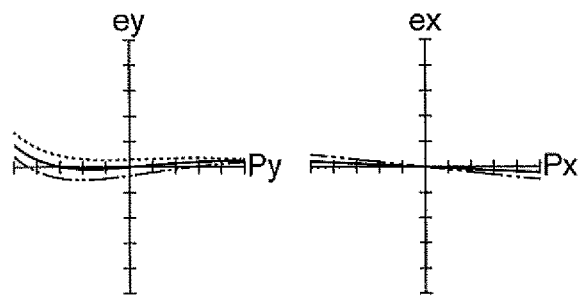
Figure 41D:
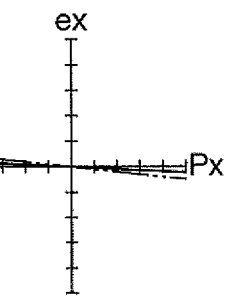
Figure 41E:
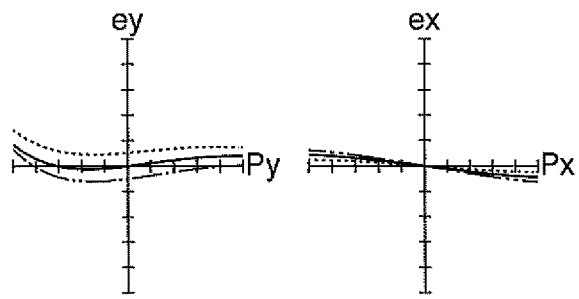
Figure 41F:
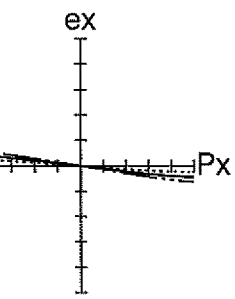
Figure 41G:
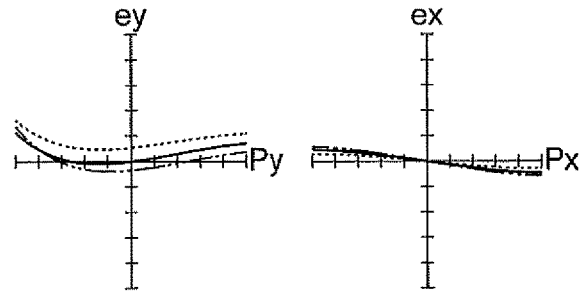
Figure 41H:
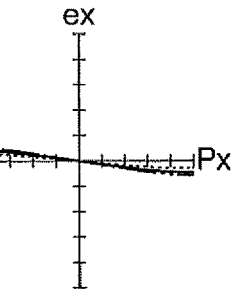
Figure 41I:
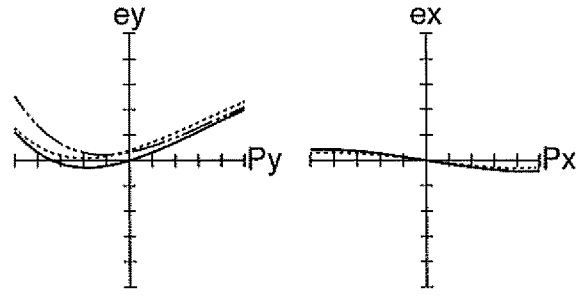
Figure 41J:
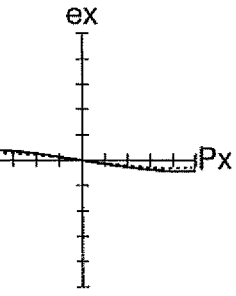
Figure 43A:
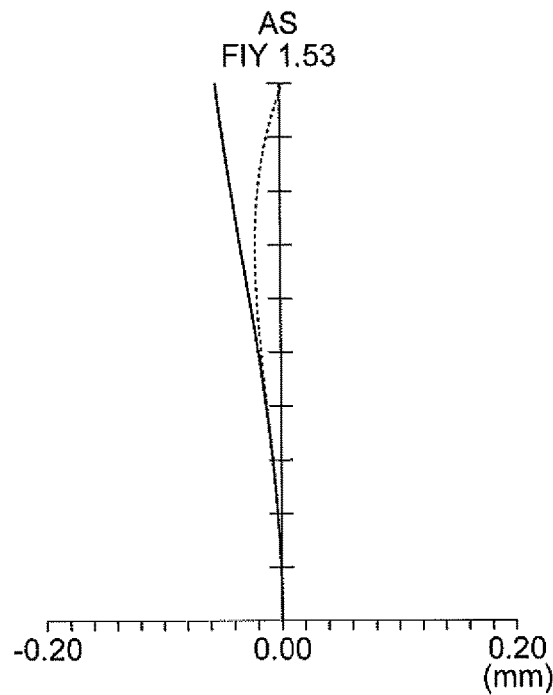
FIG. 43A, FIG. 43B, FIG. 43C, FIG. 43D, FIG. 43E, FIG. 43F, FIG. 43G, FIG. 43H, FIG. 43I, and FIG. 43J are aberration diagrams of the optical system for stereoscopic vision of the example 6.
Figure 43B:
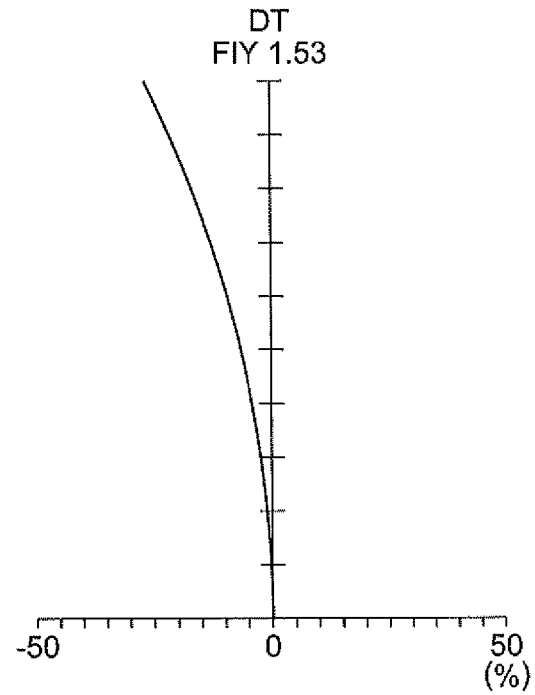
Figure 43C:
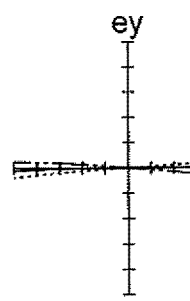
Figure 43D:
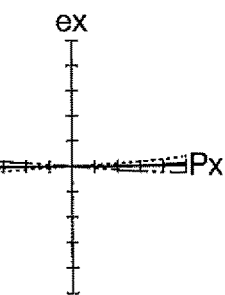
Figure 43E:
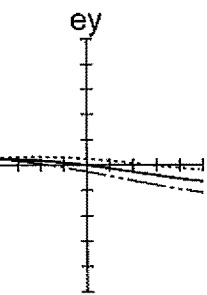
Figure 43F:
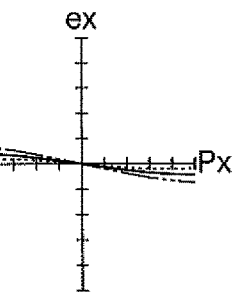
Figure 43G:
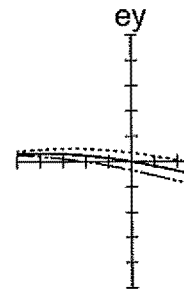
Figure 43H:
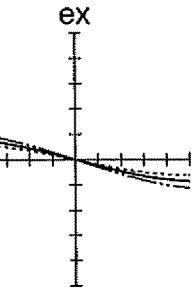
Figure 43I:
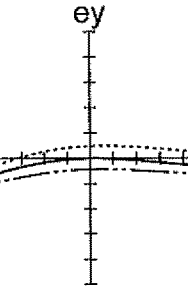
Figure 43J:
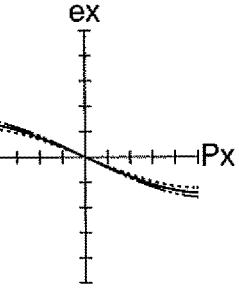
Figure 44A:
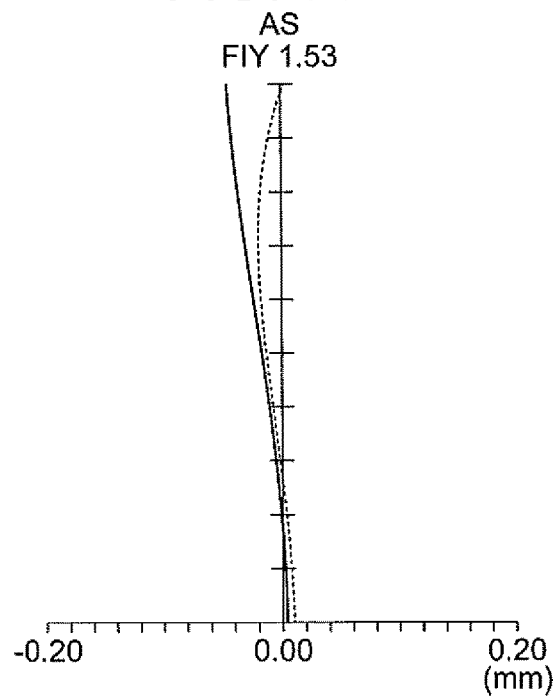
FIG. 44A, FIG. 44B, FIG. 44C, FIG. 44D, FIG. 44E, FIG. 44F, FIG. 44G, FIG. 44H, FIG. 44I, and FIG. 44J are aberration diagrams of the optical system for stereoscopic vision of the example 6.
Figure 44B:
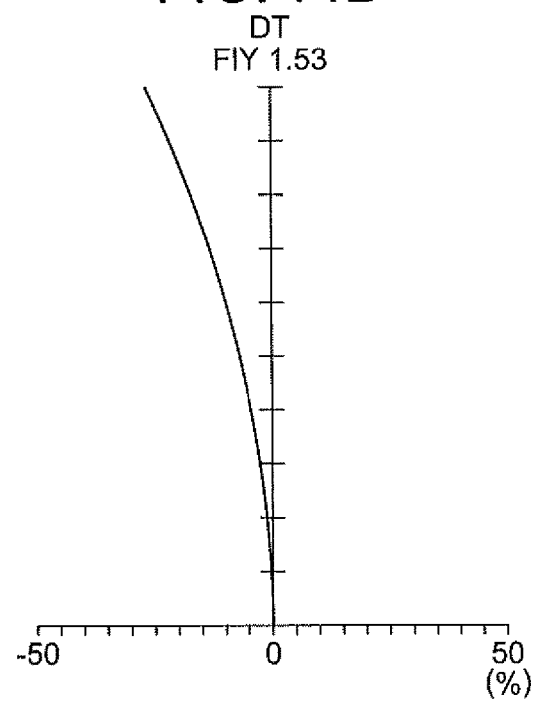
Figure 44C:
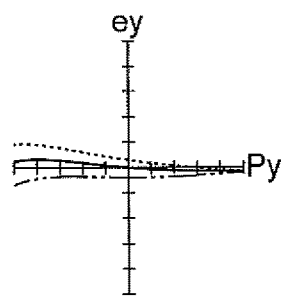
Figure 44D:
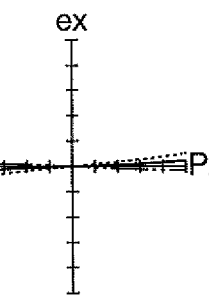
Figure 44E:
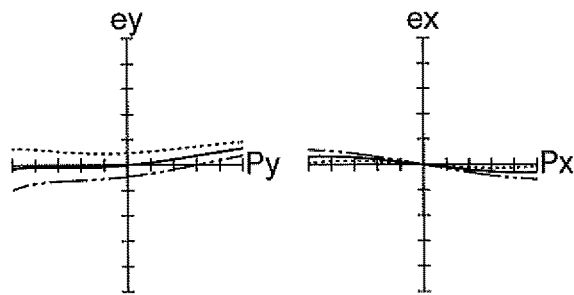
Figure 44F:
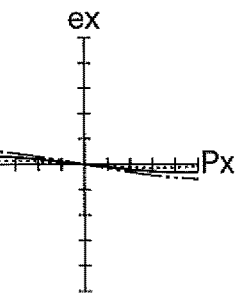
Figure 44G:
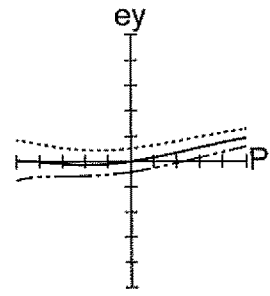
Figure 44H:
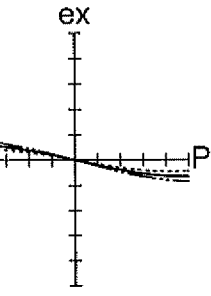
Figure 44I:
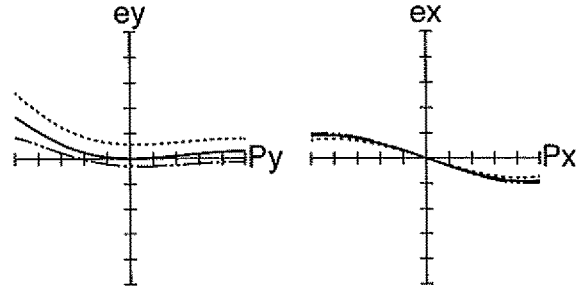
Figure 44J:
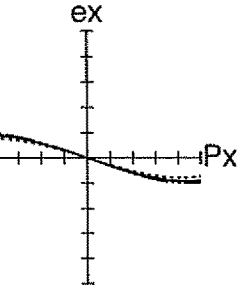
Figure 45A:
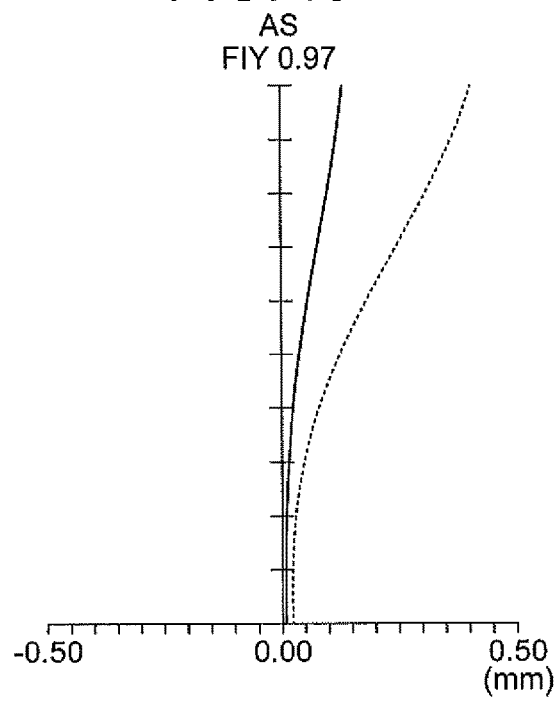
FIG. 45A, FIG. 45B, FIG. 45C, FIG. 45D, FIG. 45E, FIG. 45F, FIG. 45G, FIG. 45H, FIG. 45I, and FIG. 45J are aberration diagrams of the optical system for stereoscopic vision of the example 7.
Figure 45B:
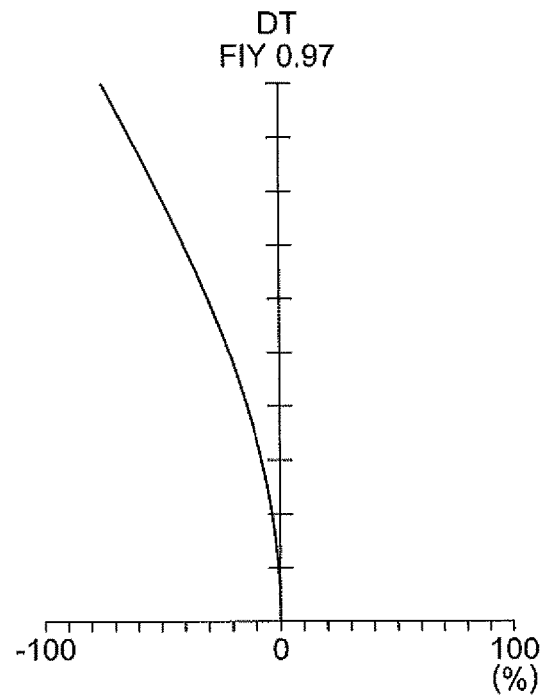
Figure 45C:
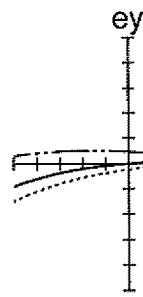
Figure 45D:
Figure 45E:
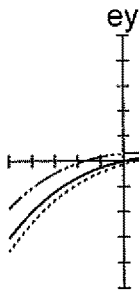
Figure 45F:
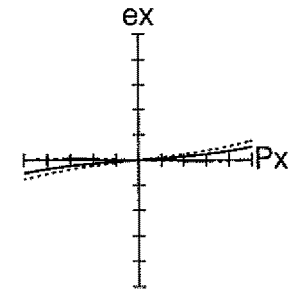
Figure 45G:
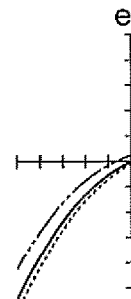
Figure 45H:
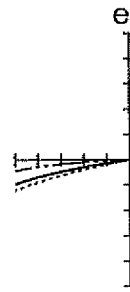
Figure 45I:
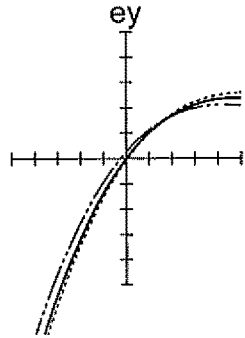
Figure 45J:
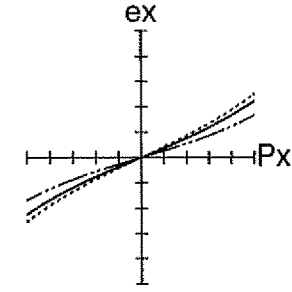
Figure 47A:
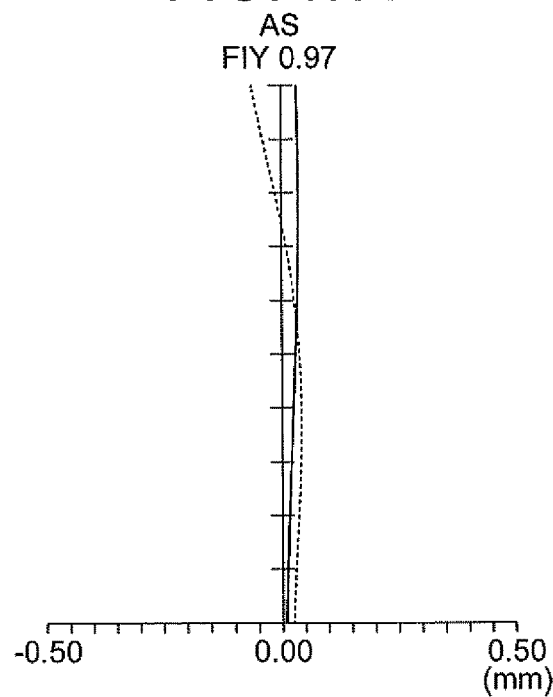
FIG. 47A, FIG. 47B, FIG. 47C, FIG. 47D, FIG. 47E, FIG. 47F, FIG. 47G, FIG. 47H, FIG. 47I, and FIG. 47J are aberration diagrams of the optical system for stereoscopic vision of the example 7.
Figure 47B:
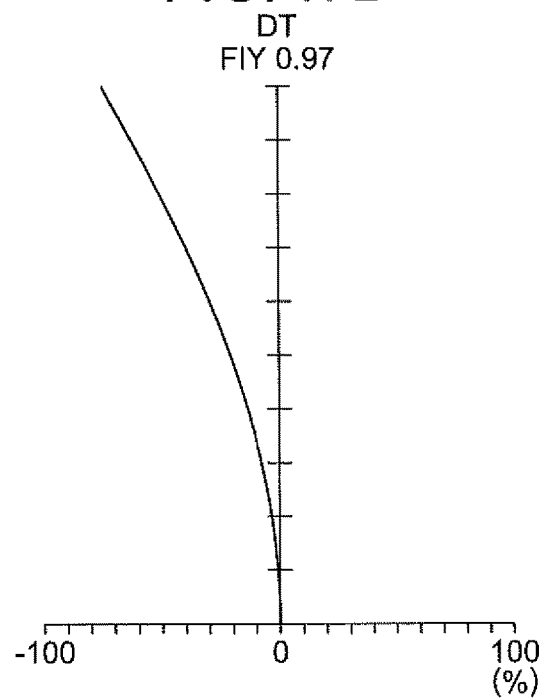
Figure 47C:
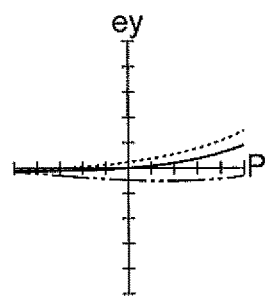
Figure 47D:
Figure 47E:
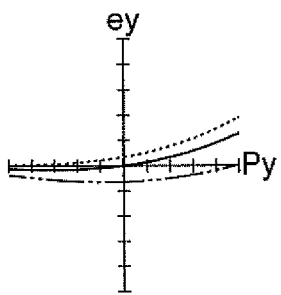
Figure 47F:
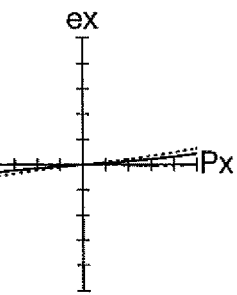
Figure 47G:
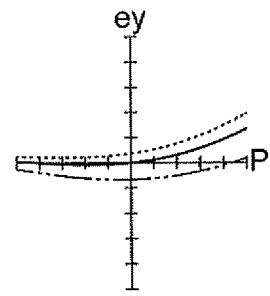
Figure 47H:
Figure 47I:
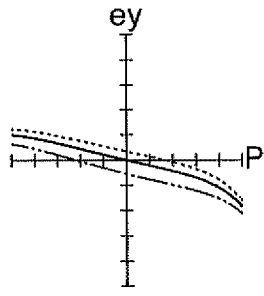
Figure 47J:
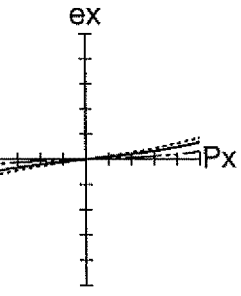
Figure 48A:
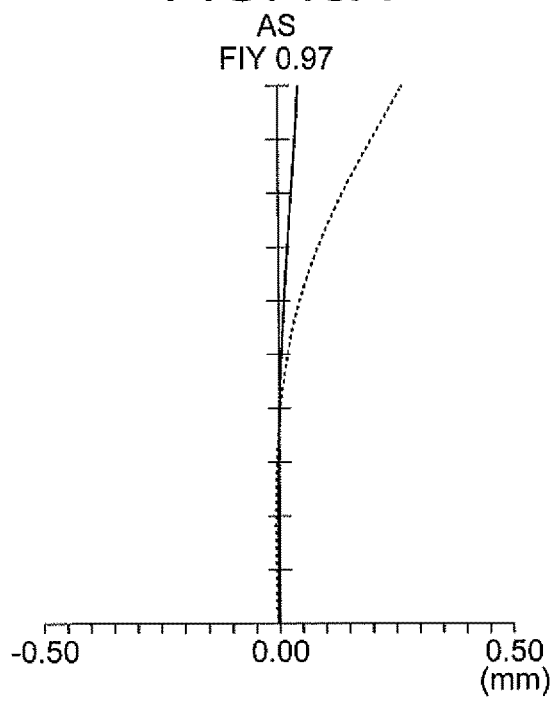
FIG. 48A, FIG. 48B, FIG. 48C, FIG. 48D, FIG. 48E, FIG. 48F, FIG. 48G, FIG. 48H, FIG. 48I, and FIG. 48J are aberration diagrams of the optical system for stereoscopic vision of the example 7.
Figure 48B:
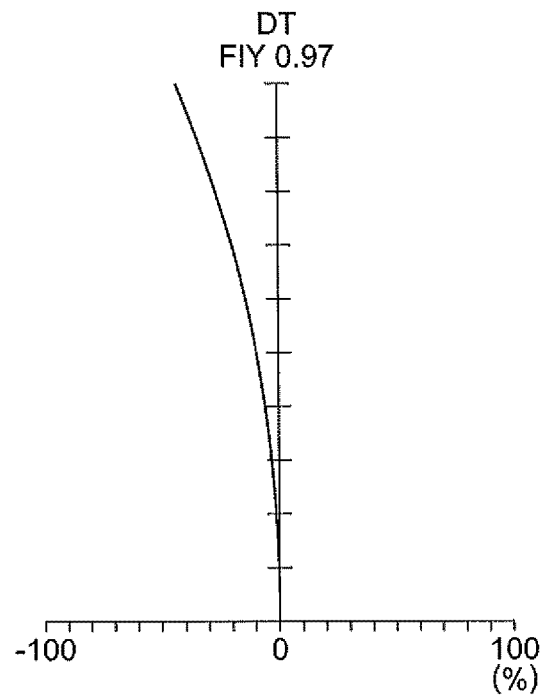
Figure 48C:
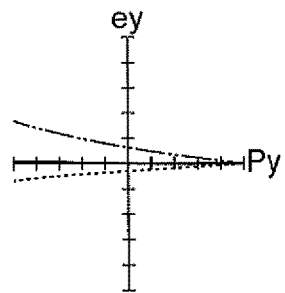
Figure 48D:
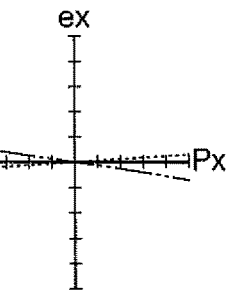
Figure 48E:
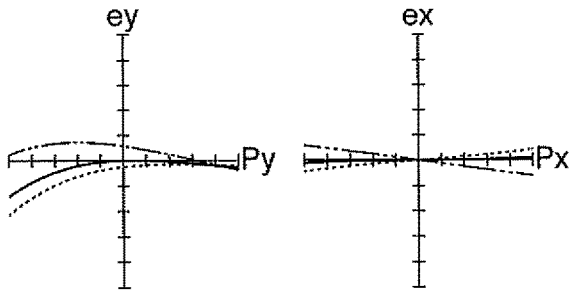
Figure 48F:
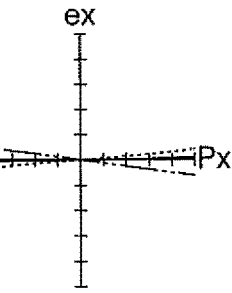
Figure 48G:
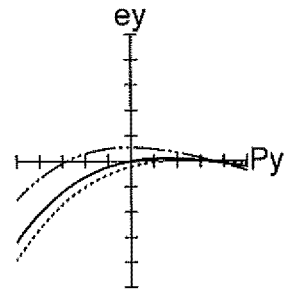
Figure 48H:
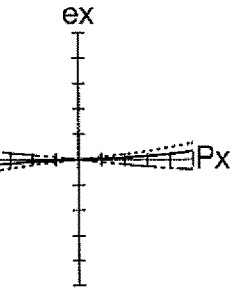
Figure 48I:
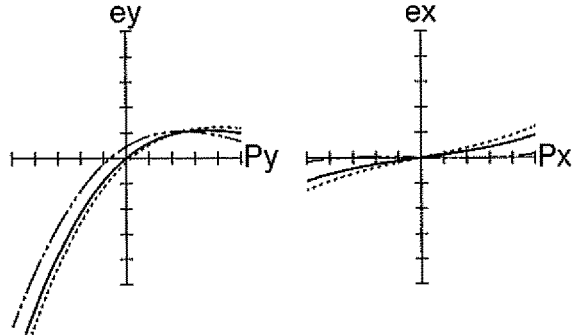
Figure 48J:
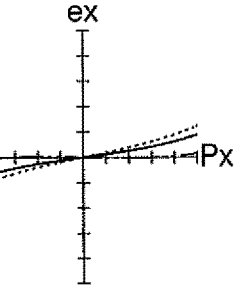
Figure 49A:
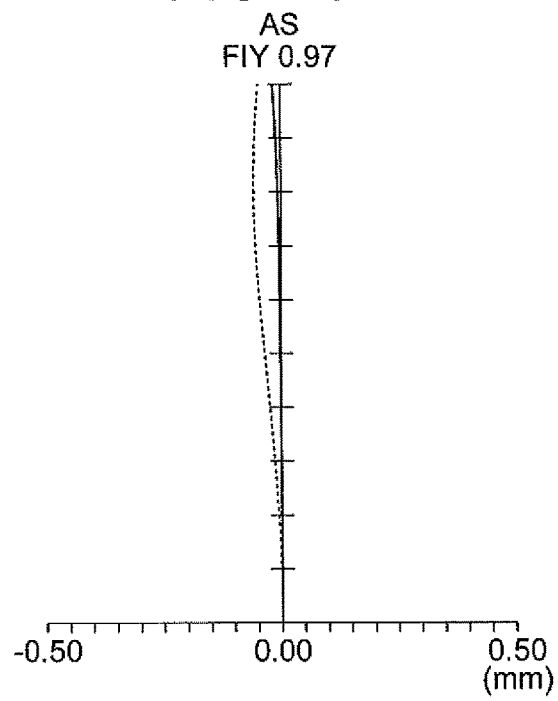
FIG. 49A, FIG. 49B, FIG. 49C, FIG. 49D, FIG. 49E, FIG. 49F, FIG. 49G, FIG. 49H, FIG. 49I, and FIG. 49J are aberration diagrams of the optical system for stereoscopic vision of the example 7.
Figure 49B:
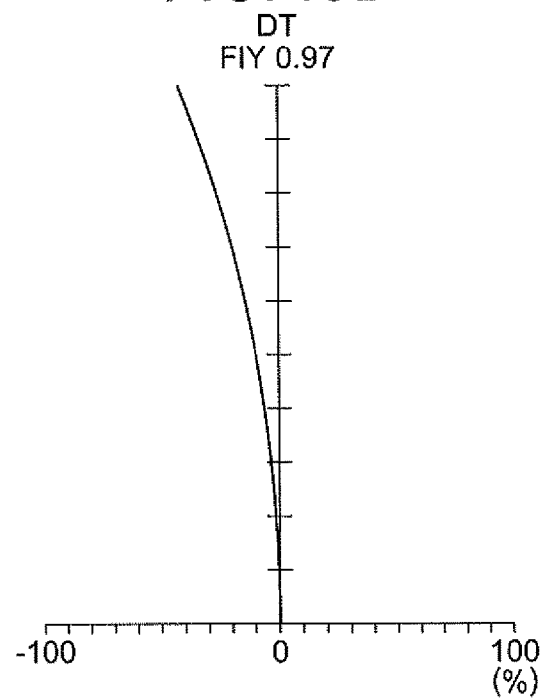
Figure 49C:
Figure 49D:
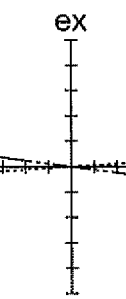
Figure 49E:
Figure 49F:
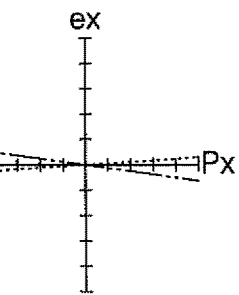
Figure 49G:
Figure 49H:
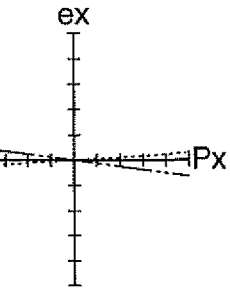
Figure 49I:
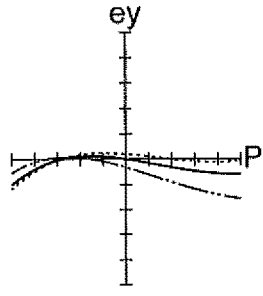
Figure 49J:
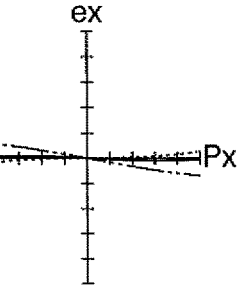
Figure 51A:
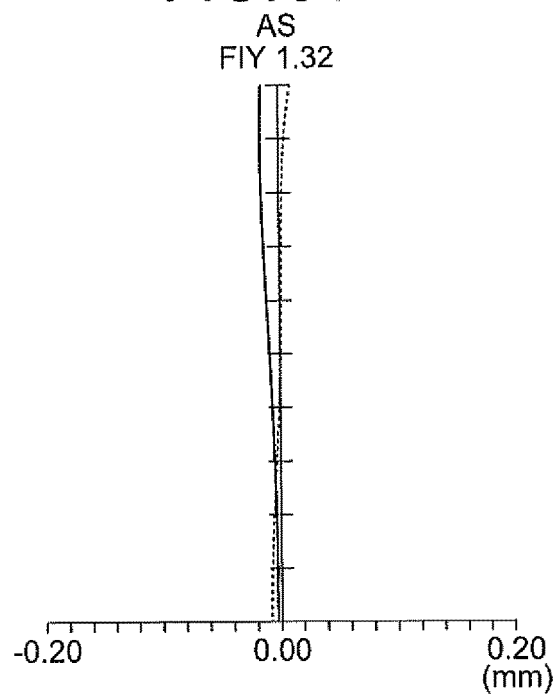
FIG. 51A, FIG. 51B, FIG. 51C, FIG. 51D, FIG. 51E, FIG. 51F, FIG. 51G, FIG. 51H, FIG. 51I, and FIG. 51J are aberration diagrams of the optical system for stereoscopic vision of the example 8.
Figure 51B:
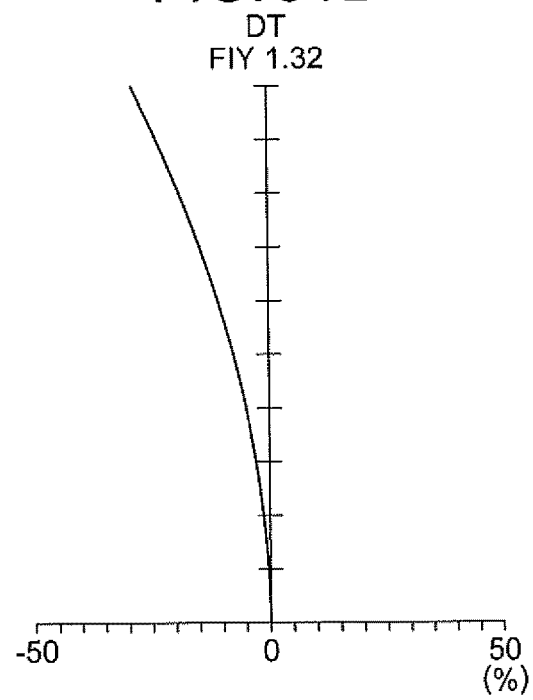
Figure 51C:
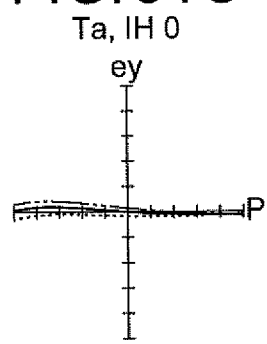
Figure 51D:
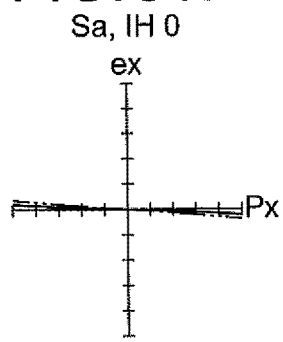
Figure 51E:
Figure 51F:
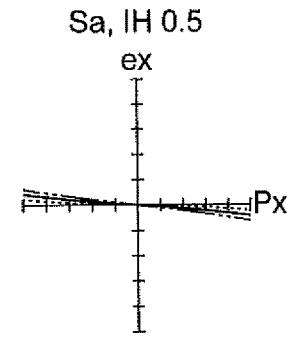
Figure 51G:
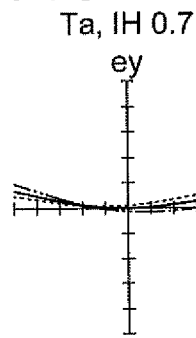
Figure 51H:
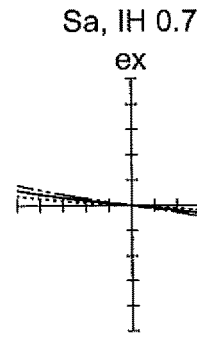
Figure 51I:
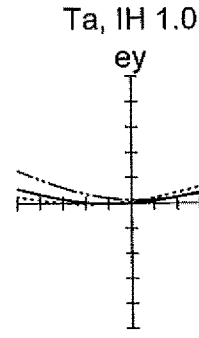
Figure 51J:
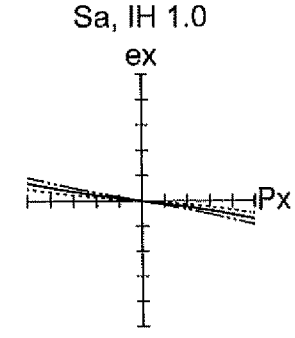
Figure 53A:
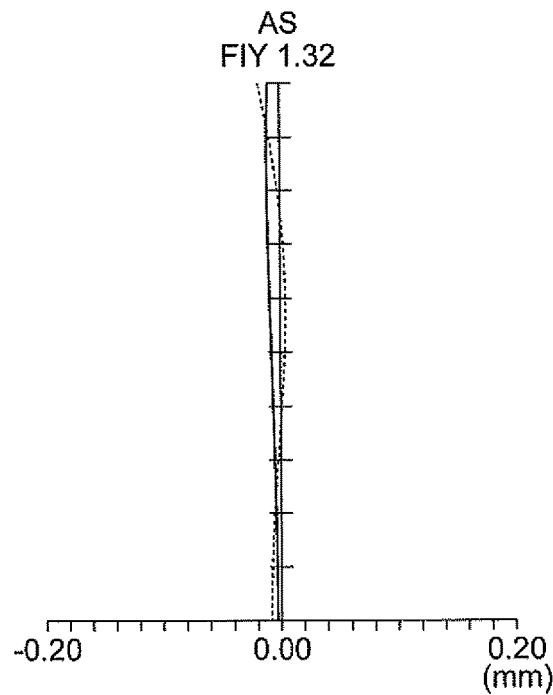
FIG. 53A, FIG. 53B, FIG. 53C, FIG. 53D, FIG. 53E, FIG. 53F, FIG. 53G, FIG. 53H, FIG. 53I, and FIG. 53J are aberration diagrams of the optical system for stereoscopic vision of the example 8.
Figure 53B:
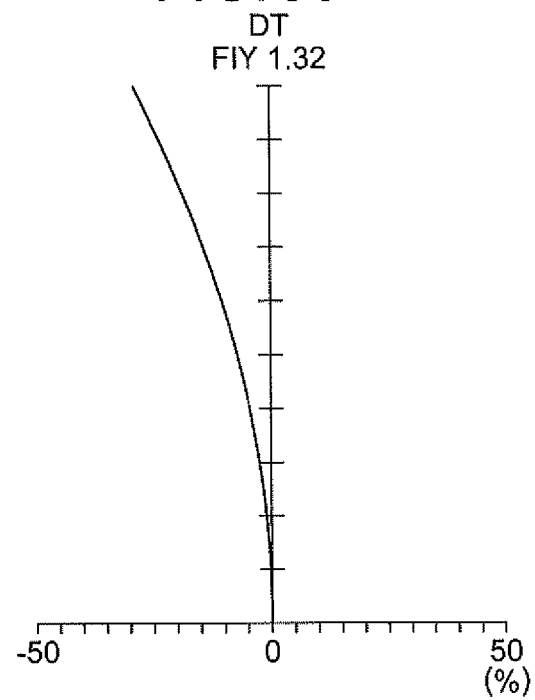
Figure 53C:
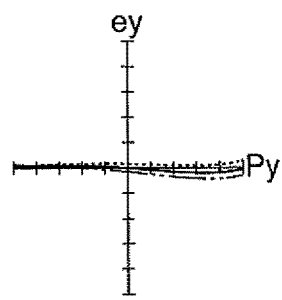
Figure 53D:
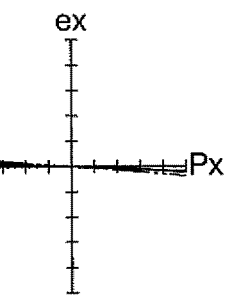
Figure 53E:
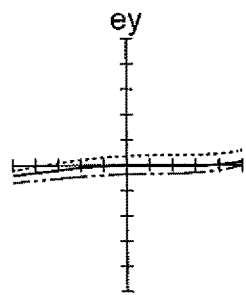
Figure 53F:
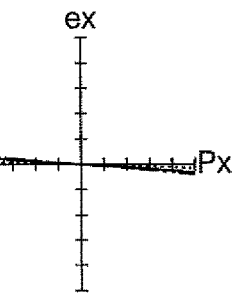
Figure 53G:
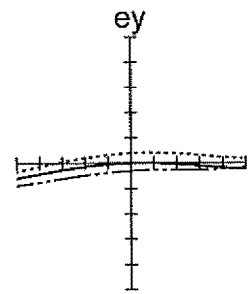
Figure 53H:
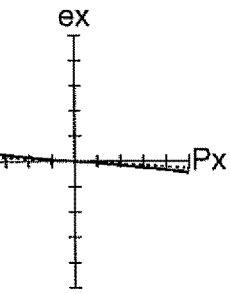
Figure 53I:
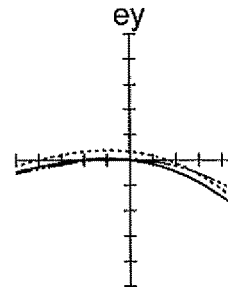
Figure 53J:
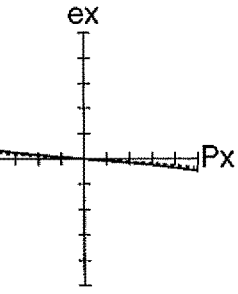
Figure 54A:
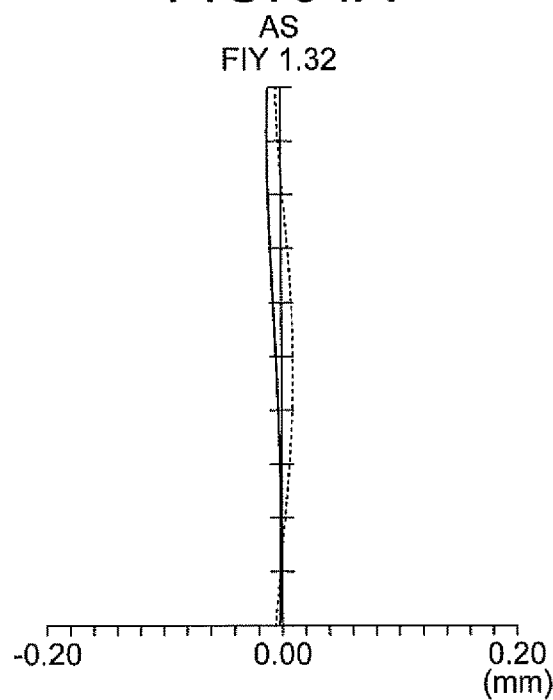
FIG. 54A, FIG. 54B, FIG. 54C, FIG. 54D, FIG. 54E, FIG. 54F, FIG. 54G, FIG. 54H, FIG. 54I, and FIG. 54J are aberration diagrams of the optical system for stereoscopic vision of the example 8.
Figure 54B:
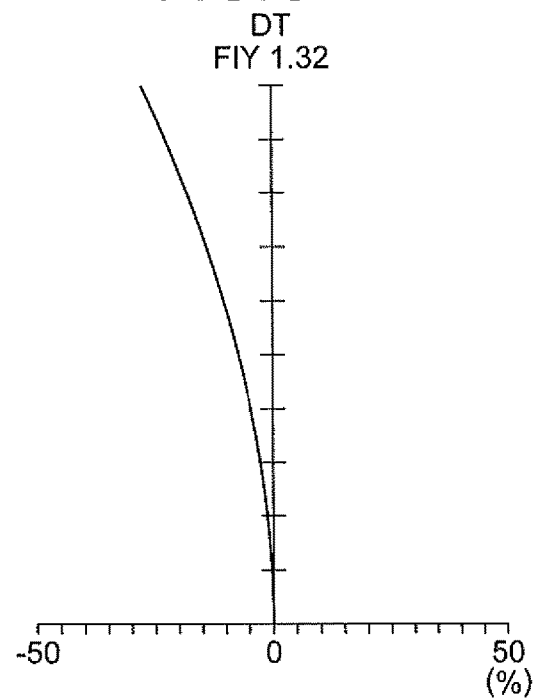
Figure 54C:
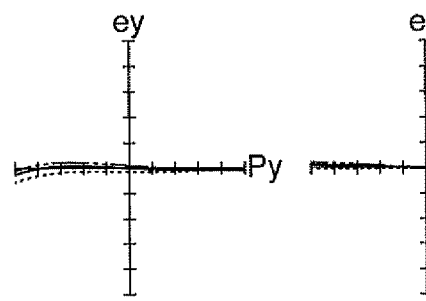
Figure 54D:
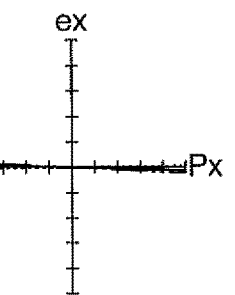
Figure 54E:
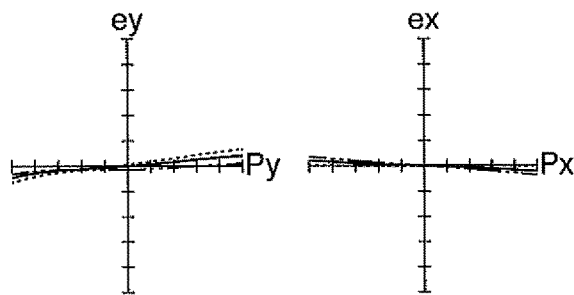
Figure 54F:
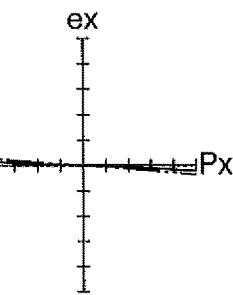
Figure 54G:
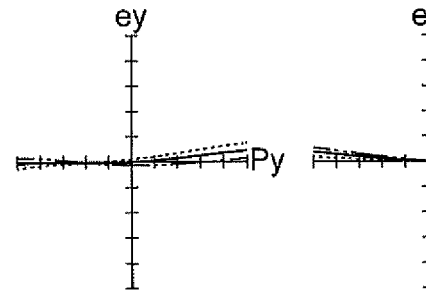
Figure 54H:
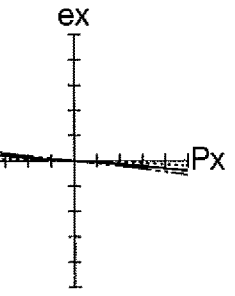
Figure 54I:
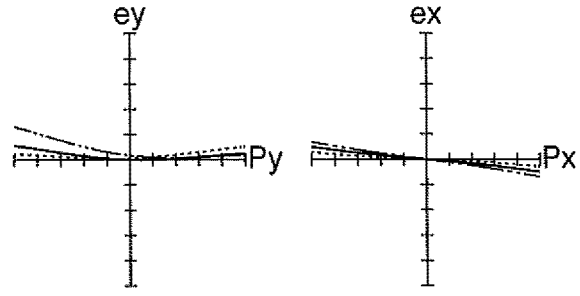
Figure 54J:
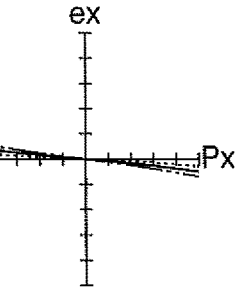
Figure 56A:
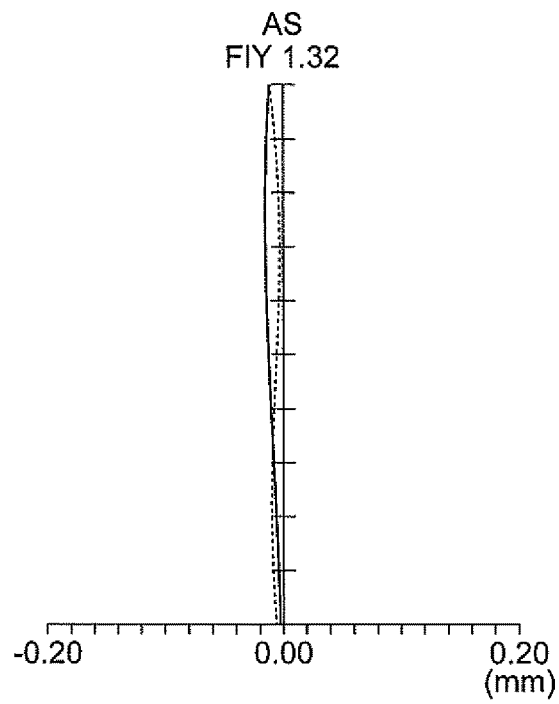
FIG. 56A, FIG. 56B, FIG. 56C, FIG. 56D, FIG. 56E, FIG. 56F, FIG. 56G, FIG. 56H, FIG. 56I, FIG. 56J are aberration diagrams of the optical system for stereoscopic vision of the example 8.
Figure 56B:
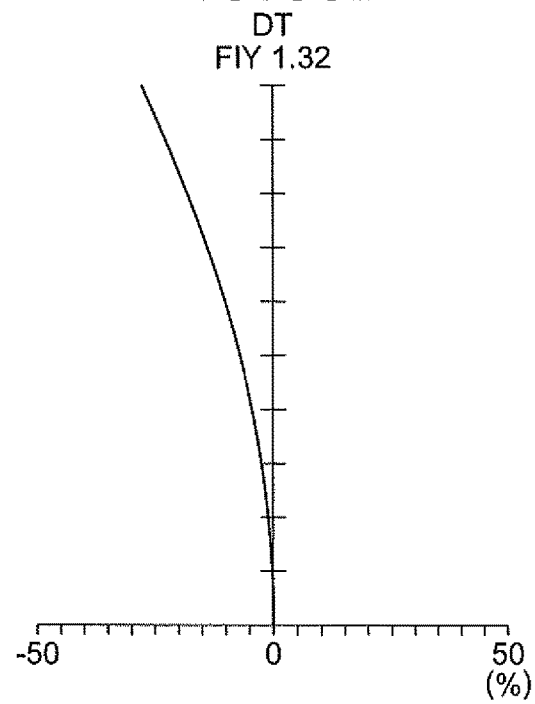
Figure 56C:
Figure 56D:
Figure 56E:
Figure 56F:
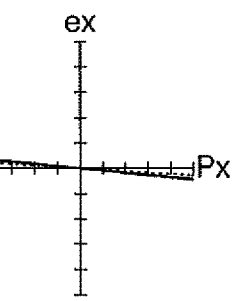
Figure 56G:
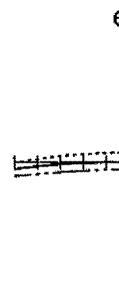
Figure 56H:
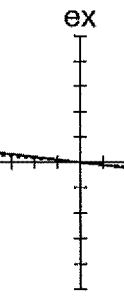
Figure 56I:
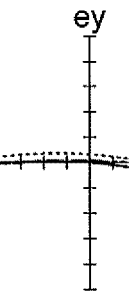
Figure 56J:
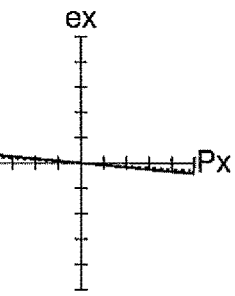

FIG. 3A, FIG. 3B, and FIG. 3C are lens cross-sectional views of a third example of the common optical system. FIG. 3A shows a lens arrangement at the time of observing a near point. FIG. 3B shows a lens arrangement at the time of observing an intermediate point. FIG. 3C shows a lens arrangement at the time of observing a far point.

An object distance at the time of observing a near point is shorter than an object distance at the time of observing a far point. An object OB at the time of near-point observation is positioned nearer from the optical system for stereoscopic vision than an object point OB at the time of far-point observation. An object OB at the time of observing an intermediate point is positioned between a position of the object OB at the time of near-point observation and a position of the object OB at the time of far-point observation.

The common optical system of the third example includes same lenses as in the optical system of the first example. The common optical system of the third example includes a focusing lens. In FIG. 3A, FIG. 3B, and FIG. 3C, the positive meniscus lens L10 is the focusing lens.

The positive meniscus lens L10 moves along an optical axis in accordance with a distance up to an object to be observed. When focusing is carried out from an object to be observed positioned at a near point to an object to be observed positioned at a far point, the positive meniscus lens L10 moves toward the image side.

In the optical system for stereoscopic vision of the present embodiment, it is preferable that the two stops move together with the movement of the two focusing lenses.

A variation in the inward angle is generated not only due to a variation in the pupil distance but also due to a variation in a distance up to an object point. The inward angle differs for a case of observing a near point and a case of observing a far point. Due to a difference of the inward angle, there is a difference between the stereoscopic effect at the time of near-point observation and the stereoscopic effect at the time of far-point observation.

In a case in which an optical system for stereoscopic vision includes a focusing lens, it is possible to observe a range from the near point up to the far point in a focused state. In this case, it is preferable to make small a difference between the stereoscopic effect at the time of near-point observation and the stereoscopic effect at the time of far-point observation.

In the optical system for stereoscopic vision of the present embodiment, the two stops move in accordance with a distance up to an object point at the time of observation. Therefore, it is possible to make the stereoscopic effect at the time of near-point observation and the stereoscopic effect at the time of far-point observation most appropriate.

When focusing and adjustment of stereoscopic effect are carried out separately, two operations are to be carried out. In this case, the operation becomes complex. In the optical system for stereoscopic vision of the present embodiment, the stop moves together with the movement of the focusing lens. Therefore, it is possible to carry out focusing and adjustment of the stereoscopic effect by one operation.

It is possible to use the optical system for stereoscopic vision of the present embodiment in an endoscope. In an endoscope, various operations are to be carried out at hand. Therefore, in a case in which the optical system for stereoscopic vision of the present embodiment is used in an endoscope, it is possible to simplify the operation.

In the optical system for stereoscopic vision of the present embodiment, it is preferable that the following conditional expression (4) be satisfied at an arbitrary focusing position:

$$0.01 < \arctan(De/Lob) < 1.2 \tag{4}$$

where,

De denotes a distance between a center of a first entrance pupil and a center of a second entrance pupil, Lob denotes a distance on the optical axis from a position of the first entrance pupil up to the arbitrary focusing position or a distance on the optical axis from a position of the second entrance pupil up to the arbitrary focusing position, the first entrance pupil is an entrance pupil of the first optical system, and the second entrance pupil is an entrance pupil of the second optical system.

By satisfying conditional expression (4), it is possible to make both of an inward angle at the time of near-point observation and an inward angle at the time of far-point observation appropriate. Therefore, it is possible to make both the stereoscopic effect at the time of near-point observation and the stereoscopic effect at the time of far-point observation the most appropriate stereoscopic effect. For instance, when an image observed is displayed on a monitor, it is possible to carry out the near-point observation and the far-point observation with the most appropriate stereoscopic effect.

Due to the movement of the stop, the opening section is decentered with respect to the optical axis of the first optical system. When an amount of decentering is large, various aberrations occur largely. By satisfying conditional expression (4), it is possible to maintain the amount of decentering appropriately. As a result, it is possible to prevent various aberrations, particularly the spherical aberration and the coma, from occurring largely.

In the optical system for stereoscopic vision of the present embodiment, it is preferable that a distance between a center of an opening section of the stop of the first optical system and a center of an opening section of the stop of the second optical system become minimum at a first focusing position and become maximum at a second focusing position.

Here, the first focusing position is a position nearest to the optical system for stereoscopic vision in a focusing range of the optical system for stereoscopic vision, and the second focusing position is a position farthest from the optical system for stereoscopic vision in the focusing range of the optical system for stereoscopic vision.

At the first focusing position, an object to be observed is positioned nearest to the optical system for stereoscopic vision. At the second focusing position, an object to be observed is positioned nearest to the optical system for stereoscopic vision. By making the distance between the two opening sections as mentioned above, it is possible to make an arrangement such that the stereoscopic effect is not excessively strong at the time of near-point observation, or it is possible to achieve a high depth resolution at the time of far-point observation.

In the optical system for stereoscopic vision of the present embodiment, it is preferable that the following conditional expression (5) be satisfied:

$$0.1 < LFGRG/Ltotal < 0.2 \tag{5}$$

where,

LFGRG denotes a distance on the optical axis from a lens surface nearest to an image in the front unit and a lens surface nearest to the object in the rear unit, and Ltotal denotes the distance on the optical axis from the predetermined object-side surface up to the image plane.

A distance on the optical axis form a lens surface positioned nearest to the image of the front unit up to a lens surface positioned nearest to the object of the rear unit indicates a distance between the front unit and the rear unit.

In a case of falling below a lower limit value of conditional expression (5), the distance between the front unit and the rear unit becomes excessively small. In this case, an angle of an off-axis light ray incident on the stop or an angle of an off-axis light ray emerged from the stop becomes large. Consequently, correction of an off-axis aberration becomes difficult. The coma in particular, is susceptible to occur. Therefore, falling below the lower limit value of conditional expression (5) is not preferable.

In a case of exceeding an upper limit value of conditional expression (5), the distance between the front unit and the rear unit becomes excessively long. In this case, both a diameter of a lens in the front unit and a diameter of a lens in the rear unit become large. Therefore, exceeding the upper limit value of conditional expression (5) is not preferable.

In the optical system for stereoscopic vision of the present embodiment, it is preferable that the following conditional expression (6) be satisfied:

$$0.1 < Le/Ls < 0.7 \quad (6)$$

where,

Le denotes a distance on the optical axis from the predetermined object-side surface up to the position of a first entrance pupil or a distance on the optical axis from the predetermined object-side surface up to the position of a second entrance pupil, Ls denotes the distance on the optical axis from the predetermined object-side surface up to the stop, the first entrance pupil is the entrance pupil of the first optical system, and the second entrance pupil is the entrance pupil of the second optical system.

In a case of falling below a lower limit value of conditional expression (6), a distance between the entrance pupil and the stop becomes excessively long. In this case, the stop is drawn away excessively toward the image side from the preferable position. Consequently, it becomes difficult to achieve adequately the effect of adjusting the stereoscopic effect by the movement of the stop.

For achieving the effect of adjusting the stereoscopic effect by the movement of the stop, it is necessary to make an amount of movement of the stop large. However, when the amount of movement of the stop is made large, the optical system becomes large in size. Moreover, an off-axis aberration, particularly the coma and the distortion, occurs largely.

When the amount of movement of the stop is made large, the center of the opening section is drawn away largely from the optical axis of the optical system. In this case, there is a difference in angles of incidence of light rays at two image points. This will be described by using FIG. 3C.

An object point OB+ and an object point OB− are positioned symmetrically about a central axis AXC. An image point IM+ and an image point IM− are positioned symmetrically about an optical axis AX1. The image point IM+ is an image of the object point OB+ and an image point IM− is an image of the object point OB−.

A light beam emerged from the object point OB+ reaches the image point IM+. A principal light ray Lpr+ of a light beam that reaches the image point IM+ is incident obliquely on an image plane IM as shown by a broken line. A light beam emerged from the object point OB− reaches the image point IM−. A principal light ray Lpr− of a light beam that reaches the image point IM− is incident obliquely on an image plane IM as shown by an alternate long and two short dashes line.

The center of the opening section is decentered with respect to the central axis AXC. In this case, an optical-path length of the principal light ray Lpr+ and an optical-path length of the principal light ray Lpr− are different. Therefore, an angle of incidence of the principal light ray Lpr+ and an angle of incidence of the principal light ray Lpr− are different. The angle of incidence of the principal light ray Lpr+ is an angle made by the principal light ray Lpr+ and a normal of the image plane IM. The angle of incidence of the principal light ray Lpr− is an angle made by the principal light ray Lpr− and the normal of the image plane IM.

Furthermore, in FIG. 3C, the center of the opening section is decentered with respect to the optical axis AX1 and the optical axis AX2. Consequently, a difference between the angle of incidence of the principal light ray Lpr+ and the angle of incidence of the principal light ray Lpr− becomes further larger.

It is possible to view stereoscopically by using an image of an optical image. In this case, for acquiring the image of the optical image, an imager is disposed on the image plane. For carrying out the stereoscopic vision favorably, it is preferable to carry out positioning of the imager and the optical system with high accuracy at the time of manufacturing.

In a case of falling below a lower limit value of conditional expression (6), consequently, there is a large difference between angles of incidence of light rays at two image points. In such state, when there is a shift in positioning of the imager and the optical system, an image pickup range of the first optical system and an image pickup range of the second optical system are shifted largely. Therefore, falling below the lower limit value of conditional expression (6) is not preferable.

In an optical system in which an optical element is positioned nearest to the object, it is preferable to make a diameter of the optical element small. Moreover, as an optical system, it is preferable to secure a wide angle of view. Particularly in an optical system to be used in an endoscope, a wide angle of view is sought.

In a case of exceeding an upper limit value of conditional expression (6), a distance between the entrance pupil and the stop becomes excessively small. In this case, the stop is drawn away excessively toward the entrance pupil from a preferable position. Therefore, even when the diameter of the optical element could be made small or the wide angle of view could be secured, consequently, the stop has to be brought closer to the object.

Moreover, it becomes difficult to widen the angle of view of the optical system with conditional expression (1) satisfied. When an attempt is made to widen the angle of view of the optical system, the optical system has to be made large.

Moreover, it becomes difficult to secure an adequate F-number. Consequently, it becomes difficult to make the depth resolution adequately small. Therefore, exceeding the upper limit value of conditional expression (6) is not preferable.

In the optical system for stereoscopic vision of the present embodiment, it is preferable that the following conditional expression (7) be satisfied:

$$0.4 < Ds/De < 1.5 \quad (7)$$

where,

Ds denotes a distance between a center of the first opening section and a center of the second opening section, De denotes the distance between the center of the first entrance pupil and the center of the second entrance pupil, the first opening section is an opening section of an opening of the first optical system, the second opening section is an opening section of an opening of the second optical system, the first entrance pupil is the entrance pupil of the first optical system, and the second entrance pupil is the entrance pupil of the second optical system.

In a case of falling below a lower limit value of conditional expression (7), a distance between the two opening sections becomes excessively small with respect to the distance between the two entrance pupils. In this case, it is not possible to achieve adequately the effect of adjusting the stereoscopic effect by the movement of the stop. For achieving the effect of adjusting the stereoscopic effect by the movement of the stop, it is necessary to make the amount of movement of the stop large. However, when the amount of movement of the stop is made large, the optical system becomes large in size.

As mentioned above, when the amount of movement of the stop is made large, there is a difference between the angles of incidence of light rays at two image points. In this state, when there is a shift in positioning of the imager and the optical system, the image pickup range of the first optical system and the image pickup range of the second optical system are shifted largely. Therefore, falling below the lower limit value of conditional expression (7) is not preferable.

In a case in which a lens is positioned nearest to the object, it is preferable to make a diameter of this lens small.

In a case of exceeding an upper limit value of conditional expression (7), the distance between the two opening sections becomes excessively large with respect to the distance between the two entrance pupils. In this case, even when the diameter of the lens could be made small, consequently, the stop has to be brought closer to object. Therefore, it becomes difficult to widen the angle of view of the optical system. When an attempt is made to widen the angle of view of the optical system, the optical system has to be made large.

Moreover, it becomes difficult to secure an adequate F-number. Consequently, it becomes difficult to make the depth resolution adequately small. Therefore, exceeding the upper limit value of conditional expression (7) is not preferable.

In the optical system for stereoscopic vision of the present embodiment, it is preferable that the following conditional expression (8) be satisfied:

$$0.9 < Le/IH < 1.8 \quad (8)$$

where,

Le denotes the distance on the optical axis from the predetermined object-side surface up to the position of the first entrance pupil or the distance on the optical axis from the predetermined object-side surface up to the position of the second entrance pupil, IH denotes the maximum image height, the first entrance pupil is the entrance pupil of the first optical system, and the second entrance pupil is the entrance pupil of the second optical system.

In a case of falling below a lower limit value of conditional expression (8), the entrance pupil is drawn away excessively toward the object side from the preferable position. In this case, even when conditional expression (1) is satisfied, a barrel-shape distortion occurs as a result. Consequently, a difference between an inward angle at a center of the image and an inward angle at a periphery of the image becomes large. Therefore, falling below a lower limit value of conditional expression (8) is not preferable.

In a case of exceeding an upper limit value of conditional expression (8), the entrance pupil is drawn away excessively toward the image side from the preferable position. In this case, in the optical system in which the optical element is positioned nearest to the object, a distance from an object-side surface of the optical element up to the entrance pupil becomes large. Consequently, when the angle of view is widened, a diameter of this optical element becomes large. Therefore, exceeding the upper limit value of conditional expression (8) is not preferable.

In the optical system for stereoscopic vision of the present embodiment, it is preferable that the following conditional expression (9) be satisfied:

$$-0.2 < IH/FLFG < 1.0 \quad (9)$$

where,

FLFG denotes a focal length of the front unit, and

IH denotes the maximum image height.

In a case of falling below a lower limit value of conditional expression (9), in a case in which the refractive power of the front unit is negative, the refractive power of the front unit becomes excessively large. In this case, a light beam passed through the stop becomes a largely-diverged light beam. Consequently, a diameter of the rear unit becomes large. Therefore, falling below the lower limit value of conditional expression (9) is not preferable.

In a case of exceeding an upper limit value of conditional expression (9), in a case in which the refractive power of the front unit is positive, the refractive power of the front unit becomes excessively large. In this case, particularly the coma occurs at a lens positioned on the image side of the first negative lens. Consequently, correction of the coma becomes difficult. Moreover, it also becomes difficult to maintain a wide angle of view. Therefore, exceeding the upper limit value of conditional expression (9) is not preferable.

In the optical system for stereoscopic vision of the present embodiment, it is preferable that the following conditional expression (10) is satisfied at the arbitrary focusing position:

$$2.0 < FLRG/IH < 6.0 \quad (10)$$

where,

FLRG denotes a focal length of the rear unit, and

IH denotes the maximum image height.

In a case of falling below a lower limit value of conditional expression (10), the refractive power of the rear unit becomes excessively large. In this case, it becomes difficult to secure a drive range of the focusing lens appropriately. When it is not possible to secure the drive range appropriately, the focal length of the focusing lens has to be made small. When the focal length of the focusing lens is made small, it becomes difficult to suppress a fluctuation in aberration at the time of focusing.

In a case of exceeding an upper limit value of conditional expression (10), the refractive power of the rear unit becomes excessively small. In this case, since the focal length of the rear unit becomes excessively long, a height of a light ray passing through the rear unit becomes excessively high. As a result, the optical system becomes large in size.

In the optical system for stereoscopic vision of the present embodiment, it is preferable that each of the two rear units include a focusing lens, and the following conditional expression (11) be satisfied at the arbitrary position:

$$2.0 < |FL\text{focus}|/FL < 50.0 \tag{11}$$

where,

FLfocus denotes a focal length of the focusing lens, and FL denotes a focal length of the overall optical system for stereoscopic-vision.

In a case of falling below a lower limit value of conditional expression (11), the refractive power of the focusing lens becomes excessively large. In this case, it becomes difficult to suppress the fluctuation in aberration at the time focusing. Therefore, falling below the lower limit value of conditional expression (11) is not preferable.

In a case of exceeding an upper limit value of conditional expression (11), the refractive power of the focusing lens becomes excessively small. In this case, since an amount of movement of the focusing lens has to be made large, a distance from the stop up to the image plane becomes long. Moreover, when an attempt is made to maintain the amount of movement of the stop and the F-number appropriately, a diameter of the overall optical system becomes large. Therefore, exceeding the upper limit value of conditional expression (11) is not preferable.

In the optical system for stereoscopic vision of the present embodiment, it is preferable that the following conditional expression (12) be satisfied:

$$|1-\Phi s\text{near}/\Phi s\ \text{max}| < 0.15 \tag{12}$$

where,

Φsnear denotes a diameter of an opening of the stop at a first focusing position, Φsmax denotes the maximum diameter of the opening of the stop from the first focusing position up to a second focusing position, the first focusing position is a position nearest to the optical system for stereoscopic vision, in a focusing range of the optical system for stereoscopic vision, and the second focusing position is a position farthest from the optical system for stereoscopic vision, in the focusing range of the optical system for stereoscopic vision.

In a case in which it is not possible to satisfy conditional expression (12), it becomes difficult to secure an adequate depth resolution.

In the optical system for stereoscopic vision of the present embodiment, it is preferable that the following conditional expression (13) be satisfied:

$$|1-\Phi s\text{far}/\Phi s\ \text{max}| < 0.15 \tag{13}$$

where,

Φsfar denotes a diameter of an opening of the stop at the second focusing position, Φsmax denotes the maximum diameter of the opening of the stop from the first focusing position up to the second focusing position, the first focusing position is the position nearest to the optical system for stereoscopic vision, in the focusing range of the optical system for stereoscopic vision, and the second focusing position is the position farthest from the optical system for stereoscopic vision, in the focusing range of the optical system for stereoscopic vision.

In a case in which it is not possible to satisfy conditional expression (13), it becomes difficult to secure the adequate depth resolution.

In the optical system for stereoscopic vision of the present embodiment, it is preferable that the optical system for stereoscopic vision include a lens component, the lens component is a single lens or a cemented lens, the front unit includes an image-side lens component nearest to the image, and the following conditional expression (14) be satisfied:

$$2.5 < FLFGc/IH < 7.0 \tag{14}$$

where,

FLFGc denotes a focal length of the image-side lens component, and

IH denotes the maximum image height.

In a case of falling below a lower limit value of conditional expression (14), the refractive power of the image-side lens component becomes excessively large. In this case, the spherical aberration and the coma occur largely. Therefore, falling below the lower limit value of conditional expression (14) is not preferable.

In a case of exceeding an upper limit value of conditional expression (14), the refractive power of the image-side lens component becomes excessively small. In this case, since a height of a light ray incident on the rear unit becomes high, the rear unit becomes large in size. Therefore, exceeding the upper limit value of conditional expression (14) is not preferable.

In the optical system for stereoscopic vision of the present embodiment, it is preferable that the optical system for stereoscopic vision include the lens component, the lens component is a single lens or a cemented lens, the rear unit includes an object-side lens component nearest to the object, and the following conditional expression (15) is satisfied:

$$2.0 < FLRGc/IH < 40.0 \tag{15}$$

where,

FLRGc denotes a focal length of the object-side lens component, and

IH denotes the maximum image height.

In a case of falling below a lower limit value of conditional expression (15), the refractive power of the object-side lens component becomes excessively large. In this case, the spherical aberration and the coma occur largely. Therefore, falling below the lower limit value of conditional expression (15) is not preferable.

In a case of exceeding a value exceeds an upper limit value of conditional expression (15), the refractive power of the object-side lens component becomes excessively small. In this case, on the image side of the object-side lens component, a height of a light ray becomes high. Consequently, the rear unit becomes large in size. Therefore, exceeding the upper limit value of conditional expression (15) is not preferable.

In the optical system for stereoscopic vision of the present embodiment, it is preferable that each of the two rear units include a plurality of positive lenses, and at least one negative lens be disposed between the two positive lenses.

By making such arrangement, it is possible to make the rear unit small-sized while correcting an off-axis aberration favorably.

In the optical system for stereoscopic vision of the present embodiment, it is preferable that the optical system for stereoscopic vision include the lens component, the lens component is a single lens or a cemented lens, the rear unit include the object-side lens component nearest to the object, and the following conditional expression (16) be satisfied:

$$1.0 < -1 \times RRGc/IH < 10.0 \quad (16)$$

where,

RRGc denotes a radius curvature of an image-side surface of the object-side lens component, and IH denotes the maximum image height.

In a case of falling below a lower limit value of conditional expression (16), the radius of curvature of the image-side surface of the object-side lens component becomes excessively small. In this case, the spherical aberration and the coma occur largely. Therefore, falling below the lower limit value of conditional expression (16) is not preferable.

In a case of exceeding an upper limit value of conditional expression (16), the radius of curvature of the image-side surface of the object-side lens component becomes excessively small. In this case, both a height of an off-axis light ray and a height of an axial light ray become high. Therefore, exceeding the upper limit value of conditional expression (16) is not preferable.

In the optical system for stereoscopic vision according to the present embodiment, it is preferable that the optical system for stereoscopic vision include the lens component, the lens component is a single lens or a cemented lens, the front unit include a lens component having a positive refractive power and an image-side lens component, the lens component having a positive refractive power be positioned on the object side of the image-side lens component, and the image-side lens component have a positive refractive power and be disposed nearest to the image.

In this case, two lens components having a positive refractive power are disposed between the first negative lens and the stop. Therefore, it is possible to prevent a height of a light ray from becoming high in the front unit, and to suppress an angle of incidence when an off-axis light ray is incident on the stop. As a result, it is possible to prevent a height of a light ray from becoming high even in the rear unit. Moreover, it is possible to suppress an occurrence of the spherical aberration and an occurrence of the coma.

In the optical system for stereoscopic vision of the present embodiment, it is preferable that the following conditional expression (17) be satisfied:

$$2.0 < FLFGpc/IH < 100 \quad (17)$$

where,

FLFGpc denotes a focal length of the lens component having a positive refractive power, and IH denotes the maximum image height.

By satisfying conditional expression (17), it is possible to prevent further both the height of a light ray in the front unit and the height of a light ray in the rear unit from becoming high. Moreover, it is possible to suppress further the occurrence of the spherical aberration and the occurrence of the coma.

In the optical system for stereoscopic vision of the present embodiment, it is preferable that a second negative lens be disposed on the image side of the first negative lens.

By making such arrangement, it is possible to prevent the height of a light ray in the front unit from becoming high as well as to suppress the angle of incidence when an off-axis light ray is incident on the stop. As a result, it is possible to prevent the height of a light ray from becoming high even in the rear unit. Moreover, it is possible to suppress the occurrence of the spherical aberration and the occurrence of the coma.

In the optical system for stereoscopic vision of the present embodiment, it is preferable that the following conditional expression (18) be satisfied:

$$-7.0 < FLFGn2/IH < -1.0 \quad (18)$$

where,

FLFGn2 denotes a focal length of the second negative lens, and

IH denotes the maximum image height.

By satisfying conditional expression (18), it is possible to prevent further both the height of a light ray in the front unit and the height of a light ray in the rear unit from becoming high. Moreover, it is possible to suppress further the occurrence of the spherical aberration and the occurrence of the coma.

In the optical system for stereoscopic vision of the present embodiment, it is preferable that the optical system for stereoscopic vision include the lens component, the lens component is a single lens or a cemented lens, and the rear unit includes a lens component having a positive refractive power, nearest to the image.

When the stop is moved, the angle of incidence of a light ray at the image plane varies. By making the abovementioned arrangement, it is possible to suppress the variation in the angle of incidence at the image plane. It is possible to dispose an imager at the image plane. The imager has a peculiarity of a light-receiving sensitivity differing according to the angle of incidence. By suppressing the variation in the angle of incidence at the image plane, it is possible to reduce an effect due to this peculiarity, such as a peripheral darkening of an image.

In the optical system for stereoscopic vision of the present embodiment, it is preferable that the optical system for stereoscopic vision include an optical element disposed nearest to the object, and the optical element have an area in which a light beam incident on the first optical system and a light beam incident on the second optical system overlap.

By making such arrangement, it is possible to protect the first optical system and the second optical system, and to make the optical system small-sized. The optical system may include one member or two members.

It is preferable that the optical system for stereoscopic vision of the present embodiment include the optical element disposed nearest to the object, the optical element have the area through which the light beam incident on the first optical system and the light beam incident on the second optical system pass, and two optical surfaces be parallel in the area.

In such manner, it is possible to suppress an occurrence of a decentration aberration in the optical element.

An image pickup apparatus of the present embodiment includes an optical system, and an imager having an image pickup surface, which converts an image formed on the image pickup surface by the optical system to an electric signal, and the optical system is the abovementioned optical system for stereoscopic vision.

According to the present embodiment, it is possible to acquire an image with a high depth resolution over a wide range.

For each conditional expression, the lower limit value and the upper limit value may be changed as shown below. Changing the upper limit value and the lower limit value as given below is favorable, as the effect of each conditional expression will be even more assured.

For conditional expression (1), it is preferable that the lower limit value be −10.00 or −8.00, and it is preferable that the upper limit value be −0.70 or −1.00.

For conditional expression (2), it is preferable that the lower limit value be 2.00 or 2.50, and it is preferable that the upper limit value be 7.00 or 6.00.

For conditional expression (3), it is preferable that the lower limit value be 0.30 or 0.35, and it is preferable that the upper limit value be 0.55 or 0.53.

For conditional expression (4), it is preferable that the lower limit value be 0.02, and it is preferable that the upper limit value be 0.90 or 0.70.

For conditional expression (5), it is preferable that the lower limit value be 0.03 or 0.04, and it is preferable that the upper limit value be 0.15 or 0.10.

For conditional expression (6), it is preferable that the lower limit value be 0.15 or 0.20, and it is preferable that the upper limit value be 0.60 or 0.50.

For conditional expression (7), it is preferable that the lower limit value be 0.50 or 0.60, and it is preferable that the upper limit value be 1.40 or 1.30.

For conditional expression (8), it is preferable that the lower limit value be 0.95 or 1.00, and it is preferable that the upper limit value be 1.70 or 1.60.

For conditional expression (9), it is preferable that the lower limit value be −0.10 or −0.08, and it is preferable that the upper limit value be 0.70 or 0.60.

For conditional expression (10), it is preferable that the lower limit value be 2.10 or 2.20, and it is preferable that the upper limit value be 5.80 or 5.50.

For conditional expression (11), it is preferable that the lower limit value be 4.00 or 5.00, and it is preferable that the upper limit value be 30.00 or 20.00.

For conditional expression (12), it is preferable that the upper limit value be 0.10 or 0.08.

For conditional expression (13), it is preferable that the upper limit value be 0.10 or 0.08.

For conditional expression (14), it is preferable that the lower limit value be 3.00 or 3.50, and it is preferable that the upper limit value be 6.50 or 6.00.

For conditional expression (15), it is preferable that the lower limit value be 2.50 or 3.00, and it is preferable that the upper limit value be 20.00 or 15.00.

For conditional expression (16), it is preferable that the lower limit value be 1.50 or 2.00, and it is preferable that the upper limit value be 7.00 or 5.00.

For conditional expression (17), it is preferable that the lower limit value be 2.50 or 3.50, and it is preferable that the upper limit value be 50.00 or 20.00.

For conditional expression (18), it is preferable that the lower limit value be −5.00 or −4.00, and it is preferable that the upper limit value be −1.50 or −2.00.

Examples of optical systems for stereoscopic vision will be described below in detail by referring to the accompanying diagrams. However, the present invention is not restricted to the examples described below.

Lens cross-sectional views of each example will be described below.

FIG. 1A, FIG. 2A, FIG. 3A, FIG. 4A, FIG. 5A, FIG. 6A, FIG. 7A, FIG. 8A, FIG. 9A, FIG. 10A, and FIG. 11A show lens cross-sectional views at the time of focusing to a near point.

FIG. 3B shows a lens cross-sectional view at the time of focusing to an intermediate point.

FIG. 1B, FIG. 2B, FIG. 3C, FIG. 4B, FIG. 5B, FIG. 6B, FIG. 7B, FIG. 8B, FIG. 9B, FIG. 10B, and FIG. 11B show lens cross-sectional views at the time of focusing to a far point. In the cross-sectional views, I denotes an image plane.

Aberration diagrams of each example will be described below.

FIG. 12A, FIG. 13A, FIG. 14A, FIG. 15A, FIG. 16A, FIG. 17A, FIG. 18A, FIG. 19A, FIG. 20A, FIG. 21A, FIG. 22A, FIG. 23A, FIG. 24A, FIG. 25A, FIG. 26A, FIG. 27A, FIG. 28A, FIG. 29A, FIG. 30A, FIG. 31A, FIG. 32A, FIG. 33A, FIG. 34A, FIG. 35A, FIG. 36A, FIG. 37A, FIG. 38A, FIG. 39A, FIG. 40A, FIG. 41A, FIG. 42A, FIG. 43A, FIG. 44A, FIG. 45A, FIG. 46A, FIG. 47A, FIG. 48A, FIG. 49A, FIG. 50A, FIG. 51A, FIG. 52A, FIG. 53A, FIG. 54A, FIG. 55A, and FIG. 56A show an astigmatism (AS).

FIG. 12B, FIG. 13B, FIG. 14B, FIG. 15B, FIG. 16B, FIG. 17B, FIG. 18B, FIG. 19B, FIG. 20B, FIG. 21B, FIG. 22B, FIG. 23B, FIG. 24B, FIG. 25B, FIG. 26B, FIG. 27B, FIG. 28B, FIG. 29B, FIG. 30B, FIG. 31B, FIG. 32B, FIG. 33B, FIG. 34B, FIG. 35B, FIG. 36B, FIG. 37B, FIG. 38B, FIG. 39B, FIG. 40B, FIG. 41B, FIG. 42B, FIG. 43B, FIG. 44B, FIG. 45B, FIG. 46B, FIG. 47B, FIG. 48B, FIG. 49B, FIG. 50B, FIG. 51B, FIG. 52B, FIG. 53B, FIG. 54B, FIG. 55B, and FIG. 56B show a distortion (DT).

FIG. 12C, FIG. 12D, FIG. 12E, FIG. 12F, FIG. 12G, FIG. 12H, FIG. 12I, FIG. 12J, FIG. 13C, FIG. 13D, FIG. 13E, FIG. 13F, FIG. 13G, FIG. 13H, FIG. 13I, FIG. 13J, FIG. 14C, FIG. 14D, FIG. 14E, FIG. 14F, FIG. 14G, FIG. 14H, FIG. 14I, FIG. 14J, FIG. 15C, FIG. 15D, FIG. 15E, FIG. 15F, FIG. 15G, FIG. 15H, FIG. 15I, FIG. 15J, FIG. 16C, FIG. 16D, FIG. 16E, FIG. 16F, FIG. 16G, FIG. 16H, FIG. 16I, FIG. 16J, FIG. 17C, FIG. 17D, FIG. 17E, FIG. 17F, FIG. 17G, FIG. 17H, FIG. 17I, FIG. 17J, FIG. 18C, FIG. 18D, FIG. 18E, FIG. 18F, FIG. 18G, FIG. 18H, FIG. 18I, FIG. 18J, FIG. 19C, FIG. 19D, FIG. 19E, FIG. 19F, FIG. 19G, FIG. 19H, FIG. 19I, and FIG. 19J show a transverse aberration.

FIG. 20C, FIG. 20D, FIG. 20E, FIG. 20F, FIG. 20G, FIG. 20H, FIG. 20I, FIG. 20J, FIG. 21C, FIG. 21D, FIG. 21E, FIG. 21F, FIG. 21G, FIG. 21H, FIG. 21I, FIG. 21J, FIG. 22C, FIG. 22D, FIG. 22E, FIG. 22F, FIG. 22G, FIG. 22H, FIG. 22I, FIG. 22J, FIG. 23C, FIG. 23D, FIG. 23E, FIG. 23F, FIG. 23G, FIG. 23H, FIG. 23I, FIG. 23J, FIG. 24C, FIG. 24D, FIG. 24E, FIG. 24F, FIG. 24G, FIG. 24H, FIG. 24I, FIG. 24J, FIG. 25C, FIG. 25D, FIG. 25E, FIG. 25F, FIG. 25G, FIG. 25H, FIG. 25I, FIG. 25J, FIG. 26C, FIG. 26D, FIG. 26E, FIG. 26F, FIG. 26G, FIG. 26H, FIG. 26I, FIG. 26J, FIG. 27C, FIG. 27D, FIG. 27E, FIG. 27F, FIG. 27G, FIG. 27H, FIG. 27I, FIG. 27J, FIG. 28C, FIG. 28D, FIG. 28E, FIG. 28F, FIG. 28G, FIG. 28H, FIG. 28I, FIG. 28J, FIG. 29C, FIG. 29D, FIG. 29E, FIG. 29F, FIG. 29G, FIG. 29H, FIG. 29I, and FIG. 29J show a transverse aberration.

FIG. 30C, FIG. 30D, FIG. 30E, FIG. 30F, FIG. 30G, FIG. 30H, FIG. 30I, FIG. 30J, FIG. 31C, FIG. 31D, FIG. 31E, FIG. 31F, FIG. 31G, FIG. 31H, FIG. 31I, FIG. 31J, FIG. 32C, FIG. 32D, FIG. 32E, FIG. 32F, FIG. 32G, FIG. 32H, FIG. 32I, FIG. 32J, FIG. 33C, FIG. 33D, FIG. 33E, FIG. 33F, FIG. 33G, FIG. 33H, FIG. 33I, FIG. 33J, FIG. 34C, FIG. 34D, FIG. 34E, FIG. 34F, FIG. 34G, FIG. 34H, FIG. 34I, FIG. 34J, FIG. 35C, FIG. 35D, FIG. 35E, FIG. 35F, FIG. 35G, FIG. 35H, FIG. 35I, FIG. 35J, FIG. 36C, FIG. 36D, FIG. 36E, FIG. 36F, FIG. 36G, FIG. 36H, FIG. 36I, FIG. 36J, FIG. 37C, FIG. 37D, FIG. 37E, FIG. 37F, FIG. 37G, FIG. 37H, FIG. 37I, FIG. 37J, FIG. 38C, FIG. 38D, FIG. 38E, FIG. 38F, FIG. 38G, FIG. 38H, FIG. 38I, FIG. 38J, FIG. 39C, FIG. 39D, FIG. 39E, FIG. 39F, FIG. 39G, FIG. 39H, FIG. 39I, and FIG. 39J show a transverse aberration.

FIG. 40C, FIG. 40D, FIG. 40E, FIG. 40F, FIG. 40G, FIG. 40H, FIG. 40I, FIG. 40J, FIG. 41C, FIG. 41D, FIG. 41E, FIG. 41F, FIG. 41G, FIG. 41H, FIG. 41I, FIG. 41J, FIG. 42C, FIG. 42D, FIG. 42E, FIG. 42F, FIG. 42G, FIG. 42H,

FIG. 42I, FIG. 42J, FIG. 43C, FIG. 43D, FIG. 43E, FIG. 43F, FIG. 43G, FIG. 43H, FIG. 43I, FIG. 43J, FIG. 44C, FIG. 44D, FIG. 44E, FIG. 44F, FIG. 44G, FIG. 44H, FIG. 44I, FIG. 44J, FIG. 45C, FIG. 45D, FIG. 45E, FIG. 45F, FIG. 45G, FIG. 45H, FIG. 45I, FIG. 45J, FIG. 46C, FIG. 46D, FIG. 46E, FIG. 46F, FIG. 46G, FIG. 46H, FIG. 46I, FIG. 46J, FIG. 47C, FIG. 47D, FIG. 47E, FIG. 47F, FIG. 47G, FIG. 47H, FIG. 47I, FIG. 47J, FIG. 48C, FIG. 48D, FIG. 48E, FIG. 48F, FIG. 48G, FIG. 48H, FIG. 48I, FIG. 48J, FIG. 49C, FIG. 49D, FIG. 49E, FIG. 49F, FIG. 49G, FIG. 49H, FIG. 49I, and FIG. 49J show a transverse aberration.

FIG. 50C, FIG. 50D, FIG. 50E, FIG. 50F, FIG. 50G, FIG. 50H, FIG. 50I, FIG. 50J, FIG. 51C, FIG. 51D, FIG. 51E, FIG. 51F, FIG. 51G, FIG. 51H, FIG. 51I, FIG. 51J, FIG. 52C, FIG. 52D, FIG. 52E, FIG. 52F, FIG. 52G, FIG. 52H, FIG. 52I, FIG. 52J, FIG. 53C, FIG. 53D, FIG. 53E, FIG. 53F, FIG. 53G, FIG. 53H, FIG. 53I, FIG. 53J, FIG. 54C, FIG. 54D, FIG. 54E, FIG. 54F, FIG. 54G, FIG. 54H, FIG. 54I, FIG. 54J, FIG. 55C, FIG. 55D, FIG. 55E, FIG. 55F, FIG. 55G, FIG. 55H, FIG. 55I, FIG. 55J, FIG. 56C, FIG. 56D, FIG. 56E, FIG. 56F, FIG. 56G, FIG. 56H, FIG. 56I, and FIG. 56J show a transverse aberration.

For examples 1 to 5, 7, and 8, there are six types of aberration diagrams for each example. A position of an object to be observed and a distance between the two stops are different in each aberration diagram. A relationship between the position of the object to be observed and the distance between the two stops in each aberration diagram is indicated in table 1. Aberration diagrams of an example 1 are taken for example in Table 1.

TABLE 1

| Aberration diagram | Position of object to be observed | Distance between two stops |
|---|---|---|
| FIG. 12 | near point | narrow |
| FIG. 13 | | intermediate |
| FIG. 14 | | wide |
| FIG. 15 | far point | narrow |
| FIG. 16 | | intermediate |
| FIG. 17 | | wide |

In the transverse aberration, the maximum value of the horizontal axis is ±20 µm. A vertical axis is normalized by an entrance-pupil diameter. Ta denotes a tangential direction and Sa denotes a sagittal direction. Moreover, IH 0 denotes an axial, IH 0.5 denotes 0.5 times of the maximum image height, IH 0.7 denotes 0.7 times of the maximum image height, and IH 1.0 denotes 1.0 times of the maximum image height.

An optical system for stereoscopic vision of the example 1 includes in order from an object side, a planoconcave negative lens L1, a biconcave negative lens L2, a biconvex positive lens L3, a negative meniscus lens L4 having a convex surface directed toward an image side, a biconvex positive lens L5, a negative meniscus lens L6 having a convex surface directed toward the object side, a biconvex positive lens L7, a biconcave negative lens L8, a biconvex positive lens L9, and a positive meniscus lens L10 having a convex surface directed toward the image side.

The biconvex positive lens L3 and the negative meniscus lens L4 are cemented. The negative meniscus lens L6 and the biconvex positive lens L7 are cemented. The biconcave negative lens L8 and the biconvex positive lens L9 are cemented.

An aperture stop S is disposed between the biconvex positive lens L5 and the negative meniscus lens L6. A cover glass C1 is disposed on the object side of the planoconcave negative lens L1. The cover glass C1 is an optical element disposed nearest to an object. A cover glass C2 and a cover glass C3 are disposed on the image side of the positive meniscus lens L10.

At a time of focusing from a near point to a far point, the positive meniscus lens L10 moves toward the image side.

An aspheric surface is provided to a total of five surfaces which are an image side surface of the planoconcave negative lens L1, an image-side surface of the biconcave negative lens L2, an object-side surface of the biconvex positive lens L5, an image-side surface of the biconvex positive lens L9, and an image-side surface of the positive meniscus lens L10.

An optical system for stereoscopic vision of the example 2 includes in order from an object side, a planoconcave negative lens L1, a biconcave negative lens L2, a biconvex positive lens L3, a biconcave negative lens L4, a biconvex positive lens L5, a biconvex positive lens L6, a negative meniscus lens L7 having a convex surface directed toward the object side, a biconvex positive lens L8, a biconvex positive lens L9, a biconcave negative lens L10, and a positive meniscus lens L11 having a convex surface directed toward an image side.

The biconvex positive lens L3, the biconcave negative lens L4, and the biconvex positive lens L5 are cemented. The negative meniscus lens L7 and the biconvex positive lens L8 are cemented. The biconvex positive lens L9 and the biconcave negative lens L10 are cemented.

An aperture stop S is disposed between the biconvex positive lens L6 and the negative meniscus lens L7. A cover glass C1 is disposed on the object side of the planoconcave negative lens L1. The cover glass C1 is an optical element disposed nearest to an object. A cover glass C2 and a cover glass C3 are disposed on the image side of the positive meniscus lens L11.

At a time of focusing from a near point to a far point, the positive meniscus lens L11 moves toward the image side.

An aspheric surface is provided to a total of eight surfaces which are an image-side surface of the planoconcave negative lens L1, both surfaces of the biconvex positive lens L6, an image-side surface of the biconvex positive lens L8, an object-side surface of the biconvex positive lens L9, an image-side surface of the biconcave negative lens L10, and both surfaces of the positive meniscus lens L11.

An optical system for stereoscopic vision of the example 3 includes in order from an object side, a planoconcave negative lens L1, a positive meniscus lens L2 having a convex surface directed toward an image side, a biconvex positive lens L3, a biconvex positive lens L4, a negative meniscus lens L5 having a convex surface directed toward the object side, a biconvex positive lens L6, and a positive meniscus lens L7 having a convex surface directed toward the object side.

The negative meniscus lens L5 and the biconvex positive lens L6 are cemented.

An aperture stop S is disposed between the biconvex positive lens L3 and the biconvex positive lens L4. A cover glass C1 is disposed on the object side of the planoconcave negative lens L1. The cover glass C1 is an optical element disposed nearest to an object. A cover glass C2 and a cover glass C3 are disposed on the image side of the positive meniscus lens L7.

At a time of focusing from a near point to a far point, the positive meniscus lens L7 moves toward the object side.

An aspheric surface is provided to a total of four surfaces which are an image-side surface of the planoconcave negative lens L1, both surfaces of the biconvex positive lens L4, and an image-side surface of the positive meniscus lens L7.

An optical system for stereoscopic vision of the example 4 includes in order from an object side, a negative meniscus lens L1 having a convex surface directed toward an image side, a biconcave negative lens L2, a biconvex positive lens L3, a negative meniscus lens L4 having a convex surface directed toward the image side, a biconvex positive lens L5, a negative meniscus lens L6 having a convex surface directed toward the object side, a biconvex positive lens L7, a biconcave negative lens L8, a biconvex positive lens L9, and a positive meniscus lens L10 having a convex surface directed toward the image side.

The biconvex positive lens L3 and the negative meniscus lens L4 are cemented. The negative meniscus lens L6 and the biconvex positive lens L7 are cemented. The biconcave negative lens L8 and the biconvex positive lens L9 are cemented.

An aperture stop S is disposed between the biconvex positive lens L5 and the negative meniscus lens L6. A cover glass C1 is disposed on the object side of the negative meniscus lens L1. The cover glass C1 is an optical element disposed nearest to an object. A cover glass C2 and a cover glass C3 are disposed on the image side of the positive meniscus lens L10.

At a time of focusing from a near point to a far point, the positive meniscus lens L10 moves toward the image side.

An aspheric surface is provided to a total of five surfaces which are an image-side surface of the negative meniscus lens L1, an image-side surface of the biconcave negative lens L2, an object-side surface of the biconvex positive lens L5, an image-side surface of the biconvex positive lens L9, and an image-side surface of the positive meniscus lens L10.

An optical system for stereoscopic vision of the example 5 includes in order from an object side, a negative meniscus lens L1 having a convex surface directed toward the object side, a planoconcave negative lens L2, a positive meniscus lens L3 having a convex surface directed toward an image side, a biconvex positive lens L4, a positive meniscus lens L5 having a convex surface directed toward the image side, a negative meniscus lens L6 having a convex surface directed toward the object side, a biconvex positive lens L7, and a positive meniscus lens L8 having a convex surface directed toward the image side.

The negative meniscus lens L6 and the biconvex positive lens L7 are cemented.

An aperture stop S is disposed between the biconvex positive lens L4 and the positive meniscus lens L5. A cover glass C1 is disposed on the object side of the negative meniscus lens L1. The cover glass C1 is an optical element disposed nearest to an object. A cover glass C2 and a cover glass C3 are disposed on the image side of the positive meniscus lens L8.

At a time of focusing from a near point to a far point, the positive meniscus lens L8 moves toward the image side.

An aspheric surface is provided to a total of five surfaces which are an image-side surface of the negative meniscus lens L1, both surfaces of the positive meniscus lens L5, and both surfaces of the positive meniscus lens L8.

An optical system for stereoscopic vision of an example 6 includes in order from an object side, a planoconcave negative lens L1, a negative meniscus lens L2 having a convex surface directed toward an image side, a biconvex positive lens L3, a positive meniscus lens L4 having a convex surface directed toward the object side, a positive meniscus lens L5 having a convex surface directed toward the image side, a positive meniscus lens L6 having a convex surface directed toward the image side, a biconvex positive lens L7, a negative meniscus lens L8 having a convex surface directed toward the image side, and a biconvex positive lens L9.

The biconvex positive lens L7 and the negative meniscus lens L8 are cemented.

An aperture stop S is disposed between the positive meniscus lens L4 and the positive meniscus lens L5. A cover glass C1 and a cover glass C2 are disposed on the image side of the biconvex positive lens L9.

An optical system for stereoscopic vision of the example 7 includes in order from an object side, a planoconcave negative lens L1, a negative meniscus lens L2 having a convex surface directed toward the object side, a positive meniscus lens L3 having a convex surface directed toward the image side, a biconvex positive lens L4, a negative meniscus lens L5 having a convex surface directed toward the object side, a biconvex positive lens L6, a biconcave negative lens L7, and a biconvex positive lens L8.

An aperture stop S is disposed between the biconvex positive lens L4 and the negative meniscus lens L5. A cover glass C is disposed on the image side of the biconvex positive lens L8.

At a time of focusing from a near point to a far point, the negative meniscus lens L5 moves toward the object side.

An optical system for stereoscopic vision of the example 8 includes in order from an object side, a planoconcave negative lens L1, a biconcave negative lens L2, a biconvex positive lens L3, a negative meniscus lens L4 having a convex surface directed toward an image side, a biconvex positive lens L5, a negative meniscus lens L6 having a convex surface directed toward the object side, a biconvex positive lens L7, a biconcave negative lens L8, a biconvex positive lens L9, a positive meniscus lens L10 having a convex surface directed toward the image side, and a planoconvex positive lens L11.

The biconvex positive lens L3 and the negative meniscus lens L4 are cemented. The negative meniscus lens L6 and the biconvex positive lens L7 are cemented. The biconcave negative lens L8 and the biconvex positive lens L9 are cemented.

An aperture stop S is disposed between the biconvex positive lens L5 and the negative meniscus lens L6. A cover glass C1 is disposed on the object side of the planoconcave negative lens L1. The cover glass C1 is an optical element disposed nearest to an object. A cover glass C2 and a cover glass C3 are disposed on the image side of the planoconvex positive lens L11. The planoconvex positive lens L11 is cemented to an object-side surface of the cover glass C2.

At a time of focusing from a near point to a far point, the positive meniscus lens L10 moves toward the image side.

An aspheric surface is provided to a total of five surfaces which are, an image-side surface of the planoconcave negative lens L1, an image-side surface of the biconcave negative lens L2, an object-side surface of the biconvex positive lens L5, an image-side surface of the biconvex positive lens L9, and an object-side surface of the planoconvex positive lens L11.

Numerical data of each example described above is shown below. In Surface data, r denotes radius of curvature of each lens surface, d denotes a distance between respective lens surfaces, nd denotes a refractive index of each lens for a d-line, vd denotes an Abbe number for each lens, and * denotes an aspherical surface.

In Various data, FOP denotes a focusing position, NP denotes a near point, IP denotes an intermediate point, and FP denotes a far point. Amount of decentering is an amount of decentering of the stop.

Moreover, a shape of an aspherical surface is defined by the following expression, where the direction of the optical axis is represented by z, the direction orthogonal to the optical axis is represented by y, a conical coefficient is represented by K, aspherical surface coefficients are represented by A4, A6, A8, A10, A12 . . . .

$$Z=(y^2/r)/[1+\{1-(1+k)(y/r)^2\}^{1/2}]+A4y^4+A6y^6+A8y^8+A10y^{10}+A12y^{12}+\ldots$$

Further, in the aspherical surface coefficients, 'e-n' (where, n is an integral number) indicates '$10^{-n}$'. Moreover, these symbols are commonly used in the following numerical data for each example.

Example 1

| Unit mm | | | | |
|---|---|---|---|---|
| Surface data | | | | |
| Surface no. | r | d | nd | vd |
| Object plane | ∞ | | | |
| 1 | ∞ | 0.54 | 1.76823 | 72.24 |
| 2 | ∞ | 0.33 | | |
| 3 | ∞ | 0.54 | 1.80610 | 40.93 |
| 4* | 4.508 | 0.76 | | |
| 5 | −3.795 | 0.38 | 1.74320 | 49.30 |
| 6* | 5.082 | 0.41 | | |
| 7 | 13.931 | 1.13 | 1.88300 | 40.77 |
| 8 | −3.163 | 0.30 | 1.56384 | 60.67 |
| 9 | −22.034 | 0.47 | | |
| 10* | 8.643 | 0.87 | 1.88300 | 40.77 |
| 11 | −11.714 | 0.55 | | |
| 12 (Stop) | ∞ | 0.56 | | |
| 13 | 19.694 | 0.38 | 1.84666 | 23.78 |
| 14 | 3.021 | 1.14 | 1.88300 | 40.77 |
| 15 | −6.629 | 0.33 | | |
| 16 | −21.997 | 0.33 | 1.84666 | 23.78 |
| 17 | 3.013 | 1.09 | 1.88300 | 40.77 |
| 18* | −12.587 | Variable | | |
| 19 | −7.252 | 0.41 | 1.80610 | 40.88 |
| 20* | −5.308 | Variable | | |
| 21 | ∞ | 0.44 | 1.51633 | 64.14 |
| 22 | ∞ | 0.02 | 1.51000 | 64.09 |
| 23 | ∞ | 0.44 | 1.61061 | 50.47 |
| 24 | ∞ | 0.00 | | |
| Image plane | ∞ | | | |

Aspherical surface data

4th surface k = 0.000
A4 = 3.44251e−03, A6 = 6.78741e−04

6th surface k = 0.000
A4 = −9.26457e−04

10th surface k = 0.000
A4 = −2.39432e−03, A6 = −4.61608e−05

18th surface k = 0.000
A4 = 4.14838e−03, A6 = 2.89674e−04

20th surface k = 0.000
A4 = 2.73075e−03, A6 = −1.43734e−04

| Various data | | | |
|---|---|---|---|
| FOP | NP | IP | FP |
| Amount of decentering | −0.51 | 0.0 | 0.51 |
| Object distance | 27.0 | 49.0 | 109.0 |
| d19 | 0.41 | 0.92 | 1.43 |
| d21 | 1.66 | 1.15 | 0.64 |

Example 2

| Unit mm | | | | |
|---|---|---|---|---|
| Surface data | | | | |
| Surface no. | r | d | nd | vd |
| Object plane | ∞ | | | |
| 1 | ∞ | 0.46 | 1.76823 | 72.24 |
| 2 | ∞ | 0.28 | | |
| 3 | ∞ | 0.46 | 1.88300 | 40.77 |
| 4* | 4.503 | 0.65 | | |
| 5 | −3.438 | 0.28 | 1.64000 | 60.08 |
| 6 | 3.997 | 0.23 | | |
| 7 | 19.148 | 0.75 | 1.88300 | 40.77 |
| 8 | −5.571 | 0.28 | 1.49700 | 81.14 |
| 9 | 88.858 | 0.65 | 1.88300 | 40.77 |
| 10 | −31.612 | 0.53 | | |
| 11* | 9.769 | 0.65 | 1.88300 | 40.77 |
| 12* | −9.207 | 0.28 | | |
| 13 (Stop) | ∞ | 0.28 | | |
| 14 | 5.891 | 0.32 | 1.92286 | 18.90 |
| 15 | 2.706 | 1.11 | 1.80610 | 40.93 |
| 16* | −6.303 | 0.37 | | |
| 17* | 13.686 | 0.74 | 1.80610 | 40.88 |
| 18 | −3.236 | 0.28 | 1.84666 | 23.78 |
| 19* | 20.792 | Variable | | |
| 20* | −4.524 | 0.37 | 1.80610 | 40.88 |
| 21* | −3.783 | Variable | | |
| 22 | ∞ | 0.37 | 1.51633 | 64.14 |
| 23 | ∞ | 0.02 | 1.51000 | 64.09 |
| 24 | ∞ | 0.37 | 1.61061 | 50.47 |
| 25 | ∞ | 0.00 | | |
| Image plane | ∞ | | | |

Aspherical surface data

4th surface k = 0.000
A4 = 5.58907e−03, A6 = 3.95110e−03

11th surface k = 0.000
A4 = −1.68689e−03

12th surface k = 0.000
A4 = −7.56880e−04

16th surface k = 0.000
A4 = −1.86174e−03

17th surface

-continued

| Unit mm |
|---|

| 19th surface |
|---|
| k = 0.000
A4 = 6.11973e−03 |
| 20th surface |
| k = 0.000 |
| 21st surface |
| k = 0.000
A4 = 2.49472e−03 |

| Various data | | | |
|---|---|---|---|
| FOP | NP | IP | FP |
| Amount of decentering | −0.56 | 0.0 | 0.56 |
| Object distance | 28.0 | 48.0 | 82.0 |
| d19 | 0.37 | 0.92 | 1.47 |
| d21 | 1.75 | 1.20 | 0.65 |

Example 3

| Unit mm | | | |
|---|---|---|---|
| Surface data | | | |
| Surface no. | r | d | nd | vd |
| Object plane | ∞ | | | |
| 1 | ∞ | 0.57 | 1.76823 | 72.24 |
| 2 | ∞ | 0.57 | | |
| 3 | ∞ | 0.57 | 1.88300 | 40.77 |
| 4* | 1.824 | 0.91 | | |
| 5 | −18.683 | 2.72 | 1.49700 | 81.14 |
| 6 | −7.381 | 0.11 | | |
| 7 | 5.073 | 1.60 | 1.80610 | 40.93 |
| 8 | −16.634 | 0.34 | | |
| 9 (Stop) | ∞ | 0.34 | | |
| 10* | 45.292 | 1.37 | 1.76450 | 49.10 |
| 11* | −4.718 | Variable | | |
| 12 | 18.854 | 0.40 | 1.89286 | 20.36 |
| 13 | 2.280 | 1.14 | 1.59522 | 67.74 |
| 14 | −22.920 | Variable | | |
| 15 | 8.328 | 1.14 | 1.88300 | 40.77 |
| 16* | 13.940 | 0.68 | | |
| 17 | ∞ | 0.46 | 1.51633 | 64.14 |
| 18 | ∞ | 0.02 | 1.51000 | 64.09 |
| 19 | ∞ | 0.46 | 1.61061 | 50.47 |
| 20 | ∞ | 0.00 | | |
| Image plane | ∞ | | | |

| Aspherical surface data |
|---|
| 4th surface |
| k = −0.284
A4 = 1.68509e−03, A6 = −1.60078e−03 |
| 10th surface |
| k = 0.000
A4 = −3.36652e−03, A6 = −1.66125e−04 |
| 11th surface |
| k = 0.000
A4 = 4.59119e−03, A6 = −2.35695e−04 |
| 16th surface |
| k = 0.000 |

-continued

| Unit mm | | | |
|---|---|---|---|
| Various data | | | |
| FOP | NP | IP | FP |
| Amount of decentering | −0.51 | 0.0 | 0.51 |
| Object distance | 34.2 | 52.4 | 114.0 |
| d12 | 0.89 | 0.79 | 0.69 |
| d15 | 0.82 | 0.92 | 1.02 |

Example 4

| Unit mm | | | |
|---|---|---|---|
| Surface data | | | |
| Surface no. | r | d | nd | vd |
| Object plane | ∞ | | | |
| 1 | ∞ | 0.48 | 1.76823 | 72.24 |
| 2 | ∞ | 0.29 | | |
| 3 | 8.871 | 0.48 | 1.80610 | 40.93 |
| 4* | 3.942 | 0.68 | | |
| 5 | −3.489 | 0.34 | 1.76450 | 49.10 |
| 6 | 4.269 | 0.30 | | |
| 7 | 21.441 | 1.08 | 1.88300 | 40.77 |
| 8 | −2.754 | 0.27 | 1.52249 | 59.84 |
| 9 | −19.593 | 0.29 | | |
| 10* | 7.802 | 0.77 | 1.88300 | 40.77 |
| 11 | −10.862 | 0.21 | | |
| 12 (Stop) | ∞ | 0.35 | | |
| 13 | 17.863 | 0.34 | 1.84666 | 23.78 |
| 14 | 3.027 | 1.06 | 1.88300 | 40.77 |
| 15 | −5.756 | 0.26 | | |
| 16 | −19.045 | 0.29 | 1.84666 | 23.78 |
| 17 | 2.525 | 1.06 | 1.88300 | 40.77 |
| 18* | −9.983 | Variable | | |
| 19 | −5.582 | 0.36 | 1.67790 | 54.89 |
| 20* | −4.161 | Variable | | |
| 21 | ∞ | 0.39 | 1.51633 | 64.14 |
| 22 | ∞ | 0.01 | 1.51000 | 64.09 |
| 23 | ∞ | 0.39 | 1.61061 | 50.47 |
| 24 | ∞ | 0.00 | | |
| Image plane | ∞ | | | |

| Aspherical surface data |
|---|
| 4th surface |
| k = 0.000
A4 = 3.38719e−03, A6 = 1.54687e−03 |
| 6th surface |
| k = 0.000
A4 = 2.20409e−03 |
| 10th surface |
| k = 0.000
A4 = −2.32878e−03, A6 = 1.18533e−04 |
| 18th surface |
| k = 0.000
A4 = 5.19576e−03, A6 = 5.22167e−04 |
| 20th surface |
| k = 0.000
A4 = 5.05269e−03, A6 = −2.80411e−04 |

| Various data | | | |
|---|---|---|---|
| FOP | NP | IP | FP |
| Amount of decentering | −0.68 | 0.0 | 0.68 |
| Object distance | 38.0 | 60.0 | 96.0 |

-continued

Unit mm

| | | | |
|---|---|---|---|
| d18 | 0.43 | 0.81 | 1.19 |
| d20 | 1.29 | 0.91 | 0.53 |

Example 5

Unit mm

Surface data

| Surface no. | r | d | nd | vd |
|---|---|---|---|---|
| Object plane | ∞ | | | |
| 1 | ∞ | 0.68 | 1.76823 | 72.24 |
| 2 | ∞ | 0.41 | | |
| 3 | 5.543 | 0.68 | 1.88300 | 40.77 |
| 4* | 2.706 | 1.35 | | |
| 5 | −5.999 | 0.41 | 1.72916 | 54.68 |
| 6 | 5.069 | 0.54 | | |
| 7 | −23.653 | 1.87 | 1.88300 | 40.77 |
| 8 | −5.645 | 0.14 | | |
| 9 | 6.840 | 2.14 | 1.88300 | 40.77 |
| 10 | −44.610 | 0.41 | | |
| 11 (Stop) | ∞ | 0.54 | | |
| 12* | −5.491 | 1.35 | 1.80610 | 40.88 |
| 13* | −3.788 | 0.53 | | |
| 14 | 33.574 | 0.47 | 1.92286 | 18.90 |
| 15 | 3.653 | 1.49 | 1.78650 | 50.00 |
| 16 | −5.011 | Variable | | |
| 17* | −10.860 | 0.54 | 1.88300 | 40.77 |
| 18* | −8.339 | Variable | | |
| 19 | ∞ | 0.54 | 1.51633 | 64.14 |
| 20 | ∞ | 0.03 | 1.51000 | 64.09 |
| 21 | ∞ | 0.54 | 1.61061 | 50.47 |
| 22 | ∞ | 0.00 | | |
| Image plane | ∞ | | | |

Aspherical surface data

4th surface k = −0.158
A4 = 2.28893e−03

12th surface k = 0.000
A4 = −4.03825e−03

13th surface k = 0.000
A4 = 2.33195e−03, A6 = 2.97252e−04

17th surface k = 0.000
A4 = 1.20236e−03, A6 = −3.76364e−04

18th surface k = 0.000
A4 = 2.63004e−03, A6 = −3.15932e−04

Various data

| | FOP | NP | IP | FP |
|---|---|---|---|---|
| Amount of decentering | | −0.61 | 0.0 | 0.61 |
| Object distance | | 47.4 | 74.4 | 135.3 |
| d16 | | 0.62 | 0.96 | 1.30 |
| d18 | | 1.77 | 1.43 | 1.09 |

Example 6

Unit mm

Surface data

| Surface no. | r | d | nd | vd |
|---|---|---|---|---|
| Object plane | ∞ | 94.0 | | |
| 1 | ∞ | 0.59 | 1.80610 | 40.93 |
| 2 | 2.356 | 0.82 | | |
| 3 | 7.156 | 0.47 | 1.72916 | 54.68 |
| 4 | 3.030 | 0.53 | | |
| 5 | 20.454 | 0.86 | 1.88300 | 40.77 |
| 6 | −7.742 | 0.12 | | |
| 7 | 5.188 | 0.76 | 1.88300 | 40.77 |
| 8 | 14.724 | 0.41 | | |
| 9 (Stop) | ∞ | 0.53 | | |
| 10 | −6.220 | 0.82 | 1.88300 | 40.77 |
| 11 | −5.026 | 0.12 | | |
| 12 | −42.830 | 0.82 | 1.88300 | 40.77 |
| 13 | −4.840 | 0.12 | | |
| 14 | 6.109 | 1.59 | 1.58913 | 61.14 |
| 15 | −2.461 | 0.41 | 1.92286 | 18.90 |
| 16 | −16.886 | 1.31 | | |
| 17 | 11.356 | 0.65 | 1.88300 | 40.77 |
| 18 | ∞ | 0.52 | | |
| 19 | ∞ | 0.59 | 1.51633 | 64.14 |
| 20 | ∞ | 0.02 | 1.51000 | 64.09 |
| 21 | ∞ | 0.47 | 1.51009 | 63.64 |
| 22 | ∞ | 0.00 | | |
| Image plane | ∞ | | | |

Various data

| | |
|---|---|
| Amount of decentering | −0.59 |

Example 7

Unit mm

Surface data

| Surface no. | r | d | nd | vd |
|---|---|---|---|---|
| Object plane | ∞ | | | |
| 1 | ∞ | 0.46 | 1.88300 | 40.78 |
| 2 | 1.136 | 1.35 | | |
| 3 | 13.380 | 0.46 | 1.77250 | 49.60 |
| 4 | 3.255 | 0.39 | | |
| 5 | −15.495 | 0.77 | 1.77250 | 49.60 |
| 6 | −2.684 | 0.96 | | |
| 7 | 37.688 | 0.93 | 1.77250 | 49.60 |
| 8 | −3.478 | 0.00 | | |
| 9 (Stop) | ∞ | Variable | | |
| 10 | 3.058 | 0.77 | 1.88300 | 40.78 |
| 11 | 1.859 | Variable | | |
| 12 | 2.776 | 0.76 | 1.77250 | 49.60 |
| 13 | −5.580 | 0.46 | | |
| 14 | −3.099 | 0.46 | 1.92286 | 18.90 |
| 15 | 6.198 | 0.15 | | |
| 16 | 4.411 | 0.93 | 1.77250 | 49.60 |
| 17 | −3.874 | 0.15 | | |
| 18 | ∞ | 1.55 | 1.51633 | 64.10 |
| 19 | ∞ | 0.00 | | |
| Image plane | ∞ | | | |

Various data

| | FOP | NP | IP | FP |
|---|---|---|---|---|
| Amount of decentering | | −0.55 | 0.0 | 0.55 |
| Object distance | | 3.1 | 6.1 | 31.0 |

Example 8

Unit mm (continued)

| | | | |
|---|---|---|---|
| d9 | 1.11 | 0.68 | 0.25 |
| d12 | 0.31 | 0.75 | 1.18 |

Unit mm

Surface data

| Surface no. | r | d | nd | vd |
|---|---|---|---|---|
| Object plane | ∞ | | | |
| 1 | ∞ | 0.54 | 1.76823 | 72.24 |
| 2 | ∞ | 0.32 | | |
| 3 | ∞ | 0.54 | 1.80610 | 40.93 |
| 4* | 4.835 | 0.75 | | |
| 5 | −2.906 | 0.38 | 1.74320 | 49.30 |
| 6* | 8.364 | 0.41 | | |
| 7 | 11.998 | 1.28 | 1.90525 | 35.04 |
| 8 | −2.518 | 0.30 | 1.80610 | 40.93 |
| 9 | −21.745 | 0.22 | | |
| 10* | 13.248 | 0.54 | 1.88300 | 40.77 |
| 11 | −7.120 | 0.48 | | |
| 12 (Stop) | ∞ | 0.59 | | |
| 13 | 20.218 | 0.38 | 1.84666 | 23.78 |
| 14 | 3.373 | 1.29 | 1.88300 | 40.77 |
| 15 | −7.247 | 0.43 | | |
| 16 | −30.128 | 0.32 | 1.84666 | 23.78 |
| 17 | 2.567 | 1.07 | 1.88300 | 40.77 |
| 18* | −12.528 | Variable | | |
| 19 | −6.187 | 0.40 | 1.80625 | 40.91 |
| 20* | −5.035 | Variable | | |
| 21 | 8.595 | 0.54 | 1.88300 | 40.77 |
| 22 | ∞ | 0.43 | 1.51633 | 64.14 |
| 23 | ∞ | 0.02 | 1.51000 | 64.09 |
| 24 | ∞ | 0.43 | 1.61061 | 50.47 |
| 25 | ∞ | 0.00 | | |
| Image plane | ∞ | | | |

Aspherical surface data

4th surface
k = 0.000
A4 = 3.85858e−03, A6 = −1.44437e−04

6th surface
k = 0.000
A4 = 1.07770e−04

10th surface
k = 0.000
A4 = −3.23920e−03, A6 = −1.27041e−04

18th surface
k = 0.000
A4 = 2.33721e−03, A6 = 2.68218e−04

20th surface
k = 0.000
A4 = 2.81925e−03, A6 = −4.42669e−04

Various data

| FOP | NP | IP | FP |
|---|---|---|---|
| Amount of decentering | −0.47 | 0.0 | 0.47 |
| Object distance | 32.0 | 49.0 | 75.0 |
| d18 | 0.44 | 0.91 | 1.38 |
| d20 | 1.59 | 1.12 | 0.65 |

Next, values of conditional expressions in each example are given below. '-' (hyphen) indicates that there is no corresponding arrangement. Stop interval denotes a distance between two stops.

| | Example 1 | Example 2 | Example 3 |
|---|---|---|---|
| (1)FLFGn1/IH | −3.94 | −4.06 | −1.47 |
| (2)Ls/IH | 3.81 | 3.80 | 4.47 |
| (3)Ls/Ltotal | 0.46 | 0.46 | 0.49 |
| (4)arctan(De/Lob) | | | |
| Stop interval: Object distance | | | |
| Narrow: Near | 0.10 | 0.07 | 0.08 |
| Intermediate: Intermediate | 0.11 | 0.09 | 0.09 |
| Wide: Far | 0.13 | 0.11 | 0.10 |
| (5)LFGRG/Ltotal | 0.09 | 0.05 | 0.05 |
| (6)Le/Ls | 0.33 | 0.33 | 0.23 |
| (7)Ds/De | | | |
| Stop interval: Object distance | | | |
| Narrow: Near | 0.83 | 0.75 | 0.79 |
| Intermediate: Intermediate | 1.00 | 1.00 | 1.00 |
| Wide: Far | 1.12 | 1.17 | 1.16 |
| (8)Le/IH | 1.27 | 1.26 | 1.03 |
| (9)IH/FLFG | 0.12 | 0.00 | 0.20 |
| (10)FLRG/IH | | | |
| Focusing position | | | |
| Near | 2.98 | 3.13 | 4.36 |
| Intermediate | 3.04 | 3.13 | 4.38 |
| Far | 3.11 | 3.13 | 4.40 |
| (11)|FLfocus|/FL | 11.17 | 11.65 | 8.70 |
| (12)|1 − Φsnear/Φsmax| | 0.00 | 0.00 | 0.00 |
| (13)|1 − Φsfar/Φsmax| | 0.00 | 0.00 | 0.00 |
| (14)FLFGc/IH | 4.05 | 4.34 | 3.54 |
| (15)FLRGc/IH | 3.86 | 3.47 | 4.02 |
| (16)−1 × RRGc/IH | 4.67 | 5.04 | 3.37 |
| (17)FLFGpc/IH | 3.82 | 5.51 | 16.19 |
| (18)FLFGn2/IH | −2.02 | −2.27 | — |

| | Example 4 | Example 5 | Example 6 |
|---|---|---|---|
| (1)FLFGn1/IH | −7.69 | −4.03 | −4.93 |
| (2)Ls/IH | 3.72 | 4.53 | 2.98 |
| (3)Ls/Ltotal | 0.45 | 0.51 | 0.36 |
| (4)arctan(De/Lob) | | | |
| Stop interval: Object distance | | | |
| Narrow: Near | 0.06 | 0.09 | 0.03 |
| Intermediate: Intermediate | 0.08 | 0.10 | 0.04 |
| Wide: Far | 0.10 | 0.11 | 0.05 |
| (5)LFGRG/Ltotal | 0.06 | 0.06 | 0.08 |
| (6)Le/Ls | 0.40 | 0.34 | 0.39 |
| (7)Ds/De | | | |
| Stop interval: Object distance | | | |
| Narrow: Near | 0.77 | 0.87 | 0.83 |
| Intermediate: Intermediate | 1.00 | 1.00 | 1.00 |
| Wide: Far | 1.14 | 1.10 | 1.12 |
| (8)Le/IH | 1.50 | 1.56 | 1.17 |
| (9)IH/FLFG | 0.11 | 0.15 | −0.07 |
| (10)FLRG/IH | | | |
| Focusing position | | | |
| Near | 3.13 | 2.43 | 2.35 |
| Intermediate | 3.18 | 2.46 | — |
| Far | 3.23 | 2.48 | — |
| (11)|FLfocus|/FL | 5.72 | 18.37 | — |
| (12)|1 − Φsnear/Φsmax| | 0.00 | 0.07 | 0.00 |
| (13)|1 − Φsfar/Φsmax| | 0.00 | 0.07 | 0.00 |
| (14)FLFGc/IH | 4.38 | 4.09 | 5.68 |
| (15)FLRGc/IH | 4.07 | 4.09 | 14.55 |
| (16)−1 × RRGc/IH | 4.84 | 2.28 | 3.28 |
| (17)FLFGpc/IH | 4.30 | 4.78 | 4.19 |
| (18)FLFGn2/IH | −2.06 | −2.22 | −4.93 |

-continued

|  | Example 7 | Example 8 |
|---|---|---|
| (1)FLFGn1/IH | −1.32 | −4.52 |
| (2)Ls/IH | 5.50 | 3.71 |
| (3)Ls/Ltotal | 0.44 | 0.41 |
| (4)arctan(De/Lob) | | |
| Stop interval: Object distance | | |
| Narrow: Near | 0.49 | 0.08 |
| Intermediate: Intermediate | 0.54 | 0.09 |
| Wide: Far | 0.59 | 0.11 |
| (5)LFGRG/Ltotal | 0.06 | 0.09 |
| (6)Le/Ls | 0.22 | 0.35 |
| (7)Ds/De | | |
| Stop interval: Object distance | | |
| Narrow: Near | 0.65 | 0.83 |
| Intermediate: Intermediate | 1.00 | 1.00 |
| Wide: Far | 1.28 | 1.12 |
| (8)Le/IH | 1.23 | 1.28 |
| (9)IH/FLFG | 0.52 | 0.07 |
| (10)FLRG/IH | | |
| Focusing position | | |
| Near | 4.56 | 2.96 |
| Intermediate | 4.95 | 2.99 |
| Far | 5.41 | 3.02 |
| (11)|FLfocus|/FL | 7.67 | 14.43 |
| (12)|1 − Φsnear/Φsmax| | 0.00 | 0.00 |
| (13)|1 − Φsfar/Φsmax| | 0.00 | 0.00 |
| (14)FLFGc/IH | 4.27 | 4.00 |
| (15)FLRGc/IH | −7.91 | 4.48 |
| (16)−1 × RRGc/IH | −1.92 | 5.49 |
| (17)FLFGpc/IH | 4.20 | 5.10 |
| (18)FLFGn2/IH | −5.83 | −2.16 |

Figure 57:
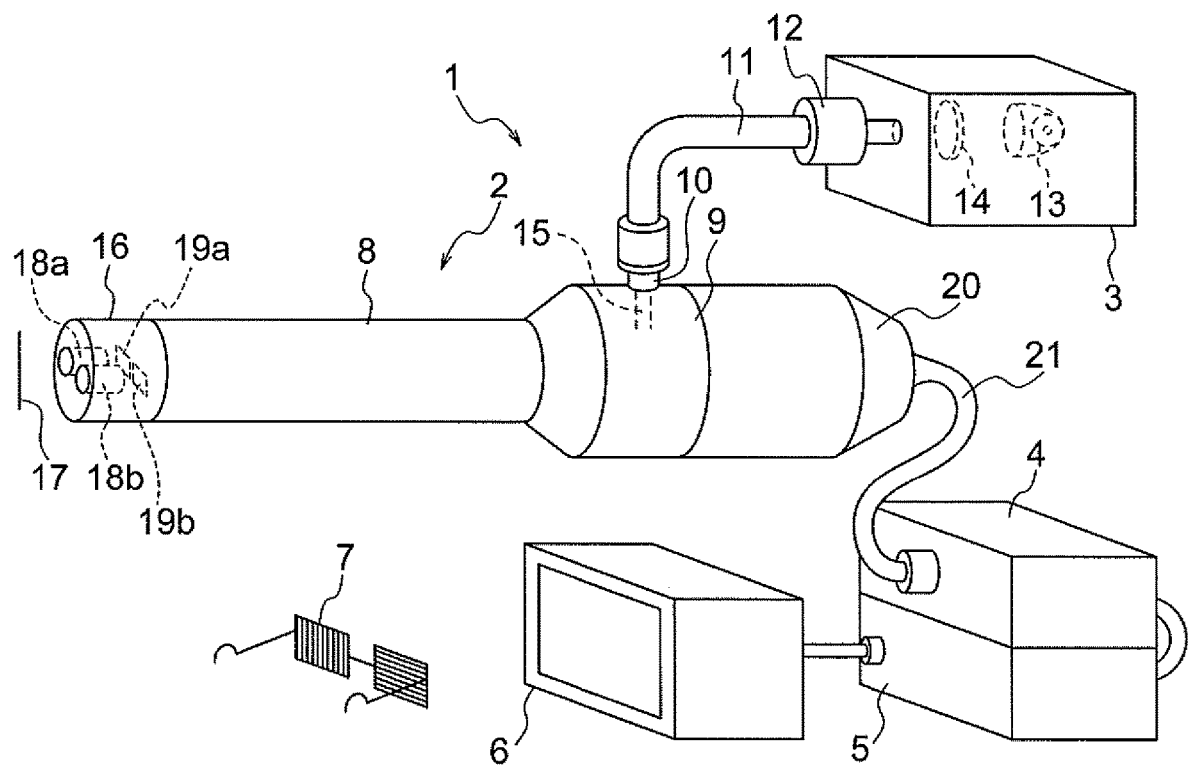
FIG. 57 is a diagram showing an optical apparatus of the present embodiment.

FIG. 57 is a diagram showing an optical apparatus of the present embodiment. The optical apparatus of the present embodiment is a stereoscopic-vision endoscope. A stereoscopic-vision endoscope 1 includes a body portion 2, a light-source unit 3, a camera control unit 4 (hereinafter, referred to as 'CCU 4'), a scan converter 5, a monitor 6, and shutter glasses 7.

The body portion 2 includes an insertion portion 8 and a holding portion 9. The insertion portion 8 is a portion to be inserted into a body cavity, and is formed by a hard jacket tube. The jacket tube is in the form of a circular tube, and is made of a metal such as stainless steel. In such manner, the stereoscopic-vision endoscope 1 is a rigid endoscope. The holding portion 9 is a portion to be held by an operator.

The holding portion 9 is provided with a light-guide tube 10. One end of a light-guide cable 11 is connected to the light-guide tube 10. The other end of the light-guide cable 11 is provided with alight-guide connector 12. The light-guide cable 11 is detachably connected to the holding portion 9 and the light-source unit 3.

The light-source unit 3 includes a lamp 13 and a lens 14. The lamp 13 generates illumination light such as white light. The lens 14 focuses the illumination light. The illumination light focused by the lens 14 is irradiated to an end surface of the light-guide connector 12. The illumination light irradiated to the end surface is transmitted to the body portion 2 by a light guide inside the light-guide cable 11.

The body portion 2 is provided with a light guide 15. The light guide 15 is bent inside the holding portion 9, and is passed through the insertion portion 8. The light guide 15 transmits the illumination light supplied from the light-guide cable 11 to a front-end surface which is fixed to a front-end portion 16 of the insertion portion 8. Accordingly, the illumination light is emerged frontward from the front-end surface.

Inside of the front-end portion 16, an optical system for stereoscopic vision of the present embodiment is disposed. The optical system for stereoscopic vision includes an objective optical system 18a and an objective optical system 18b.

An object 17 is illuminated by the illumination light. Light from the object 17 is incident on the objective optical system 18a and the objective optical system 18b. An optical image is formed at an image forming position of the objective optical system 18a. An optical image 19b is formed at an image forming position of the objective optical system 18b.

A first imager 19a is disposed at the image forming position of the objective optical system 18a. The optical image formed by the objective optical system 18a is captured by the first imager 19a. A second imager 19b is disposed at the image forming position of the objective optical system 18b. The optical image formed by the objective optical system 18b is captured by the first imager 19b.

One end of a signal cable 21 is connected to an output portion 260 The other end of the signal cable 21 is connected to the CCU 4. A signal which is output from the first imager 19a and a signal which is output from the second imager 19b are input to the CCU 4 via the signal cable 21.

In the CCU 4, signal processing is carried out on signals output from the first imager 19a and the second imager 19b. An image signal subjected to signal processing in the CCU 4 is input to the scan converter 5. In the scan converter 5, the signal output from the CCU 4 is converted to a video signal.

The video signal is input to the monitor 6. The monitor 6 displays the video signal that has been input. Two images having a parallax are displayed alternately on the monitor 6. The shutter glasses 7 have a shutter function. By using the shutter glasses 7, images displayed on the monitor 6 can be viewed stereoscopically.

Figure 58:
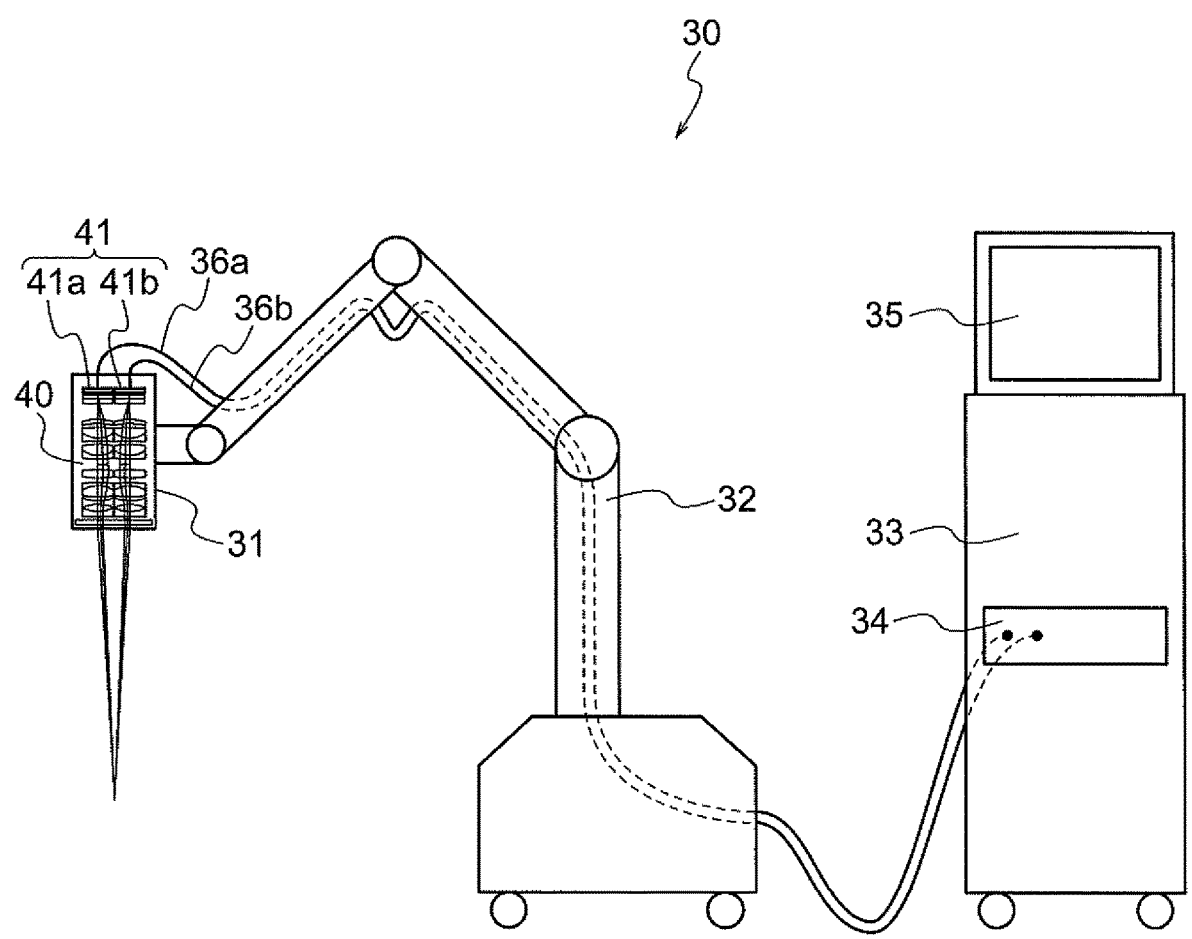
FIG. 58 is a diagram showing another optical apparatus of the present embodiment.

FIG. 58 is a diagram showing another optical apparatus of the present embodiment. The another optical apparatus of the present embodiment is an image observation system including a surgical microscope. In FIG. 58, for the sake of viewability, only the surgical microscope is drawn large.

An image observation system 30 includes a surgical microscope 31, a mount 32, a trolley 33, a camera control unit 34 (hereinafter, referred to as 'CCU 34'), a display unit 35, and signal cables 36a and 36b.

The surgical microscope 31 has an optical system for stereoscopic vision 40 and an image pickup unit 41. The optical system for stereoscopic vision of the present embodiment is used for the optical system for stereoscopic vision 40. The image pickup unit 41 includes an imager 41a and an imager 41b.

Two optical images are formed by the optical system for stereoscopic vision 40. The imager 41a and the imager 41b are disposed at positions of the two optical images. Accordingly, one optical image is picked up by the imager 41a and the other optical image is picked up by the imager 41b.

One end of the signal cable 36a and one end of the signal cable 36b are connected to the image pickup unit 41. The other end of the signal cable 36a and the other end of the signal cable 36b are connected to the CCU 34. A signal output from the imager 41a is input to the CCU 34 via the signal cable 36a. A signal output from the imager 41b is input to the CCU 34 via the signal cable 36b.

The signal output from the imager 41a and the signal output from the imager 41b are subjected to signal processing in the CCU 34. An image signal subjected to signal processing in the CCU 34 is input to a scan converter (not shown in the diagram). In the scan converter, a signal output from the CCU 34 is converted to a video signal.

The video signal is input to the display unit 35. A three-dimensional display monitor is used for the display unit 35. Displays such as a liquid-crystal display using a parallax barrier system, a plasma display using an oblique barrier system, or a liquid-crystal display using a lenticular lens system are specific examples of the three-dimensional display monitor.

Two images having a parallax are displayed on the display unit 35. By using the three-dimensional display monitor, it is possible to view stereoscopically the images displayed on the display unit 35.

According to the present invention, it is possible to provide a small-sized optical system for stereoscopic vision having a wide angle of view and a high depth resolution, and an image pickup apparatus using the same.

As described heretofore, the present invention is suitable for a small-sized optical system for stereoscopic vision having a wide angle of view and a high depth resolution, and an image pickup apparatus using the same.

What is claimed is:

1. An optical system for stereoscopic vision, comprising:
a first optical system; and
a second optical system,
wherein:
the first optical system and the second optical system are identical optical systems,
each of the first optical system and the second optical system includes, in order from an object side, a front unit, a stop, and a rear unit having a positive refractive power, and
each of the two front units includes a first negative lens,
the first negative lens is a lens positioned nearest to an object, among lenses in the front unit,
each of the two stops moves in a direction parallel to a plane including an optical axis of the first optical system and an optical axis of the second optical system,
both of the stops move to be drawn away from a central axis or move to come closer to the central axis,
each of the two rear units includes a focusing lens,
the two focusing lenses move in a direction along the optical axis, and
the following conditional expressions (1) and (2) are satisfied:

$$-20.0 < FLFGn1/IH < -0.5 \quad (1)$$

$$1.5 < Ls/IH < 7.5 \quad (2)$$

where,
FLFGn1 denotes a focal length of the first negative lens,
IH denotes the maximum image height,
Ls denotes a distance on an optical axis from a predetermined object-side surface up to the stop,
the predetermined object-side surface is an object-side surface of a lens positioned nearest to the object in the optical system for stereoscopic vision, and
the central axis is an axis positioned between the optical axis of the first optical system and the optical axis of the second optical system.

2. The optical system for stereoscopic vision, according to claim 1, wherein the following conditional expression (3) is satisfied:

$$0.25 < Ls/Ltotal < 0.58 \quad (3)$$

where,
Ltotal denotes a distance on the optical axis from the predetermined object-side surface up to an image plane.

3. The optical system for stereoscopic vision according to claim 1, wherein the two stops move together with the movement of the two focusing lenses.

4. The optical system for stereoscopic vision according to claim 1, wherein the following conditional expression (4) is satisfied at an arbitrary focusing position:

$$0.01 < \arctan(De/Lob) < 1.2 \quad (4)$$

where,
De denotes a distance between a center of a first entrance pupil and a center of a second entrance pupil,
Lob denotes a distance on the optical axis from a position of the first entrance pupil up to the arbitrary focusing position or a distance on the optical axis from a position of the second entrance pupil up to the arbitrary focusing position,
the first entrance pupil is an entrance pupil of the first optical system, and
the second entrance pupil is an entrance pupil of the second optical system.

5. The optical system for stereoscopic vision according to claim 1, wherein:
a distance between a center of an opening section of the stop of the first optical system and a center of an opening section of the stop of the second optical system becomes minimum at a first focusing position and becomes maximum at a second focusing position,
the first focusing position is a position nearest to the optical system for stereoscopic vision in a focusing range of the optical system for stereoscopic vision, and
the second focusing position is a position farthest from the optical system for stereoscopic vision in the focusing range of the optical system for stereoscopic vision.

6. The optical system for stereoscopic vision according to claim 1, wherein the following conditional expression (5) is satisfied:

$$0.1 < LFGRG/Ltotal < 0.2 \quad (5)$$

where,
LFGRG denotes a distance on the optical axis from a lens surface nearest to an image in the front unit and a lens surface nearest to the object in the rear unit, and
Ltotal denotes a distance on the optical axis from the predetermined object-side surface up to an image plane.

7. The optical system for stereoscopic vision according to claim 1, wherein the following conditional expression (6) is satisfied:

$$0.1 < Le/Ls < 0.7 \quad (6)$$

where,
Le denotes a distance on the optical axis from the predetermined object-side surface up to a position of a first entrance pupil or a distance on the optical axis from the predetermined object-side surface up to a position of a second entrance pupil,
Ls denotes a distance on the optical axis from the predetermined object-side surface up to the stop,
the first entrance pupil is an entrance pupil of the first optical system, and
the second entrance pupil is an entrance pupil of the second optical system.

8. The optical system for stereoscopic vision according to claim 1, wherein the following conditional expression (7) is satisfied:

$$0.4 < Ds/De < 1.5 \quad (7)$$

where,

Ds denotes a distance between a center of a first opening section and a center of a second opening section, De denotes a distance between a center of a first entrance pupil and a center of a second entrance pupil, the first opening section is an opening section of an opening of the first optical system, the second opening section is an opening section of an opening of the second optical system, the first entrance pupil is an entrance pupil of the first optical system, and the second entrance pupil is an entrance pupil of the second optical system.

9. The optical system for stereoscopic vision according to claim 1, wherein the following conditional expression (8) is satisfied:

$$0.9 < Le/IH < 1.8 \quad (8)$$

where,

Le denotes a distance on the optical axis from the predetermined object-side surface up to a position of a first entrance pupil or a distance on the optical axis from the predetermined object-side surface up to a position of a second entrance pupil, IH denotes the maximum image height, the first entrance pupil is an entrance pupil of the first optical system, and the second entrance pupil is an entrance pupil of the second optical system.

10. The optical system for stereoscopic vision according to claim 1, wherein the following conditional expression (9) is satisfied:

$$-0.2 < IH/FLFG < 1.0 \quad (9)$$

where,

FLFG denotes a focal length of the front unit, and

IH denotes the maximum image height.

11. The optical system for stereoscopic vision according to claim 1, wherein the following conditional expression (10) is satisfied at an arbitrary focusing position:

$$2.0 < FLRG/IH < 6.0 \quad (10)$$

where,

FLRG denotes a focal length of the rear unit, and

IH denotes the maximum image height.

12. The optical system for stereoscopic vision according to claim 1, wherein:

each of the two rear units includes a focusing lens, and the following conditional expression (11) is satisfied at an arbitrary focusing position:

$$2.0 < |FLfocus|/FL < 50.0 \quad (11)$$

where,

FLfocus denotes a focal length of the focusing lens, and

FL denotes a focal length of the overall optical system for stereoscopic-vision.

13. The optical system for stereoscopic vision according to claim 1, wherein the following conditional expression (12) is satisfied:

$$|1-\Phi snear/\Phi s\ max| < 0.15 \quad (12)$$

where, $\Phi$snear denotes a diameter of an opening of the stop at a first focusing position, $\Phi$smax denotes the maximum diameter of the opening of the stop from the first focusing position up to a second focusing position, the first focusing position is a position nearest to the optical system for stereoscopic vision, in a focusing range of the optical system for stereoscopic vision, and the second focusing position is a position farthest from the optical system for stereoscopic vision, in the focusing range of the optical system for stereoscopic vision.

14. The optical system for stereoscopic vision according to claim 1, wherein the following conditional expression (13) is satisfied:

$$|1-\Phi sfar/\Phi s\ max| < 0.15 \quad (13)$$

where, $\Phi$sfar denotes a diameter of an opening of the stop at a second focusing position, $\Phi$smax denotes the maximum diameter of the opening of the stop from a first focusing position up to the second focusing position, the first focusing position is a position nearest to the optical system for stereoscopic vision, in a focusing range of the optical system for stereoscopic vision, and the second focusing position is a position farthest from the optical system for stereoscopic vision, in the focusing range of the optical system for stereoscopic vision.

15. The optical system for stereoscopic vision according to claim 1, wherein:

the optical system for stereoscopic vision includes a lens component, the lens component is a single lens or a cemented lens, the front unit includes an image-side lens component nearest to an image, and the following conditional expression (14) is satisfied:

$$2.5 < FLFGc/IH < 7.0 \quad (14)$$

where,

FLFGc denotes a focal length of the image-side lens component, and

IH denotes the maximum image height.

16. The optical system for stereoscopic vision according to claim 1, wherein:

the optical system for stereoscopic vision includes a lens component, the lens component is a single lens or a cemented lens, the rear unit includes an object-side lens component nearest to the object, and the following conditional expression (15) is satisfied:

$$2.0 < FLRGc/IH < 40.0 \quad (15)$$

where,

FLRGc denotes a focal length of the object-side lens component, and

IH denotes the maximum image height.

17. The optical system for stereoscopic vision according to claim 1, wherein:

each of the two rear units includes a plurality of positive lenses, and at least one negative lens is disposed between the two positive lenses.

18. The optical system for stereoscopic vision according to claim 1, wherein:

the optical system for stereoscopic vision includes a lens component, the lens component is a single lens or a cemented lens, the rear unit includes an object-side lens component nearest to the object, and the following conditional expression (16) is satisfied:

$$1.0 < -1 \times RRGc/IH < 10.0 \qquad (16)$$

where,

RRGc denotes a radius of curvature of an image-side surface of the object-side lens component, and IH denotes the maximum image height.

19. The optical system for stereoscopic vision according to claim 1, wherein:

the optical system for stereoscopic vision includes a lens component, the lens component is a single lens or a cemented lens, the front unit includes a lens component having a positive refractive power and an image-side lens component, the lens component having a positive refractive power is positioned on the object side of the image-side lens component, and the image-side lens component has a positive refractive power and is disposed nearest to an image.

20. The optical system for stereoscopic vision according to claim 19, wherein the following conditional expression (17) is satisfied:

$$2.0 < FLFGpc/IH < 100 \qquad (17)$$

where,

FLFGpc denotes a focal length of the lens component having a positive refractive power, and IH denotes the maximum image height.

21. The optical system for stereoscopic vision according to claim 1, wherein a second negative lens is disposed on an image side of the first negative lens.

22. The optical system for stereoscopic vision according to claim 21, wherein the following conditional expression (18) is satisfied:

$$-7.0 < FLFGn2/IH < -1.0 \qquad (18)$$

where,

FLFGn2 denotes a focal length of the second negative lens, and

IH denotes the maximum image height.

23. The optical system for stereoscopic vision according to claim 1, wherein:

the optical system for stereoscopic vision includes a lens component, the lens component is a single lens or a cemented lens, and the rear unit includes a lens component having a positive refractive power, nearest to an image.

24. The optical system for stereoscopic vision according to claim 1, wherein:

the optical system for stereoscopic vision includes an optical element disposed nearest to the object, and the optical element has an area in which a light beam incident on the first optical system and a light beam incident on the second optical system overlap.

25. The optical system for stereoscopic vision according to claim 1, wherein:

the optical system for stereoscopic vision includes an optical element disposed nearest to the object, the optical element has an area through which a light beam incident on the first optical system and a light beam incident on the second optical system pass, and two optical surfaces are parallel.

26. An image pickup apparatus, comprising:

an optical system; and an imager having an image pickup surface, which converts an image formed on the image pickup surface by the optical system to an electric signal, wherein the optical system is an optical system according to claim 1.

* * * * *